(12) United States Patent
Iguchi et al.

(10) Patent No.: US 11,558,642 B2
(45) Date of Patent: Jan. 17, 2023

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 17/132,780

(22) Filed: Dec. 23, 2020

(65) Prior Publication Data

US 2021/0120268 A1    Apr. 22, 2021

Related U.S. Application Data

(63) Continuation of application No. PCT/JP2019/031614, filed on Aug. 9, 2019.
(Continued)

(51) Int. Cl.
*H04N 19/597* (2014.01)
*H04N 19/119* (2014.01)
*H04N 19/46* (2014.01)

(52) U.S. Cl.
CPC ......... *H04N 19/597* (2014.11); *H04N 19/119* (2014.11); *H04N 19/46* (2014.11)

(58) Field of Classification Search
CPC .... H04N 19/597; H04N 19/119; H04N 19/46; G06T 9/00
See application file for complete search history.

(56) References Cited

U.S. PATENT DOCUMENTS

| 2005/0195191 A1 | 9/2005 | Lee et al. |
| 2014/0375638 A1 | 12/2014 | Tomaru et al. |

(Continued)

FOREIGN PATENT DOCUMENTS

| JP | 2005-259139 | 9/2005 |
| WO | 2014/020663 | 2/2014 |
| WO | 2018/083999 | 5/2018 |

OTHER PUBLICATIONS

International Search Report (ISR) dated Oct. 15, 2019 in International (PCT) Application No. PCT/JP2019/031614.
(Continued)

*Primary Examiner* — Tat C Chio
(74) *Attorney, Agent, or Firm* — Wenderoth, Lind & Ponack, L.L.P.

(57) ABSTRACT

A three-dimensional data encoding method includes: encoding divided data items to generate encoded data items each corresponding to a respective one of the divided data items, the divided data items being included in subspaces obtained by dividing a current space including three-dimensional points, the divided data items each including one or more three-dimensional points among the three-dimensional points; and generating a bitstream including the encoded data items and control information items each corresponding to a respective one of the encoded data items. Each of the control information items includes a first identifier and a second identifier. The first identifier indicates a subspace corresponding to an encoded data item corresponding to the control information item, and the second identifier indicates (Continued)

a divided data item corresponding to the encoded data item corresponding to the control information item.

6 Claims, 50 Drawing Sheets

Related U.S. Application Data

(60) Provisional application No. 62/717,233, filed on Aug. 10, 2018.

(56) References Cited

U.S. PATENT DOCUMENTS

| | | | |
|---|---|---|---|
| 2017/0347122 A1* | 11/2017 | Chou | H04N 19/36 |
| 2019/0251743 A1 | 8/2019 | Koyama et al. | |
| 2019/0318488 A1* | 10/2019 | Lim | G06T 7/337 |

OTHER PUBLICATIONS

Extended European Search Report dated Jul. 29, 2021 in European Patent Application No. 19848557.5.

Ohji Nakagami (Sony) et al: "Point cloud compression technology proposal by Sony", 120. MPEG Meeting; Oct. 23, 2017-Oct. 27, 2017; Macau; (Motion Picture Expert Group or ISO/IEC JTC1/SC29/WG11), No. m41665, Oct. 18, 2017 (Oct. 18, 2017), XP030070007.

"First version of the PCC WD Category 1", 121. MPEG Meeting; Jan. 22, 2018-Jan. 26, 2018; Gwangju; (Motion Picture Expert Group or ISO/IEC JTC1/SC29/WG11), No. n17373, Apr. 11, 2018 (Apr. 11, 2018), XP030024019.

Yiting Shao et al: "PCC CE13. 2 Report on point cloud tile and slice based coding", 123. MPEG Meeting; Jul. 16, 2018-Jul. 20, 2018; Ljubljana; (Motion Picture Expert Group or ISO/IEC JTC1/SC29/WG11), No. m43528 Jul. 15, 2018 (Jul. 15, 2018), XP030197356.

* cited by examiner

| | GEOMETRY INFORMATION | ATTRIBUTE INFORMATION |
| --- | --- | --- |
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 18

| ftyp | moov | mdat |
|---|---|---|

FIG. 19

| Codec 1 | Codec 2 |
|---|---|
| Codec 1 NAL unit | Codec 2 NAL unit |
| PCC NAL Unit ||
| Carriage of Codec 1 | Carriage of Codec 2 |
| ISOBMFF ||

FIG. 39

```
EXAMPLES OF SEMANTICS OF pcc_nal_unit_type
(1) if pcc_codec_type == Codec 1
     0:Codec1 Goemetry
     1:Codec1 AttributeX
     2:Codec1 AttributeY
     3:Codec1 Geom. PS
     4:Codec1 AttrX. PS
     5:Codec1 AttrX. PS
     6:Codec1 Geometry Sequence PS
     7:Codec1 AttributeX Sequence PS
     8:Codec1 AttributeY Sequence PS
     9:Codec1 AU Header
    10:Codec1 GOF Header
  11 ~:Codec1 reserved for future use (2) if pcc_codec_type == Codec 2
     0:Codec2 DataA
     1:Codec2 MetaDataA
     2:Codec2 MetaDataB
   3 ~:Codec2 reserved for future use
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2019/031614 filed on Aug. 9, 2019, claiming the benefit of priority of U.S. Provisional Patent Application No. 62/717,233 filed on Aug. 10, 2018, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for reducing the processing amount of a three-dimensional data decoding device in encoding and decoding three-dimensional data.

The present disclosure has an object to provide a three-dimensional data encoding method, a three-dimensional data decoding method, a three-dimensional data encoding device, or a three-dimensional data decoding device that is capable of reducing the processing amount of the three-dimensional data decoding device.

In accordance with an aspect of the present disclosure, a three-dimensional data encoding method includes: encoding a plurality of divided data items to generate a plurality of encoded data items each corresponding to a respective one of the plurality of divided data items, the plurality of divided data items being included in a plurality of subspaces obtained by dividing a current space including a plurality of three-dimensional points, the plurality of divided data items each including one or more three-dimensional points among the plurality of three-dimensional points; and generating a bitstream, the bitstream including the plurality of encoded data items and a plurality of control information items each corresponding to a respective one of the plurality of encoded data items, wherein each of the plurality of control information items includes a first identifier and a second identifier, the first identifier indicating a subspace corresponding to an encoded data item corresponding to the control information item among the plurality of subspaces, the second identifier indicating a divided data item corresponding to the encoded data item corresponding to the control information item among the plurality of divided data items.

In accordance with another aspect of the present disclosure, a three-dimensional data decoding method includes: obtaining first identifiers and second identifiers from a bitstream, the bitstream including a plurality of encoded data items and a plurality of control information items each corresponding to a respective one of the plurality of encoded data items, the first identifiers and the second identifiers being included in the plurality of control information items, the plurality of encoded data items being generated by encoding a plurality of divided data items, the plurality of divided data items being included in a plurality of subspaces obtained by dividing a current space including a plurality of three-dimensional points, the plurality of divided data items each including one or more three-dimensional points among the plurality of three-dimensional points, the first identifiers each indicating a subspace corresponding to an encoded data item corresponding to a corresponding one of the plurality of control information items among the plurality of subspaces, and the second identifiers each indicating a divided data item corresponding to an encoded data item corresponding to a corresponding one of the plurality of control information items among the plurality of divided data items; decoding the plurality of encoded data items to reconstruct the plurality of divided data items; and combining the plurality of divided data items together with reference to the first identifiers and the second identifiers to reconstruct the current space.

The present disclosure provides a three-dimensional data encoding method, a three-dimensional data decoding method, a three-dimensional data encoding device, or a three-dimensional data decoding device that is capable of reducing the processing amount of the three-dimensional data decoding device.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 18 is a diagram illustrating a basic structure of ISOBMFF according to Embodiment 2;

FIG. 19 is a diagram illustrating a protocol stack according to Embodiment 2;

FIG. 39 is a diagram illustrating a semantics example of pec_nal_unit_type according to Embodiment 4;

DETAILED DESCRIPTION OF THE EMBODIMENTS

Figure 1:
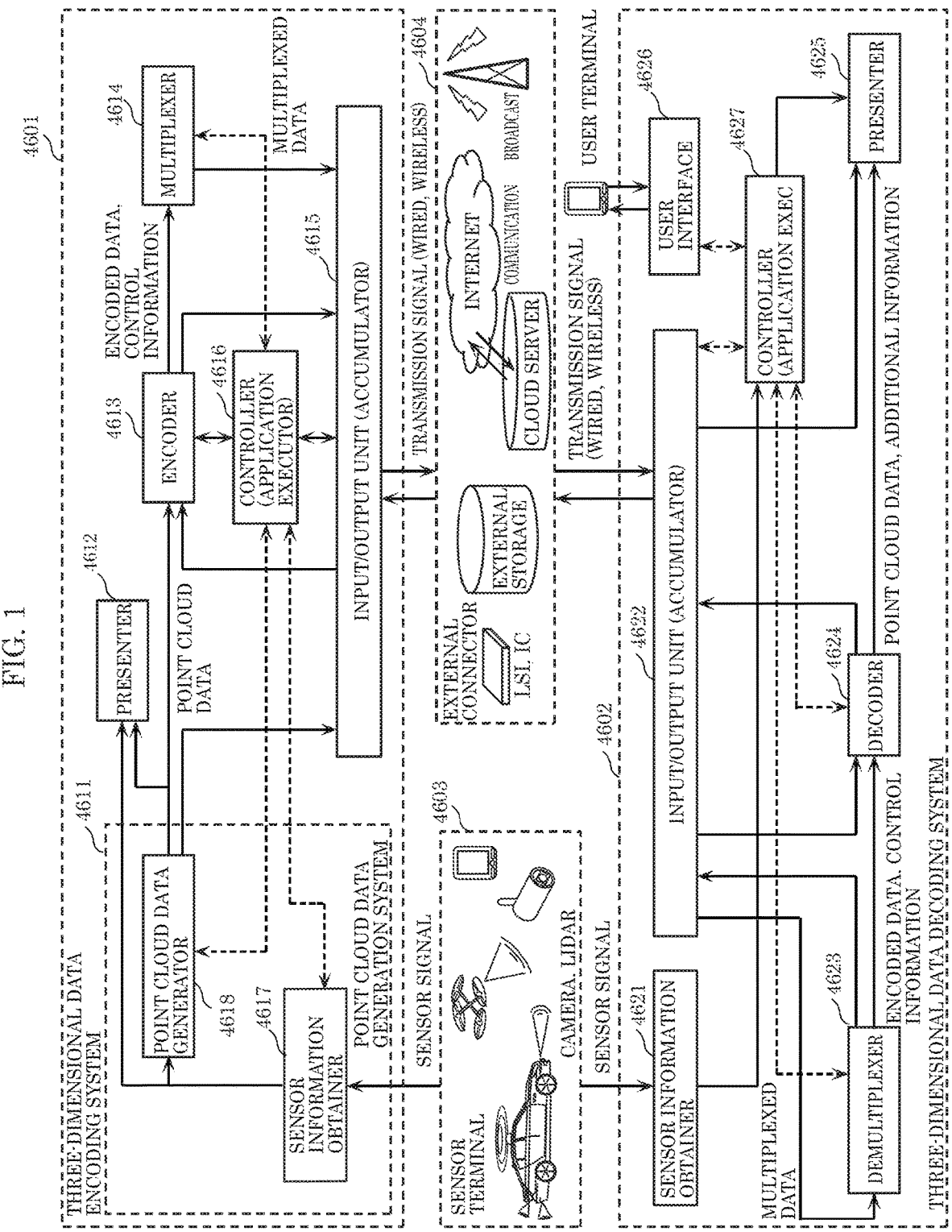
FIG. 1 is a diagram illustrating a configuration of a three-dimensional data encoding and decoding system according to Embodiment 1.

In accordance with an aspect of the present disclosure, a three-dimensional data encoding method includes: encoding a plurality of divided data items to generate a plurality of encoded data items each corresponding to a respective one of the plurality of divided data items, the plurality of divided data items being included in a plurality of subspaces obtained by dividing a current space including a plurality of three-dimensional points, the plurality of divided data items each including one or more three-dimensional points among the plurality of three-dimensional points; and generating a bitstream, the bitstream including the plurality of encoded data items and a plurality of control information items each corresponding to a respective one of the plurality of encoded data items, wherein each of the plurality of control information items includes a first identifier and a second identifier, the first identifier indicating a subspace corresponding to an encoded data item corresponding to the control information item among the plurality of subspaces, the second identifier indicating a divided data item corresponding to the encoded data item corresponding to the control information item among the plurality of divided data items.

Accordingly, a three-dimensional data decoding device that decodes the bitstream generated by the three-dimensional data encoding method can easily reconstruct the current space by combining the divided data items together with reference to the first identifier and the second identifier. Therefore, the three-dimensional data decoding device can reduce the processing amount.

For example, it is possible that the encoding includes encoding geometry information and attribute information of each of the one or more three-dimensional points included in each of the plurality of divided data items to generate encoded geometry information and encoded attribute information, each of the plurality of encoded data items includes the encoded geometry information and the encoded attribute information, that each of the plurality of control information items includes a geometry-information control information item for the encoded geometry information and an attribute-information control information item for the encoded attribute information, and that the first identifier and the second identifier are included in the geometry-information control information item for the encoded geometry information.

For example, it is also possible that in the bitstream, each of the plurality of control information items is located ahead of a corresponding one of the plurality of encoded data items.

In accordance with another aspect of the present disclosure, a three-dimensional data decoding method includes: obtaining first identifiers and second identifiers from a bitstream, the bitstream including a plurality of encoded data items and a plurality of control information items each corresponding to a respective one of the plurality of encoded data items, the first identifiers and the second identifiers being included in the plurality of control information items, the plurality of encoded data items being generated by encoding a plurality of divided data items, the plurality of divided data items being included in a plurality of subspaces obtained by dividing a current space including a plurality of three-dimensional points, the plurality of divided data items each including one or more three-dimensional points among the plurality of three-dimensional points, the first identifiers each indicating a subspace corresponding to an encoded data item corresponding to a corresponding one of the plurality of control information items among the plurality of divided data items; decoding the plurality of encoded data items to reconstruct the plurality of divided data items; and combining the plurality of divided data items together with reference to the first identifiers and the second identifiers to reconstruct the current space.

Accordingly, the three-dimensional data decoding method can easily reconstruct the current space by combining the divided data items together by using the first identifier and the second identifier. Therefore, the method can reduce the processing amount of a three-dimensional data decoding device.

For example, it is possible that each of the plurality of encoded data items is generated by encoding geometry information and attribute information of each of the one or more three-dimensional points included in a divided data item corresponding to the each of the encoded data items among the plurality of divided data items to generate encoded geometry information and encoded attribute information, that the each of the plurality of encoded data items includes the encoded geometry information and the encoded attribute information, that each of the plurality of control information items includes a geometry-information control information item for the encoded geometry information and an attribute-information control information item for the encoded attribute information, and that each of the first identifiers and each of the second identifiers are included in the geometry-information control information item corresponding to the corresponding one of the plurality of the control information items.

For example, it is also possible that in the bitstream, each of the plurality of control information items is located ahead of a corresponding one of the plurality of encoded data items.

In accordance with still another aspect of the present disclosure, a three-dimensional data encoding device includes: a processor; and memory, wherein, using the memory the processor: encodes a plurality of divided data items to generate a plurality of encoded data items each corresponding to a respective one of the plurality of divided data items, the plurality of divided data items being included in a plurality of subspaces obtained by dividing a current space including a plurality of three-dimensional points, the plurality of divided data items each including one or more three-dimensional points among the plurality of three-dimensional points; and generates a bitstream, the bitstream including the plurality of encoded data items and a plurality of control information items each corresponding to a respective one of the plurality of encoded data items, wherein each of the plurality of control information items includes a first identifier and a second identifier, the first identifier indicating a subspace corresponding to an encoded data item corresponding to the control information item among the plurality of subspaces, the second identifier indicating a divided data item corresponding to the encoded data item corresponding to the control information item among the plurality of divided data items.

Accordingly, the three-dimensional data decoding device that decodes the bitstream generated by the three-dimensional data encoding device can easily reconstruct the current space by combining the divided data items together by using the first identifier and the second identifier. Therefore, it is possible to reduce the processing amount of the three-dimensional data decoding device.

In accordance with still another aspect of the present disclosure, a three-dimensional data decoding device includes: a processor; and memory, wherein, using the memory, the processor: obtains first identifiers and second identifiers from a bitstream, the bitstream including a plurality of encoded data items and a plurality of control information items each corresponding to a respective one of the plurality of encoded data items, the first identifiers and the second identifiers being included in the plurality of control information items, the plurality of encoded data items being generated by encoding a plurality of divided data items, the plurality of divided data items being included in a plurality of subspaces obtained by dividing a current space including a plurality of three-dimensional points, the plurality of divided data items each including one or more three-dimensional points among the plurality of three-dimensional points, the first identifiers each indicating a subspace corresponding to an encoded data item corresponding to a corresponding one of the plurality of control information items among the plurality of subspaces, and the second identifiers each indicating a divided data item corresponding to an encoded data item corresponding to a corresponding one of the plurality of control information items among the plurality of divided data items; decodes the plurality of encoded data items to reconstruct the plurality of divided data items; and combines the plurality of divided data items together with reference to the first identifiers and the second identifiers to reconstruct the current space.

Accordingly, the three-dimensional data decoding device can easily reconstruct the current space by combining the divided data items together by using the first identifier and the second identifier. Therefore, the three-dimensional data decoding device can reduce the processing amount.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
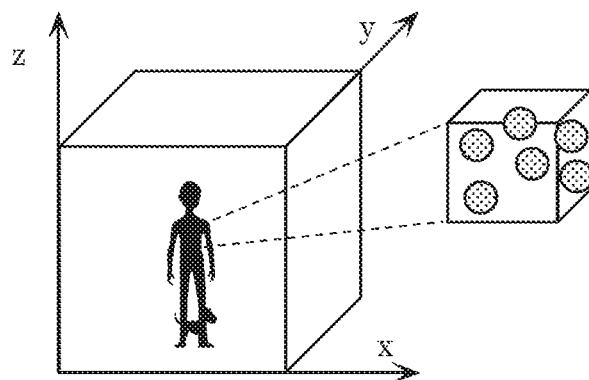
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
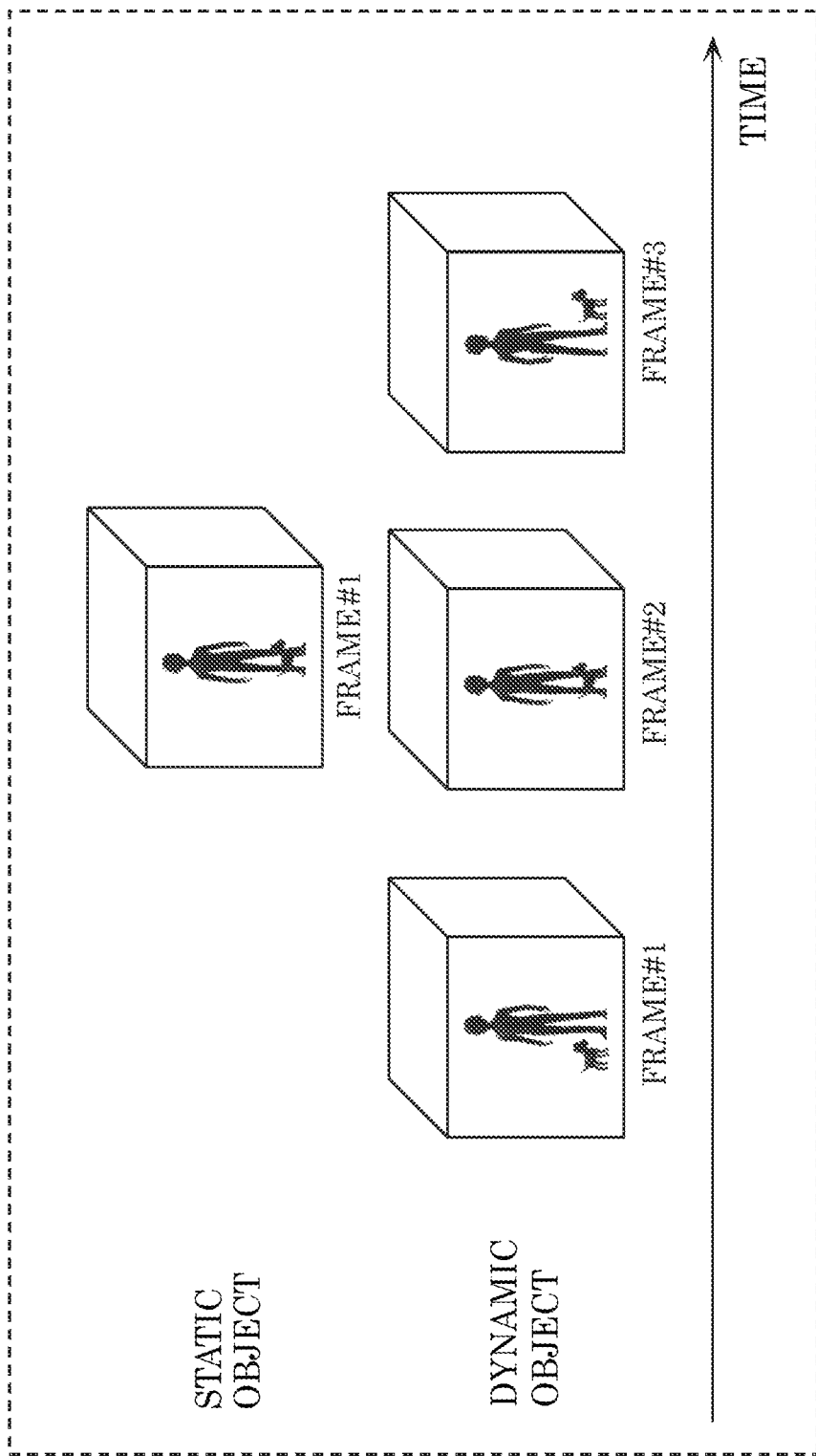
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF. MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission. Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
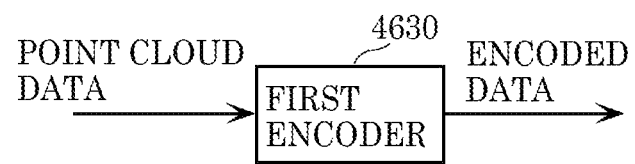
FIG. 5 is a diagram illustrating a structure of a first encoder according to Embodiment 1.
Figure 6:
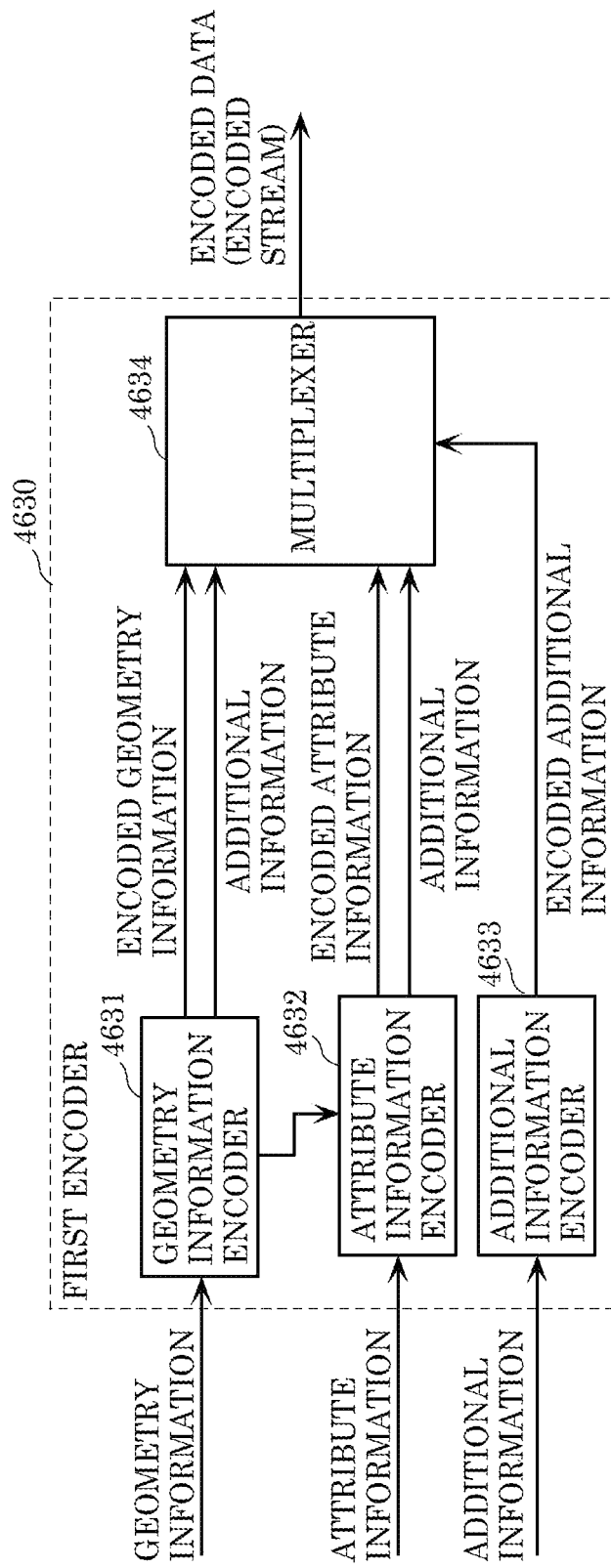
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
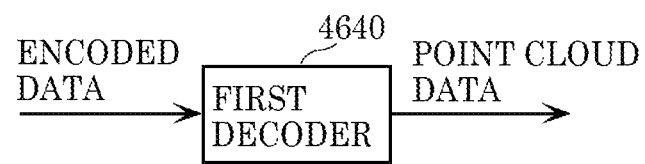
FIG. 7 is a diagram illustrating a structure of a first decoder according to Embodiment 1.
Figure 8:
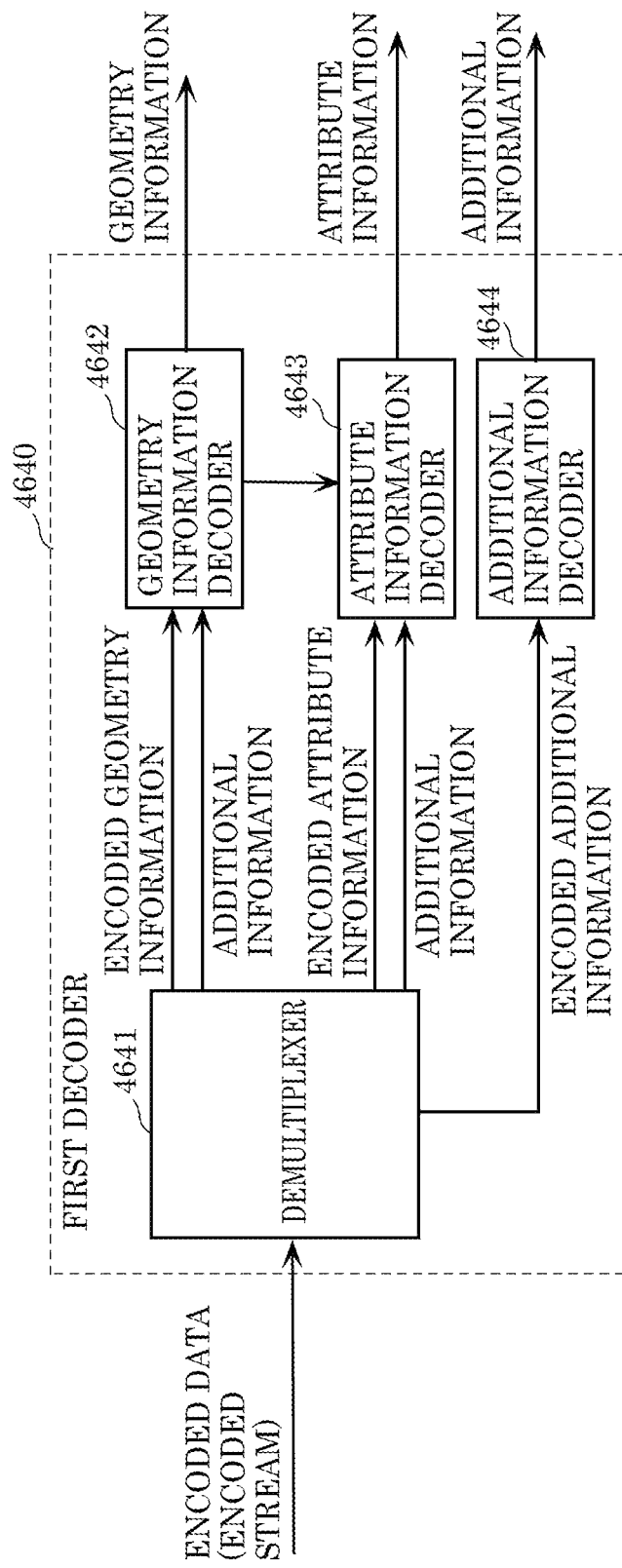
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
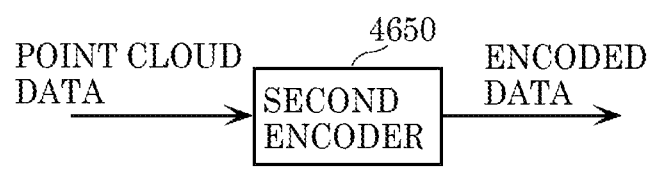
FIG. 9 is a diagram illustrating a structure of a second encoder according to Embodiment 1.
Figure 10:
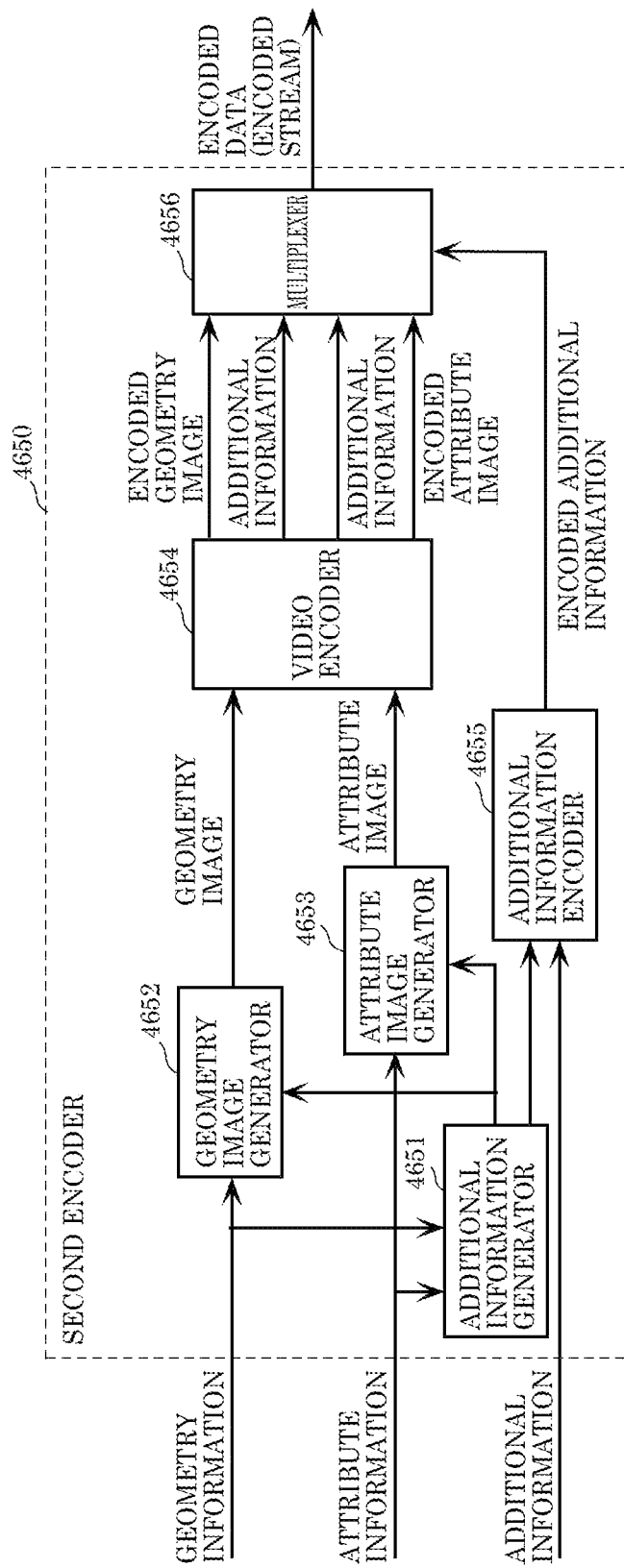
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
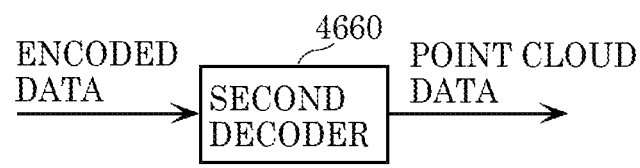
FIG. 11 is a diagram illustrating a structure of a second decoder according to Embodiment 1.
Figure 12:
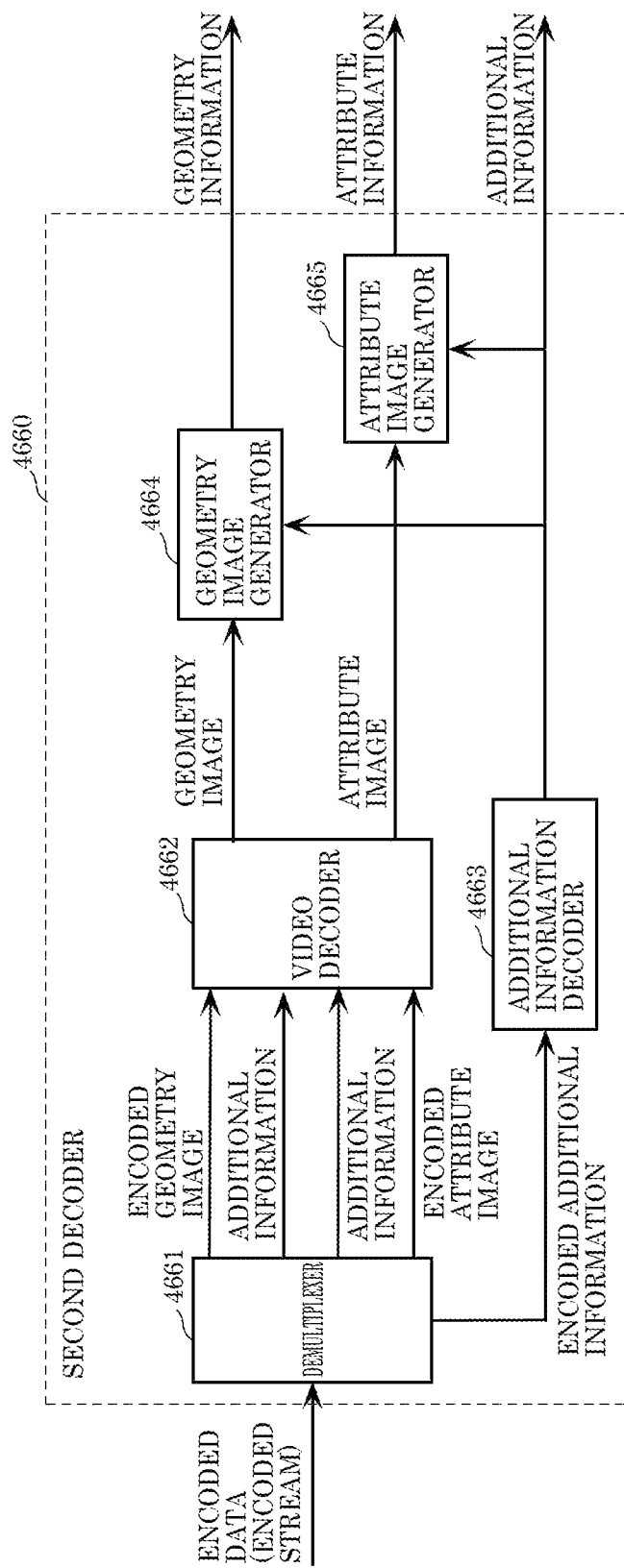
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
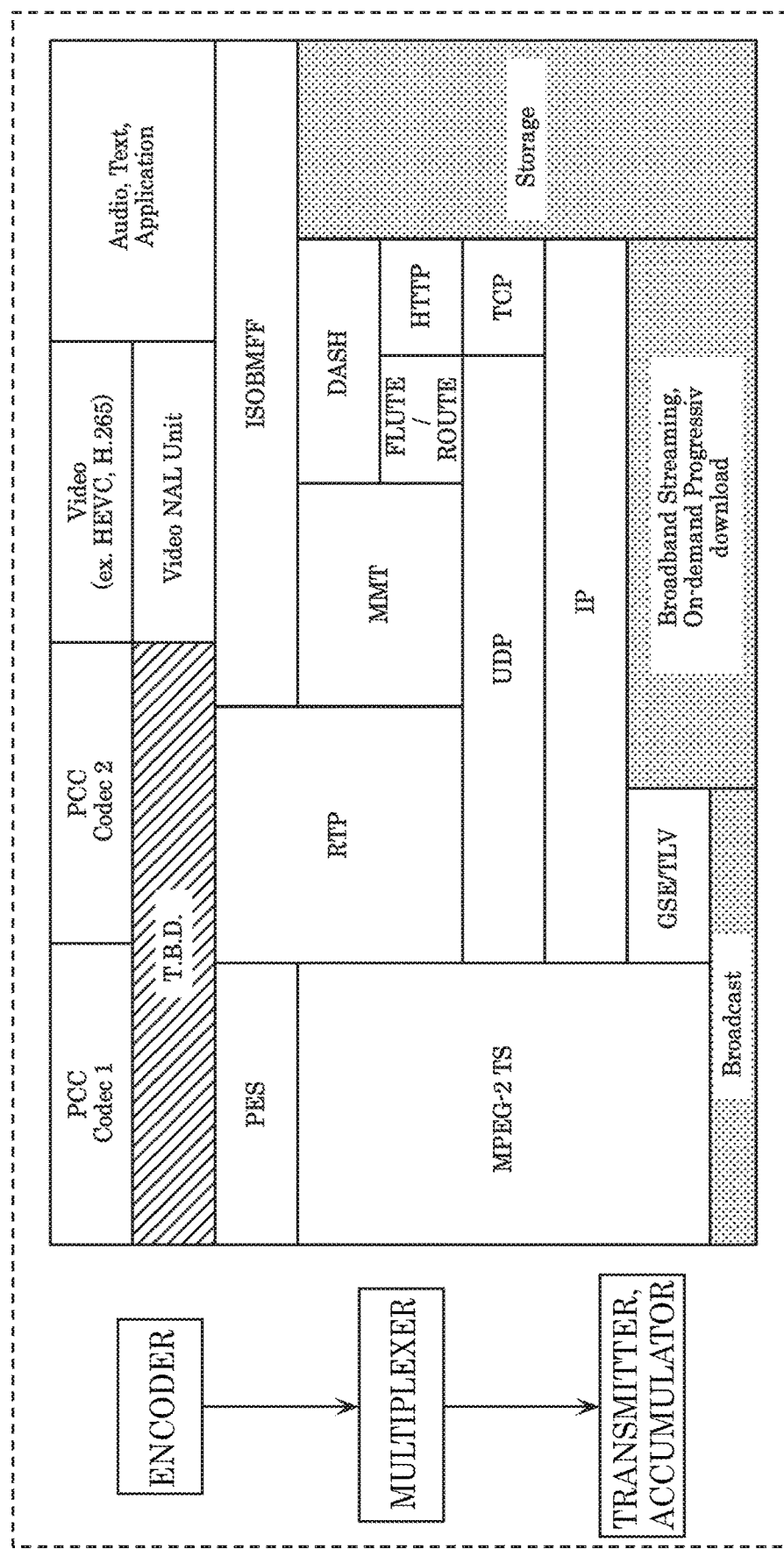
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

In the following, a way of defining a NAL unit according to this embodiment will be described. For example, with a conventional codec, such as HEVC, a NAL unit in one format is defined for one codec. However, there has been no method that supports a format that involves two codecs, that is, the first encoding method and the second encoding method, such as PCC (such a codec will be referred to as a PCC codec, hereinafter).

First, encoder 4670 having the functions of both first encoder 4630 and second encoder 4650 described above and decoder 4680 having the functions of both first decoder 4640 and second decoder 4660 described above will be described.

Figure 14:
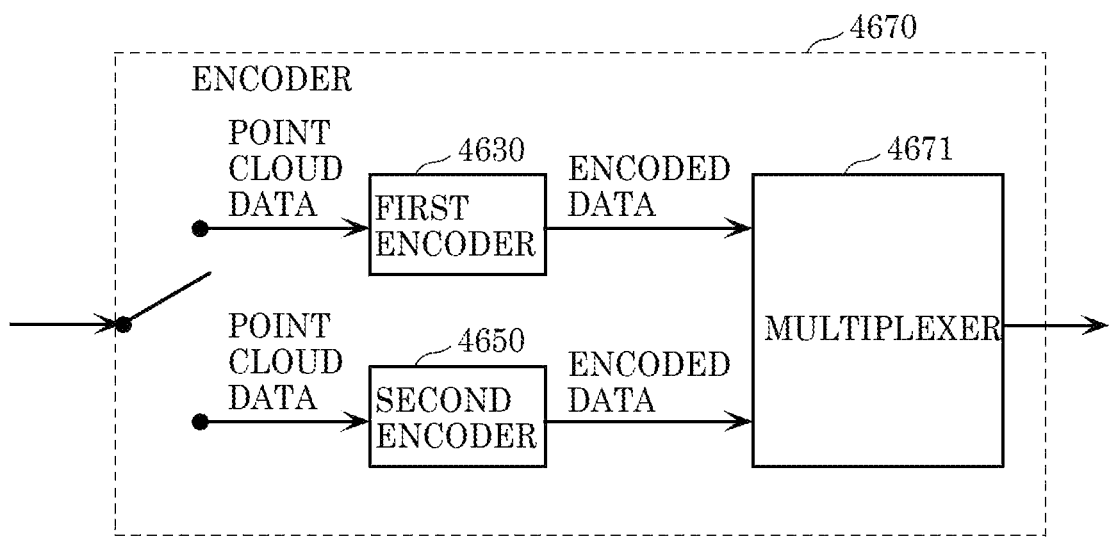
FIG. 14 is a block diagram of an encoder according to Embodiment 1.

FIG. 14 is a block diagram showing encoder 4670 according to this embodiment. Encoder 4670 includes first encoder 4630 and second encoder 4650 described above and multiplexer 4671. Multiplexer 4671 multiplexes encoded data generated by first encoder 4630 and encoded data generated by second encoder 4650, and outputs the resulting encoded data.

Figure 15:
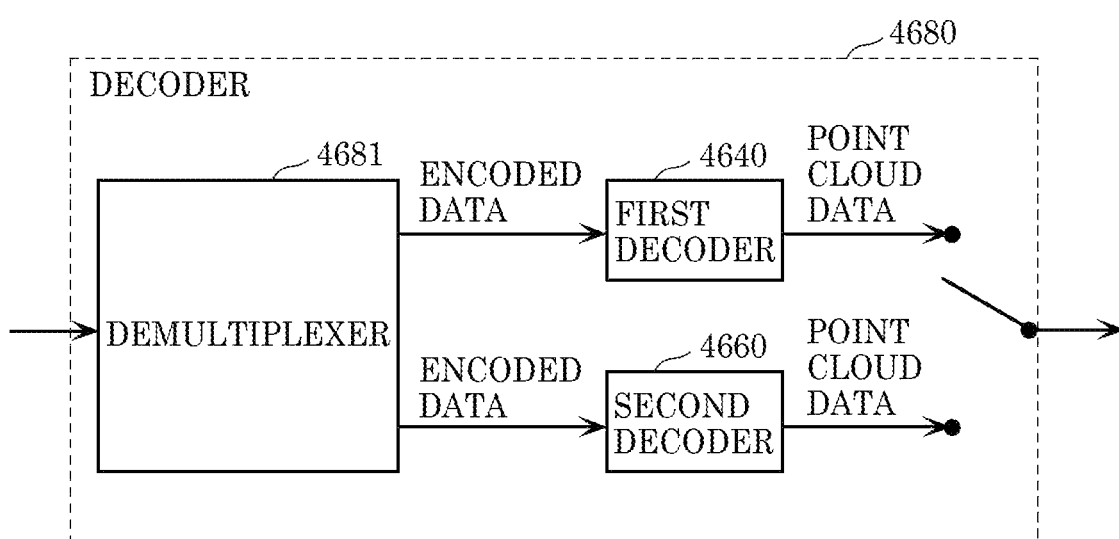
FIG. 15 is a block diagram of a decoder according to Embodiment 1.

FIG. 15 is a block diagram showing decoder 4680 according to this embodiment. Decoder 4680 includes first decoder 4640 and second decoder 4660 described above and demultiplexer 4681. Demultiplexer 4681 extracts encoded data generated using the first encoding method and encoded data generated using second encoding method from the input encoded data. Demultiplexer 4681 outputs the encoded data generated using the first encoding method to first decoder 4640, and outputs the encoded data generated using the second encoding method to second decoder 4660.

With the configuration described above, encoder 4670 can encode point cloud data by selectively using the first encoding method or the second encoding method. Decoder 4680 can decode encoded data encoded using the first encoding method, encoded data using the second encoding method, and encoded data encoded using both the first encoding method and the second encoding method.

For example, encoder 4670 may change the encoding method (between the first encoding method and the second encoding method) on a point-cloud-data basis or on a frame basis. Alternatively, encoder 4670 may change the encoding method on the basis of an encodable unit.

For example, encoder 4670 generates encoded data (encoded stream) including the identification information for a PCC codec.

Demultiplexer 4681 in decoder 4680 identifies data using the identification information for a PCC codec, for example. When the data is data encoded in the first encoding method, demultiplexer 4681 outputs the data to first decoder 4640. When the data is data encoded in the second encoding method, demultiplexer 4681 outputs the data to second decoder 4660.

Encoder 4670 may transmit, as the control information, information indicating whether both the encoding methods are used or any one of the encoding methods is used, in addition to the identification information for the PCC codec.

Figure 16:
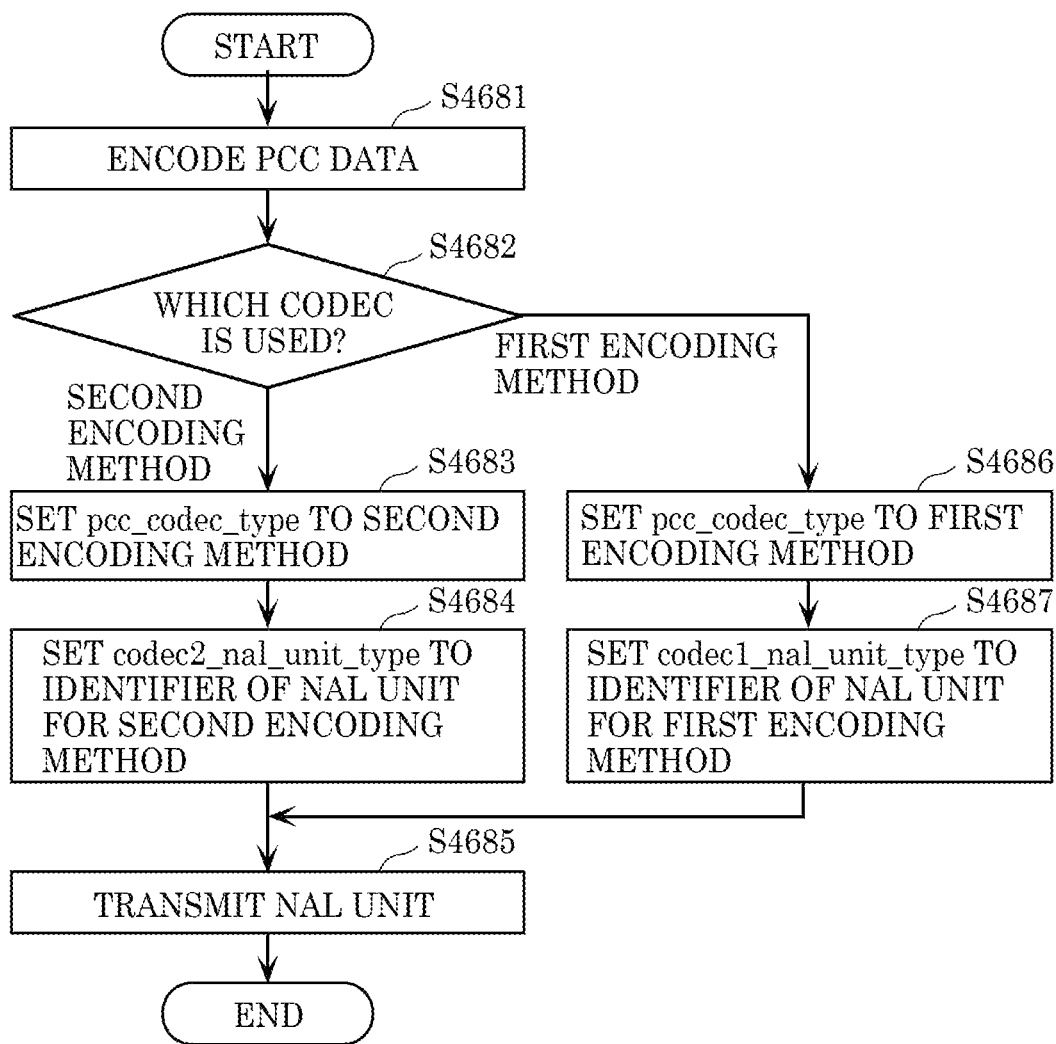
FIG. 16 is a flowchart of encoding processing according to Embodiment 1.

Next, an encoding process according to this embodiment will be described. FIG. 16 is a flowchart showing an encoding process according to this embodiment. Using the identification information for a PCC codec allows an encoding process ready for a plurality of codecs.

First, encoder 4670 encodes PCC data in both or one of the codecs, that is, the first encoding method and the second encoding method (S4681).

When the codec used is the second encoding method (if "second encoding method" in S4682), encoder 4670 sets pcc_codec_type in the NAL unit header to a value that indicates that data included in the payload of the NAL unit is data encoded in the second encoding method (S4683). Encoder 4670 then sets pcc_nal_unit_type in the NAL unit header to the identifier of the NAL unit for the second encoding method (S4684). Encoder 4670 then generates a NAL unit having the set NAL unit header and including the encoded data in the payload. Encoder 4670 then transmits the generated NAL unit (S4685).

On the other hand, when the codec used is the first encoding method (if "first encoding method" in S4682), encoder 4670 sets pcc_codec_type in the NAL unit header to a value that indicates that data included in the payload of the NAL unit is data encoded in the first encoding method (S4686). Encoder 4670 then sets pcc_nal_unit_type in the NAL unit header to the identifier of the NAL unit for the first encoding method (S4687). Encoder 4670 then generates a NAL unit having the set NAL unit header and including the encoded data in the payload. Encoder 4670 then transmits the generated NAL unit (S4685).

Figure 17:
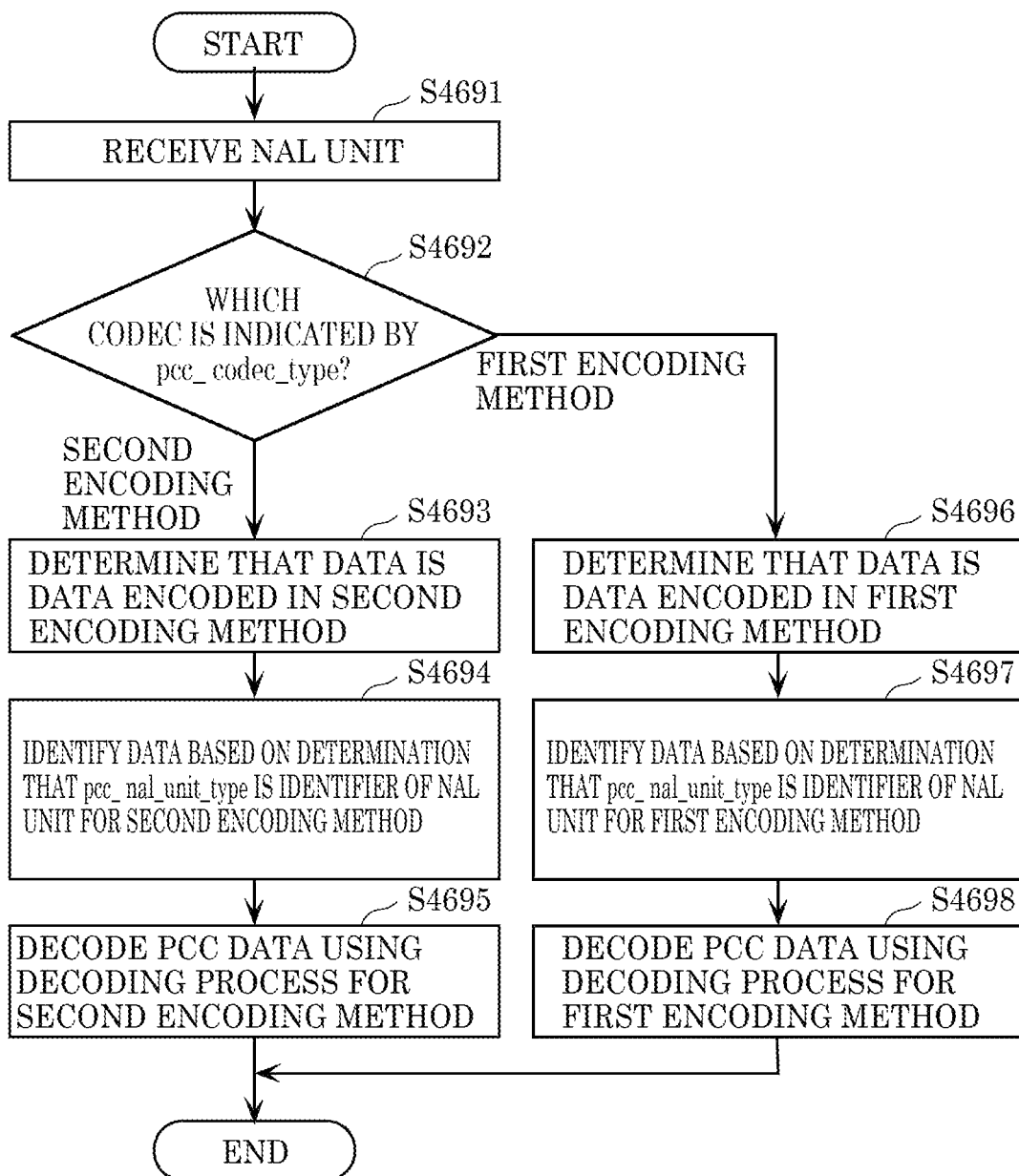
FIG. 17 is a flowchart of decoding processing according to Embodiment 1.

Next, a decoding process according to this embodiment will be described. FIG. 17 is a flowchart showing a decoding process according to this embodiment. Using the identification information for a PCC codec allows a decoding process ready for a plurality of codecs.

First, decoder 4680 receives a NAL unit (S4691). For example, the NAL unit is the NAL unit generated in the process by encoder 4670 described above.

Decoder 4680 then determines whether pec_codec_type in the NAL unit header indicates the first encoding method or the second encoding method (S4692).

When pcc_codec_type indicates the second encoding method (if "second encoding method" in S4692), decoder 4680 determines that the data included in the payload of the NAL unit is data encoded in the second encoding method (S4693). Decoder 4680 then identifies the data based on the determination that pcc_nal_unit_type in the NAL unit header is the identifier of the NAL unit for the second encoding method (S4694). Decoder 4680 then decodes the PCC data in a decoding process for the second encoding method (S4695).

On the other hand, when pec_codec_type indicates the first encoding method (if "first encoding method" in S4692), decoder 4680 determines that the data included in the payload of the NAL unit is data encoded in the first encoding method (S4696). Decoder 4680 then identifies the data based on the determination that pcc_nal_unit_type in the NAL unit header is the identifier of the NAL unit for the first encoding method (S4697). Decoder 4680 then decodes the PCC data in a decoding process for the first encoding method (S4698).

As described above, the three-dimensional data encoding device according to an aspect of the present disclosure generates an encoded stream by encoding three-dimensional data (point cloud data, for example), and stores information indicating the encoding method used for the encoding among the first encoding method and the second encoding method (identification information for the codec, for example) in the control information (a parameter set, for example) for the encoded stream.

With such a configuration, the three-dimensional data decoding device can determine the encoding method used for the encoding from the information stored in the control information, when decoding the encoded stream generated by the three-dimensional data encoding device. Therefore, the three-dimensional data decoding device can correctly decode the encoded stream even when a plurality of encoding methods are used.

The three-dimensional data includes geometry information, for example. In the encoding described above, the three-dimensional data encoding device encodes the geometry information. In the storage described above, the three-dimensional data encoding device stores the information indicating the encoding method used for the encoding of the geometry information among the first encoding method and the second encoding method in the control information for the geometry information.

The three-dimensional data includes geometry information and attribute information, for example. In the encoding described above, the three-dimensional data encoding device encodes the geometry information and the attribute information. In the storage described above, the three-dimensional data encoding device stores the information indicating the encoding method used for the encoding of the geometry information among the first encoding method and the second encoding method in the control information for the geometry information, and stores the information indicating the encoding method used for the encoding of the attribute information among the first encoding method and the second encoding method in the control information for the attribute information.

With such a configuration, different encoding methods can be used for the geometry information and the attribute information, and therefore, the coding efficiency can be improved.

For example, the three-dimensional data encoding method further includes storing the encoded stream in one or more units (NAL units, for example).

For example, the unit includes information (pcc_nal_unit_type, for example) indicating the type of data included in the unit that has a format that is common to the first encoding method and the second encoding method and is independently defined for the first encoding method and the second encoding method.

For example, the unit includes information (codec1_nal_unit_type or codec2_nal_unit_type, for example) indicating the type of data included in the unit that has different formats for the first encoding method and the second encoding method and is independently defined for the first encoding method and the second encoding method.

For example, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data encoding device includes a processor and a memory, and the processor performs the processes described above using the memory.

The three-dimensional data decoding device according to this embodiment determines the encoding method used for encoding of an encoded stream obtained by encoding of three-dimensional data based on the information indicating the encoding method used for the encoding of the three-dimensional data among the first encoding method and the second encoding method (identification information for the codec, for example) included in the control information (a parameter set, for example) for the encoded stream, and decodes the encoded stream using the determined encoding method.

With such a configuration, the three-dimensional data decoding device can determine the encoding method used for the encoding from the information stored in the control information, when decoding the encoded stream. Therefore, the three-dimensional data decoding device can correctly decode the encoded stream even when a plurality of encoding methods are used.

The three-dimensional data includes geometry information, and the encoded stream includes encoded data of the geometry information, for example. In the determination described above, the three-dimensional data decoding device determines the encoding method used for the encoding of the geometry information based on the information indicating the encoding method used for the encoding of the geometry information among the first encoding method and the second encoding method included in the control information for the geometry information included in the encoded stream. In the decoding described above, the three-dimensional data decoding device decodes the encoded data of the geometry information using the determined encoding method used for the encoding of the geometry information.

The three-dimensional data includes geometry information and attribute information, and the encoded stream includes encoded data of the geometry information and encoded data of the attribute information, for example. In the determination described above, the three-dimensional data decoding device determines the encoding method used for the encoding of the geometry information based on the information indicating the encoding method used for the encoding of the geometry information among the first encoding method and the second encoding method included in the control information for the geometry information included in the encoded stream, and determines the encoding method used for the encoding of the attribute information based on the information indicating the encoding method used for the encoding of the attribute information among the first encoding method and the second encoding method included in the control information for the attribute information included in the encoded stream. In the decoding described above, the three-dimensional data decoding device decodes the encoded data of the geometry information using the determined encoding method used for the encoding of the geometry information, and decodes the encoded data of the attribute information using the determined encoding method used for the encoding of the attribute information.

With such a configuration, different encoding methods can be used for the geometry information and the attribute information, and therefore, the coding efficiency can be improved.

For example, the encoded stream is stored in one or more units (NAL units, for example), and the three-dimensional data decoding device further obtains the encoded stream from the one or more units.

For example, the unit includes information (pcc_nal_unit_ type, for example) indicating the type of data included in the unit that has a format that is common to the first encoding method and the second encoding method and is independently defined for the first encoding method and the second encoding method.

For example, the unit includes information (codec1_nal_unit_type or codec2_nal_unit_type, for example) indicating the type of data included in the unit that has different formats for the first encoding method and the second encoding method and is independently defined for the first encoding method and the second encoding method.

For example, the unit includes information (pcc_nal_unit_type, for example) indicating the type of data included in the unit that has a format that is common to the first encoding method and the second encoding method and is commonly defined for the first encoding method and the second encoding method.

For example, the three-dimensional data decoding device includes a processor and a memory, and the processor performs the processes described above using the memory.

Embodiment 2

In Embodiment 2, a method of storing the NAL unit in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

FIG. 18 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

FIG. 19 is a diagram showing a protocol stack in a case where a common PCC codec NAL unit in an ISOBMFF file. Here, a common PCC codec NAL unit is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Figure 20:
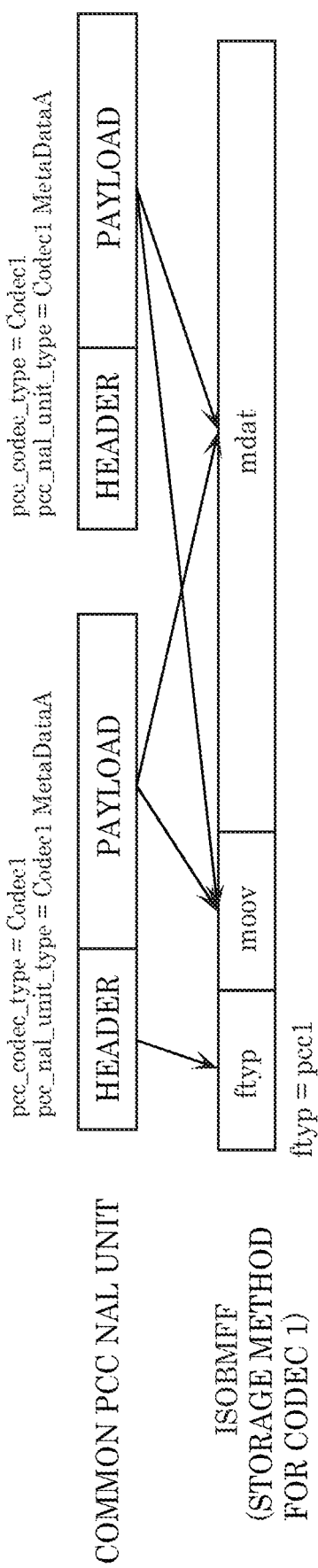
FIG. 20 is a diagram illustrating an example where a NAL unit is stored in a file for codec 1 according to Embodiment 2.
Figure 21:
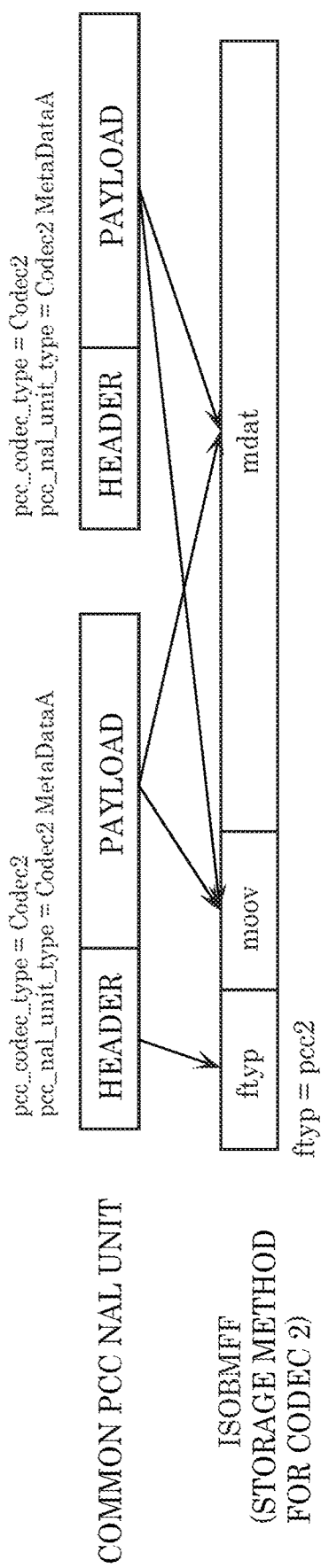
FIG. 21 is a diagram illustrating an example where a NAL unit is stored in a file for codec 2 according to Embodiment 2.

Next, a method of storing a common PCC NAL unit that supports a plurality of PCC codecs in an ISOBMFF file will be described. FIG. 20 is a diagram showing an example in which a common PCC NAL unit is stored in an ISOBMFF file for the storage method for codec 1 (Carriage of Codec1). FIG. 21 is a diagram showing an example in which a common PCC NAL unit is stored in an ISOBMFF file for the storage method for codec 2 (Carriage of Codec2).

Here, ftyp is information that is important for identification of the file format, and a different identifier of ftyp is defined for each codec. When PCC-encoded data encoded in the first encoding method (encoding scheme) is stored in the file, ftyp is set to pcc1. When PCC-encoded data encoded in the second encoding method is stored in the file, ftyp is set to pcc2.

Here, pcc1 indicates that PCC codec 1 (first encoding method) is used. pcc2 indicates that PCC codec2 (second encoding method) is used. That is, pcc1 and pcc2 indicate that the data is PCC (encoded three-dimensional data (point cloud data)), and indicate the PCC codec (first encoding method or second encoding method).

In the following, a method of storing a NAL unit in an ISOBMFF file will be described. The multiplexer analyzes the NAL unit header, and describes pcc1 in ftyp of ISOBMFF if pcc_codec_type=Codec1.

The multiplexer analyzes the NAL unit header, and describes pcc2 in ftyp of ISOBMFF if pcc_codec_type=Codec2.

If pcc_nal_unit_type is metadata, the multiplexer stores the NAL unit in moov or mdat in a predetermined manner, for example. If pcc_nal_unit_type is data, the multiplexer stores the NAL unit in moov or mdat in a predetermined manner, for example.

For example, the multiplexer may store the NAL unit size in the NAL unit, as with HEVC.

According to this storage method, the demultiplexer (a system layer) can determine whether the PCC-encoded data is encoded in the first encoding method or the second encoding method by analyzing ftyp included in the file. Furthermore, as described above, by determining whether the PCC-encoded data is encoded in the first encoding method or the second encoding method, the encoded data encoded in any one of the encoding methods can be extracted from the data including both the encoded data encoded in the encoding methods. Therefore, when transmitting the encoded data, the amount of data transmitted can be reduced. In addition, according to this storage method, different data (file) formats do not need to be set for the first encoding method and the second encoding method, and a common data format can be used for the first encoding method and the second encoding method.

Note that, when the identification information for the codec, such as ftyp of ISOBMFF, is indicated in the metadata of the system layer, the multiplexer can store a NAL unit without pcc_nal_unit_type in the ISOBMFF file.

Next, configurations and operations of the multiplexer of the three-dimensional data encoding system (three-dimensional data encoding device) according to this embodiment and the demultiplexer of the three-dimensional data decoding system (three-dimensional data decoding device) according to this embodiment will be described.

Figure 22:
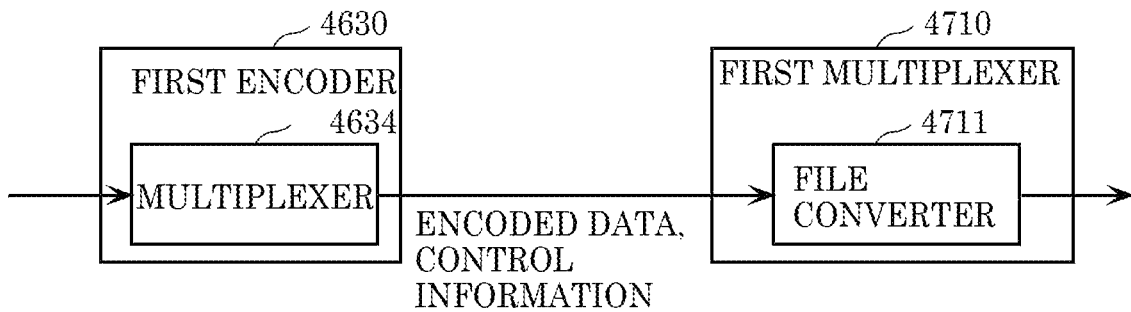
FIG. 22 is a diagram illustrating a structure of a first multiplexer according to Embodiment 2.

FIG. 22 is a diagram showing a configuration of first multiplexer 4710. First multiplexer 4710 includes file converter 4711 that generates multiplexed data (file) by storing encoded data generated by first encoder 4630 and control information (NAL unit) in an ISOBMFF file. First multiplexer 4710 is included in multiplexer 4614 shown in FIG. 1, for example.

Figure 23:
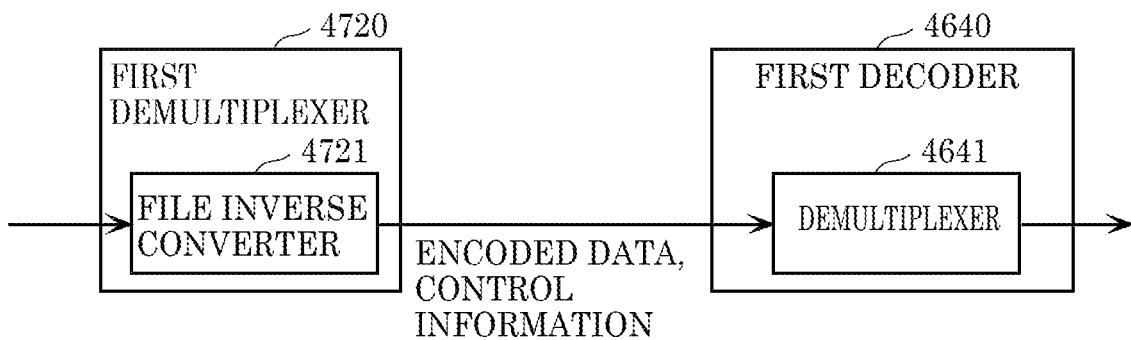
FIG. 23 is a diagram illustrating a structure of a first demultiplexer according to Embodiment 2.

FIG. 23 is a diagram showing a configuration of first demultiplexer 4720. First demultiplexer 4720 includes file inverse converter 4721 that obtains encoded data and control information (NAL unit) from multiplexed data (file) and outputs the obtained encoded data and control information to first decoder 4640. First demultiplexer 4720 is included in demultiplexer 4623 shown in FIG. 1, for example.

Figure 24:
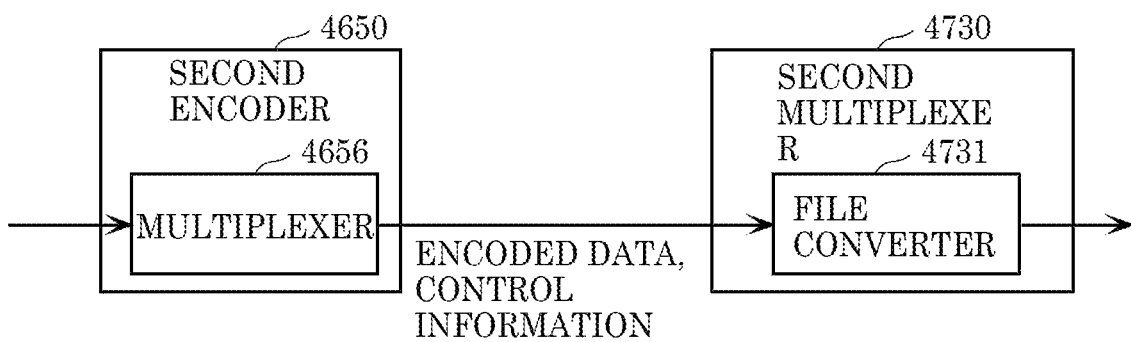
FIG. 24 is a diagram illustrating a structure of a second multiplexer according to Embodiment 2.

FIG. 24 is a diagram showing a configuration of second multiplexer 4730. Second multiplexer 4730 includes file converter 4731 that generates multiplexed data (file) by storing encoded data generated by second encoder 4650 and control information (NAL unit) in an ISOBMFF file. Second multiplexer 4730 is included in multiplexer 4614 shown in FIG. 1, for example.

Figure 25:
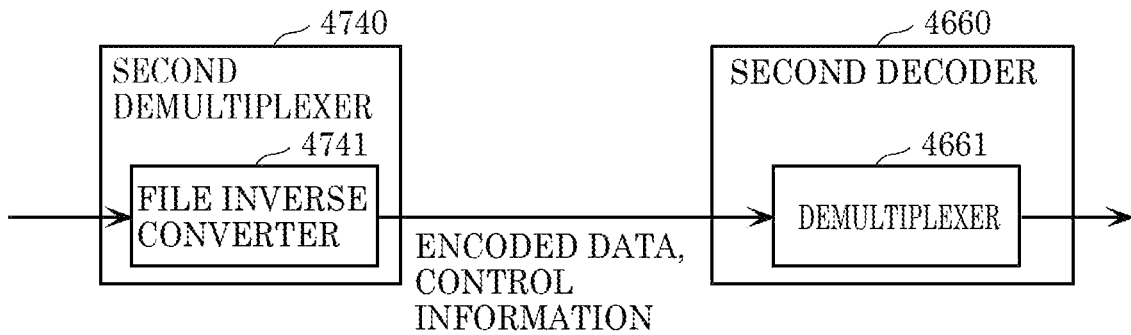
FIG. 25 is a diagram illustrating a structure of a second demultiplexer according to Embodiment 2.

FIG. 25 is a diagram showing a configuration of second demultiplexer 4740. Second demultiplexer 4740 includes file inverse converter 4741 that obtains encoded data and control information (NAL unit) from multiplexed data (file) and outputs the obtained encoded data and control information to second decoder 4660. Second demultiplexer 4740 is included in demultiplexer 4623 shown in FIG. 1, for example.

Figure 26:
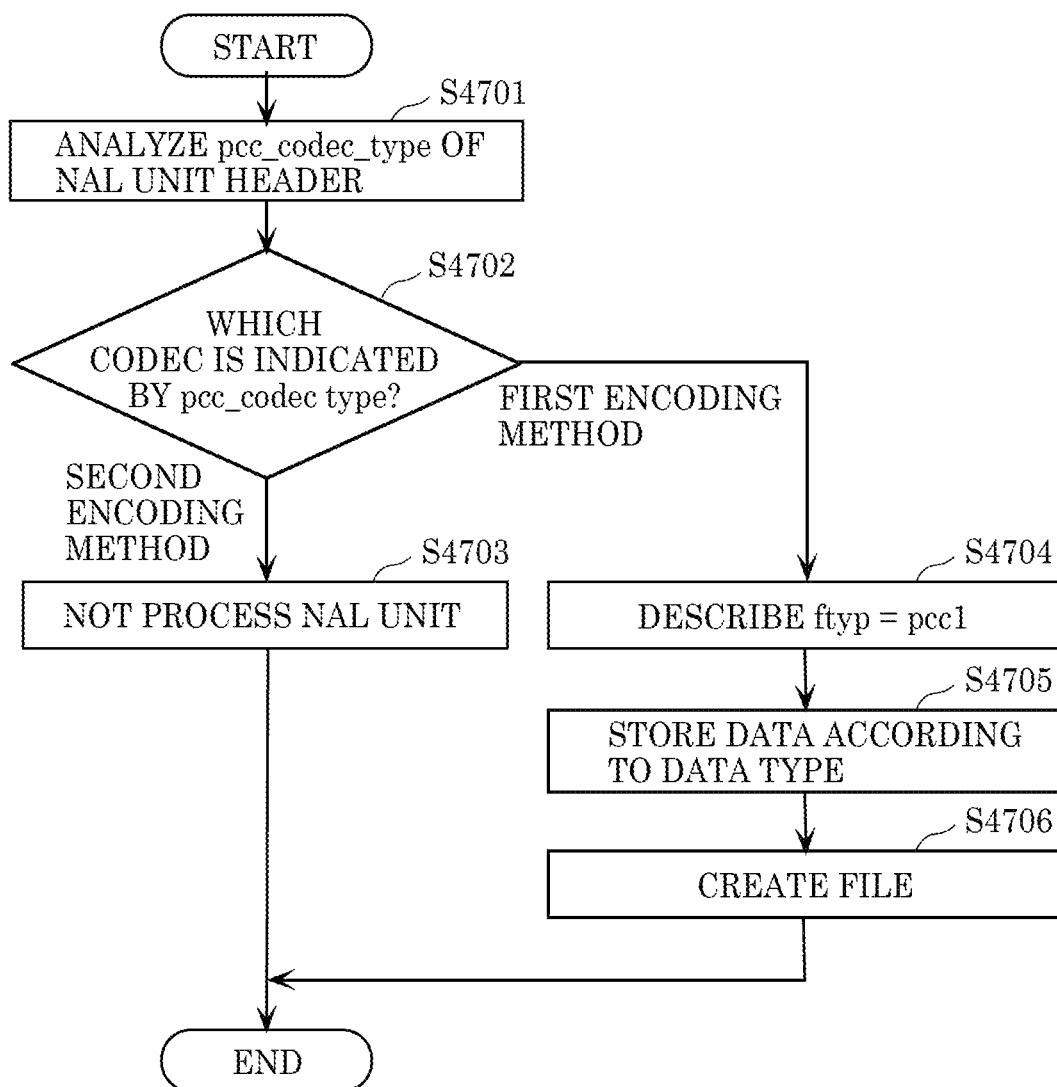
FIG. 26 is a flowchart of processing performed by the first multiplexer according to Embodiment 2.

FIG. 26 is a flowchart showing a multiplexing process by first multiplexer 4710. First, first multiplexer 4710 analyzes pcc_codec_type in the NAL unit header, thereby determining whether the codec used is the first encoding method or the second encoding method (S4701).

When pec_codec_type represents the second encoding method (if "second encoding method" in S4702), first multiplexer 4710 does not process the NAL unit (S4703).

On the other hand, when pcc_codec_type represents the first encoding method (if "first encoding method" in S4702), first multiplexer 4710 describes pcc1 in ftyp (S4704). That is, first multiplexer 4710 describes information indicating that data encoded in the first encoding method is stored in the file in ftyp.

First multiplexer 4710 then analyzes pcc_nal_unit_type in the NAL unit header, and stores the data in a box (moov or mdat, for example) in a predetermined manner suitable for the data type represented by pcc_nal_unit_type (S4705). First multiplexer 4710 then creates an ISOBMFF file including the ftyp described above and the box described above (S4706).

Figure 27:
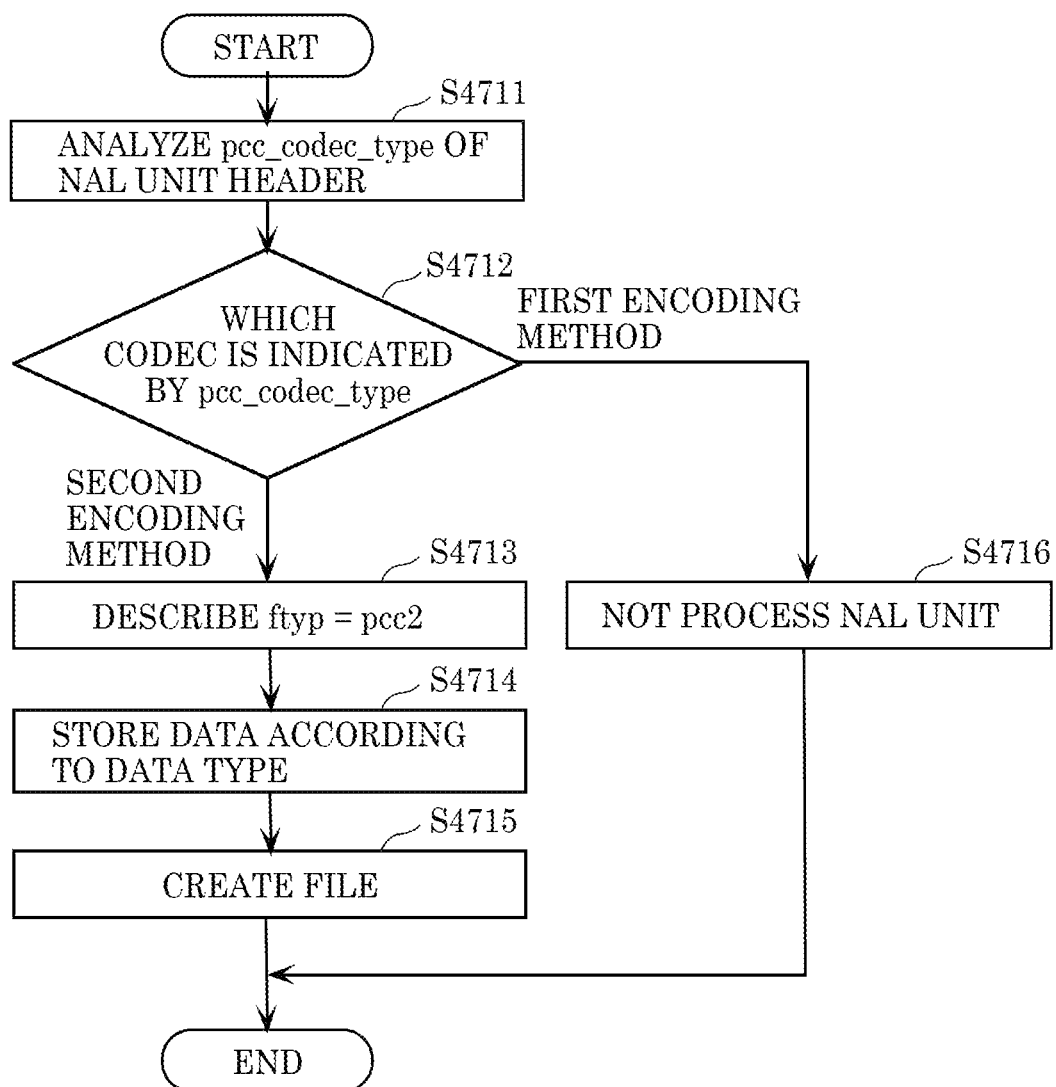
FIG. 27 is a flowchart of processing performed by the second multiplexer according to Embodiment 2.

FIG. 27 is a flowchart showing a multiplexing process by second multiplexer 4730. First, second multiplexer 4730 analyzes pcc_codec_type in the NAL unit header, thereby determining whether the codec used is the first encoding method or the second encoding method (S4711).

When pcc_codec_type represents the second encoding method (if "second encoding method" in S4712), second multiplexer 4730 describes pcc2 in ftyp (S4713). That is, second multiplexer 4730 describes information indicating that data encoded in the second encoding method is stored in the file in ftyp.

Second multiplexer 4730 then analyzes pcc_nal_unit_type in the NAL unit header, and stores the data in a box (moov or mdat, for example) in a predetermined manner suitable for the data type represented by pcc_nal_unit_type (S4714). Second multiplexer 4730 then creates an ISOBMFF file including the ftyp described above and the box described above (S4715).

On the other hand, when pcc_codec_type represents the first encoding method (if "first encoding method" in S4712), second multiplexer 4730 does not process the NAL unit (S4716).

Note that the process described above is an example in which PCC data is encoded in any one of the first encoding method and the second encoding method. First multiplexer 4710 and second multiplexer 4730 store a desired NAL unit in a file by identifying the codec type of the NAL unit. Note that, when the identification information for the PCC codec is included in a location other than the NAL unit header, first multiplexer 4710 and second multiplexer 4730 may identify the codec type (first encoding method or second encoding method) based on the identification information for the PCC codec included in the location other than the NAL unit header in step S4701 or S4711.

When storing data in a file in step S4706 or S4714, first multiplexer 4710 and second multiplexer 4730 may store the data in the file after deleting pcc_nal_unit_type from the NAL unit header.

Figure 28:
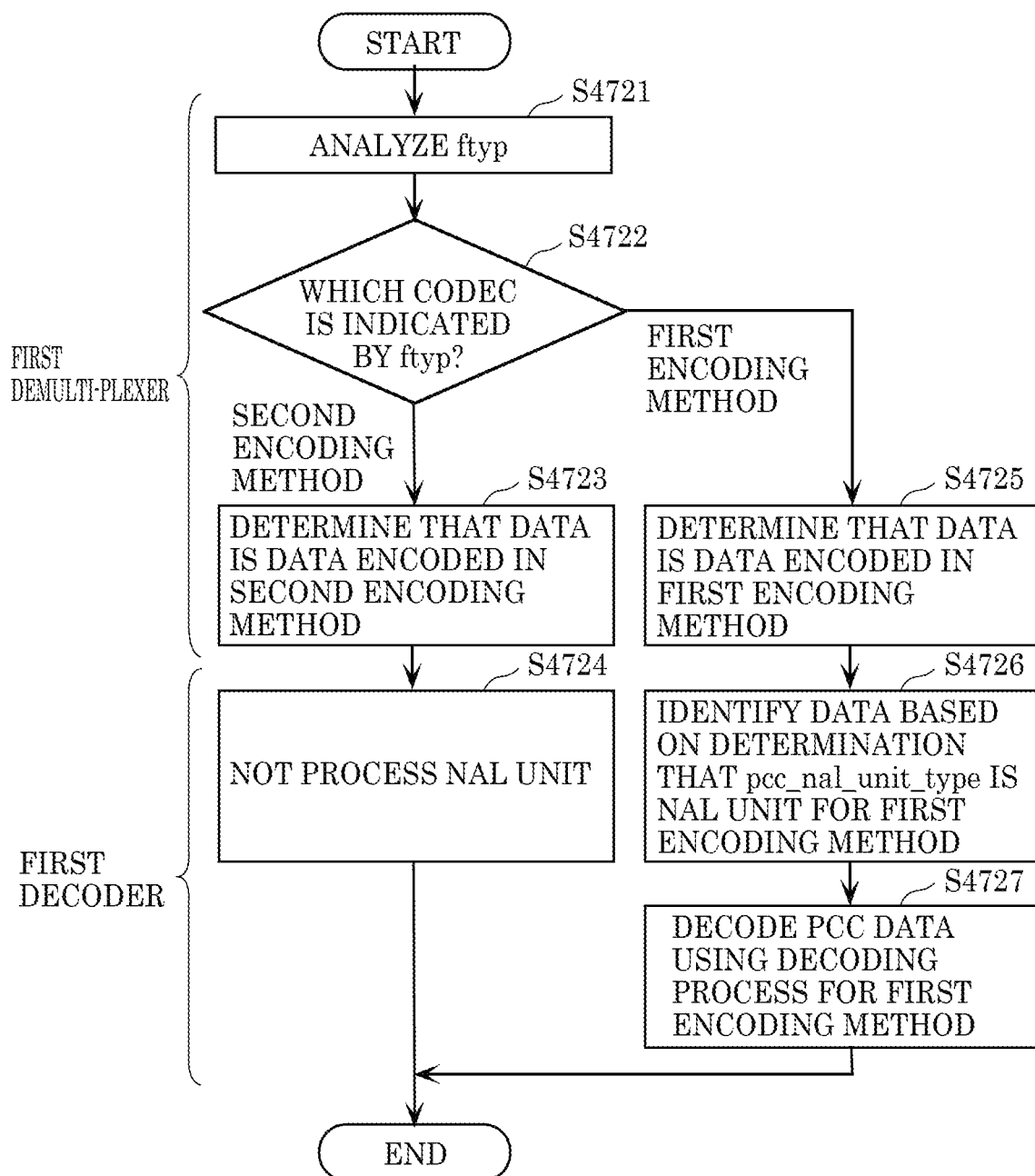
FIG. 28 is a flowchart of processing performed by the first demultiplexer and the first decoder according to Embodiment 2.

FIG. 28 is a flowchart showing a process performed by first demultiplexer 4720 and first decoder 4640. First, first demultiplexer 4720 analyzes ftyp in an ISOBMFF file (S4721). When the codec represented by ftyp is the second encoding method (pcc2) (if "second encoding method" in S4722), first demultiplexer 4720 determines that the data included in the payload of the NAL unit is data encoded in the second encoding method (S4723). First demultiplexer 4720 also transmits the result of the determination to first decoder 4640. First decoder 4640 does not process the NAL unit (S4724).

On the other hand, when the codec represented by ftyp is the first encoding method (pcc1) (if "first encoding method" in S4722), first demultiplexer 4720 determines that the data included in the payload of the NAL unit is data encoded in the first encoding method (S4725). First demultiplexer 4720 also transmits the result of the determination to first decoder 4640.

First decoder 4640 identifies the data based on the determination that pcc_nal_unit_type in the NAL unit header is the identifier of the NAL unit for the first encoding method (S4726). First decoder 4640 then decodes the PCC data using a decoding process for the first encoding method (S4727).

Figure 29:
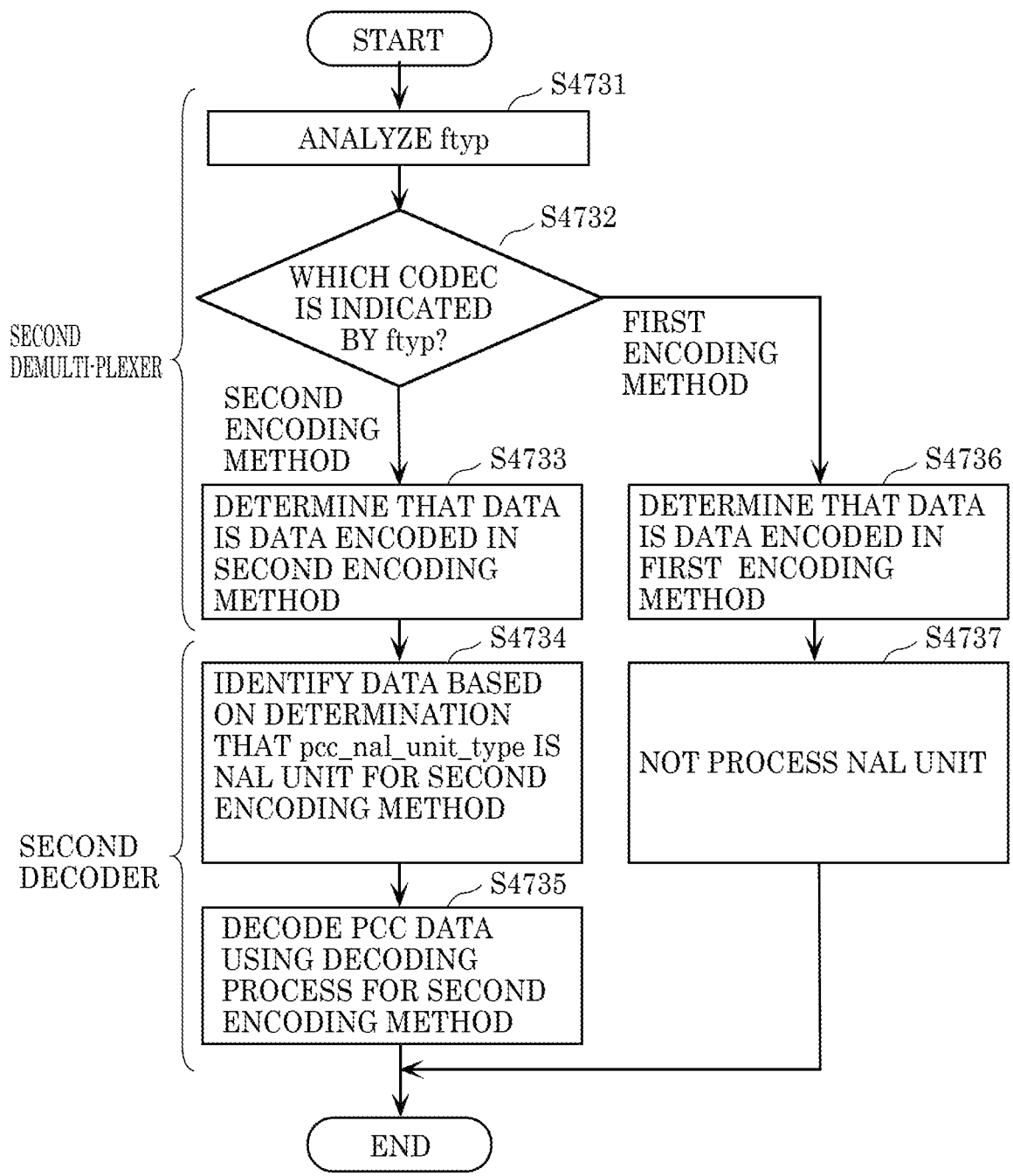
FIG. 29 is a flowchart of processing performed by the second demultiplexer and the second decoder according to Embodiment 2.

FIG. 29 is a flowchart showing a process performed by second demultiplexer 4740 and second decoder 4660. First, second demultiplexer 4740 analyzes ftyp in an ISOBMFF file (S4731). When the codec represented by ftyp is the second encoding method (pcc2) (if "second encoding method" in S4732), second demultiplexer 4740 determines that the data included in the payload of the NAL unit is data encoded in the second encoding method (S4733). Second demultiplexer 4740 also transmits the result of the determination to second decoder 4660.

Second decoder 4660 identifies the data based on the determination that pcc_nal_unit_type in the NAL unit header is the identifier of the NAL unit for the second encoding method (S4734). Second decoder 4660 then decodes the PCC data using a decoding process for the second encoding method (S4735).

On the other hand, when the codec represented by ftyp is the first encoding method (pcc1) (if "first encoding method" in S4732), second demultiplexer 4740 determines that the data included in the payload of the NAL unit is data encoded in the first encoding method (S4736). Second demultiplexer 4740 also transmits the result of the determination to second decoder 4660. Second decoder 4660 does not process the NAL unit (S4737).

As described above, for example, since the codec type of the NAL unit is identified in first demultiplexer 4720 or second demultiplexer 4740, the codec type can be identified in an early stage. Furthermore, a desired NAL unit can be input to first decoder 4640 or second decoder 4660, and an unwanted NAL unit can be removed. In this case, the process of first decoder 4640 or second decoder 4660 analyzing the identification information for the codec may be unnecessary. Note that a process of referring to the NAL unit type again and analyzing the identification information for the codec may be performed by first decoder 4640 or second decoder 4660.

Furthermore, if pcc_nal_unit_type is deleted from the NAL unit header by first multiplexer 4710 or second multiplexer 4730, first demultiplexer 4720 or second demultiplexer 4740 can output the NAL unit to first decoder 4640 or second decoder 4660 after adding pcc_nal_unit_type to the NAL unit.

Embodiment 3

Figure 30:
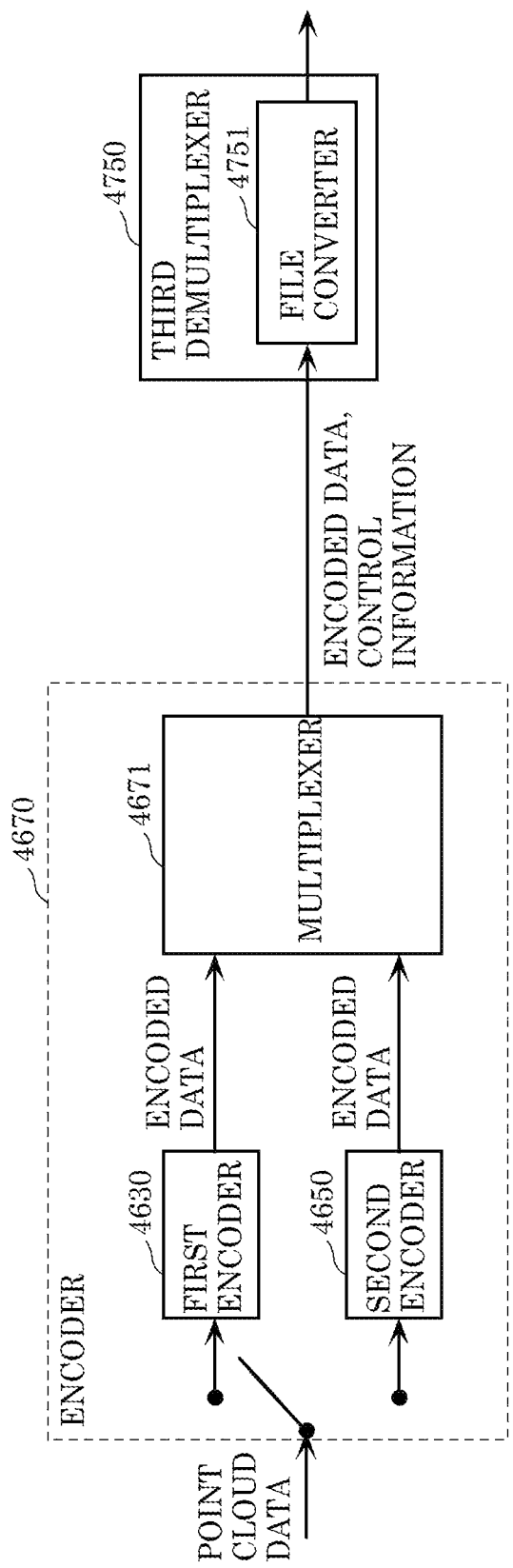
FIG. 30 is a diagram illustrating structures of an encoder and a third multiplexer according to Embodiment 3.

In Embodiment 3, a multiplexer and a demultiplexer that correspond to encoder 4670 and decoder 4680 ready for a plurality of codecs described above with regard to Embodiment 1 will be described. FIG. 30 is a diagram showing configurations of encoder 4670 and third multiplexer 4750 according to this embodiment.

Encoder 4670 encodes point cloud data in both or one of the first encoding method and the second encoding method. Encoder 4670 may change the encoding method (between the first encoding method and the second encoding method) on a point-cloud-data basis or on a frame basis. Alternatively, encoder 4670 may change the encoding method on the basis of an encodable unit.

Encoder 4670 generates encoded data (encoded stream) including the identification information for a PCC codec.

Third multiplexer 4750 includes file converter 4751. File converter 4751 converts a NAL unit output from encoder 4670 into a PCC data file. File converter 4751 analyzes the codec identification information included in the NAL unit header, and determines whether the PCC-encoded data is data encoded in the first encoding method, data encoded in the second encoding method, or data encoded in both the encoding methods. File converter 4751 describes a brand name that allows codec identification in ftyp. For example, when indicating the data is encoded in both the encoding methods, pcc3 is described in ftyp.

Note that, when encoder 4670 describes the PCC codec identification information in a location other than the NAL unit, file converter 4751 may determine the PCC codec (encoding method) based on the identification information.

Figure 31:
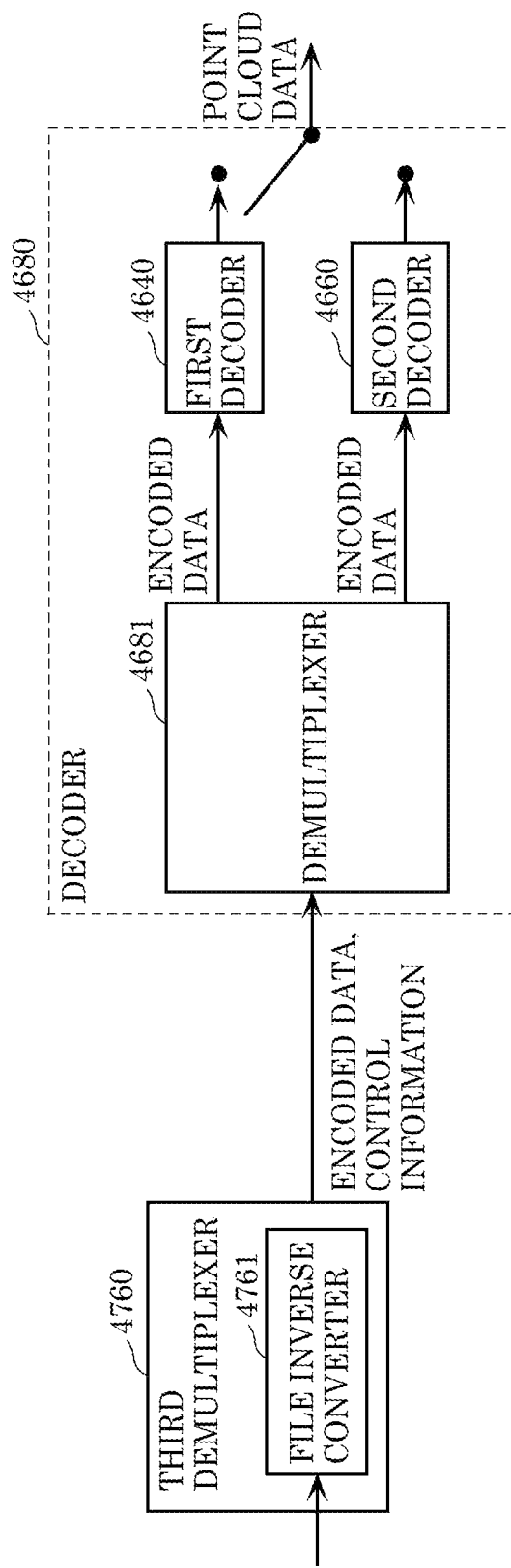
FIG. 31 is a diagram illustrating structures of a third demultiplexer and a decoder according to Embodiment 3.

FIG. 31 is a diagram showing configurations of third demultiplexer 4760 and decoder 4680 according to this embodiment.

Third demultiplexer 4760 includes file inverse converter 4761. File inverse converter 4761 analyzes ftyp included in a file, and determines whether the PCC-encoded data is data encoded in the first encoding method, data encoded in the second encoding method, or data encoded in both the encoding methods.

When the PCC-encoded data is data encoded in any one of the encoding methods, the data is input to an appropriate one of first decoder 4640 and second decoder 4660, and is not input to the other decoder. When the PCC-encoded data is data encoded in both the encoding methods, the data is input to decoder 4680 ready for both the encoding methods.

Decoder 4680 decodes the PCC-encoded data in both or one of the first encoding method and the second encoding method.

Figure 32:
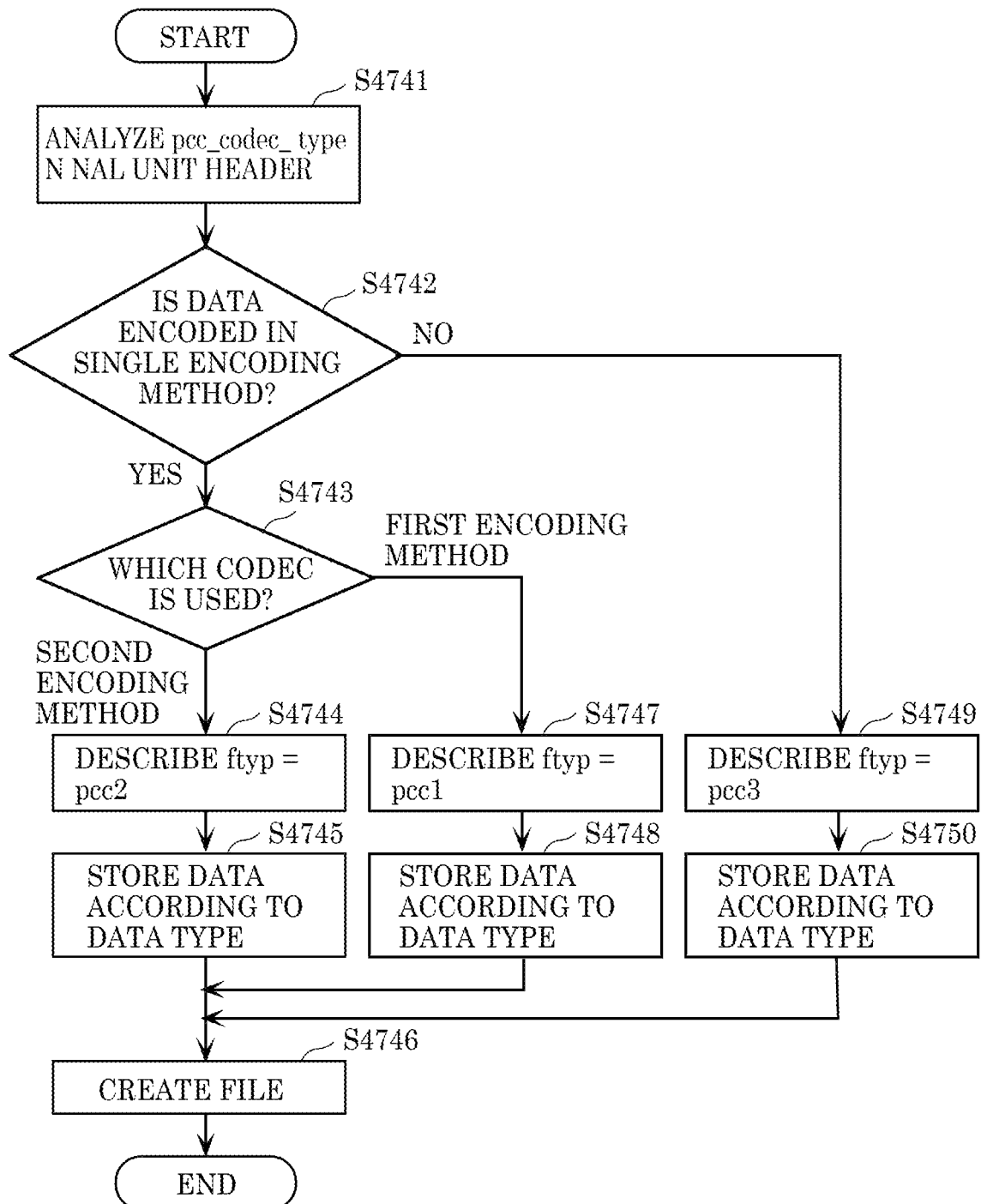
FIG. 32 is a flowchart of processing performed by the third multiplexer according to Embodiment 3.

FIG. 32 is a flowchart showing a process performed by third multiplexer 4750 according to this embodiment.

First, third multiplexer 4750 analyzes pcc_codec_type in the NAL unit header, thereby determining whether the codec(s) used is the first encoding method, the second encoding method, or both the first encoding method and the second encoding method (S4741).

When the second encoding method is used (if Yes in S4742 and "second encoding method" in S4743), third multiplexer 4750 describes pcc2 in ftyp (S4744). That is, third multiplexer 4750 describes information indicating that data encoded in the second encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4745). Third multiplexer 4750 then creates an ISOBMFF file including the ftyp described above and the box described above (S4746).

When the first encoding method is used (if Yes in S4742 and "first encoding method" in S4743), third multiplexer 4750 describes pcc1 in ftyp (S4747). That is, third multiplexer 4750 describes information indicating that data encoded in the first encoding method is stored in the file in ftyp.

Third multiplexer 4750 then analyzes pec_nal_unit_type in the NAL unit header, and stores the data in a box (moov or mdat, for example) in a predetermined manner suitable for the data type represented by pcc_nal_unit_type (S4748). Third multiplexer 4750 then creates an ISOBMFF file including the ftyp described above and the box described above (S4746).

When both the first encoding method and the second encoding method are used (if No in S4742), third multiplexer 4750 describes pcc3 in ftyp (S4749). That is, third multiplexer 4750 describes information indicating that data encoded in both the encoding methods is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4750). Third multiplexer 4750 then creates an ISOBMFF file including the ftyp described above and the box described above (S4746).

Figure 33:
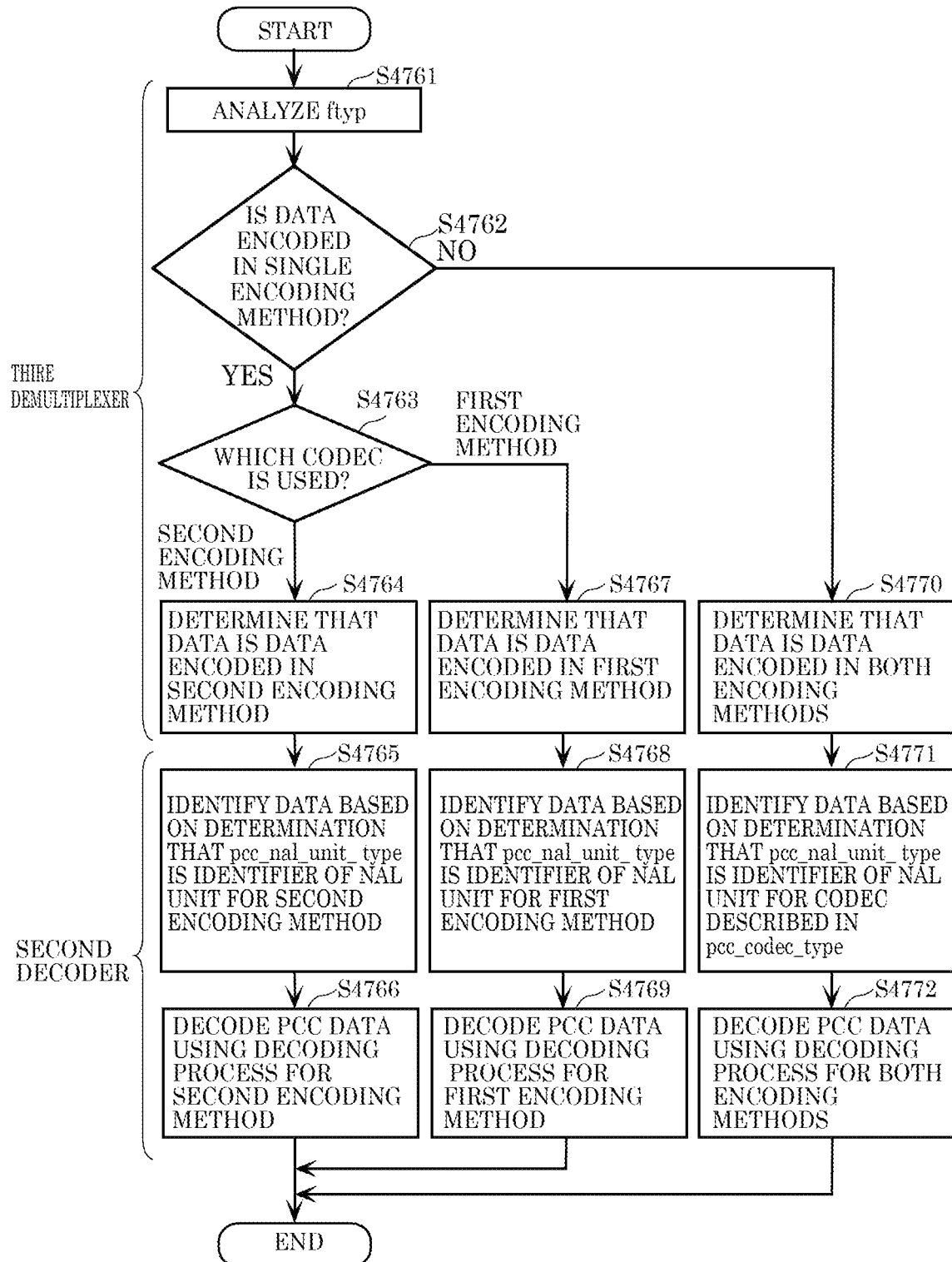
FIG. 33 is a flowchart of processing performed by the third demultiplexer and the decoder according to Embodiment 3.

FIG. 33 is a flowchart showing a process performed by third demultiplexer 4760 and decoder 4680. First, third demultiplexer 4760 analyzes ftyp included in an ISOBMFF file (S4761). When the codec represented by ftyp is the second encoding method (pcc2) (if Yes in S4762 and "second encoding method" in S4763), third demultiplexer 4760 determines that the data included in the payload of the NAL unit is data encoded in the second encoding method (S4764). Third demultiplexer 4760 also transmits the result of the determination to decoder 4680.

Decoder 4680 identifies the data based on the determination that pec_nal_unit_type in the NAL unit header is the identifier of the NAL unit for the second encoding method (S4765). Decoder 4680 then decodes the PCC data using a decoding process for the second encoding method (S4766).

When the codec represented by ftyp is the first encoding method (pcc1) (if Yes in S4762 and "first encoding method" in S4763), third demultiplexer 4760 determines that the data included in the payload of the NAL unit is data encoded in the first encoding method (S4767). Third demultiplexer 4760 also transmits the result of the determination to decoder 4680.

Decoder 4680 identifies the data based on the determination that pcc_nal_unit_type in the NAL unit header is the identifier of the NAL unit for the first encoding method (S4768). Decoder 4680 then decodes the PCC data using a decoding process for the first encoding method (S4769).

When ftyp indicates that both the encoding methods are used (pcc3) (if No in S4762), third demultiplexer 4760 determines that the data included in the payload of the NAL unit is data encoded in both the first encoding method and the second encoding method (S4770). Third demultiplexer 4760 also transmits the result of the determination to decoder 4680.

Decoder 4680 identifies the data based on the determination that pcc_nal_unit_type in the NAL unit header is the identifier of the NAL unit for the codecs described in pcc_codec_type (S4771). Decoder 4680 then decodes the PCC data using decoding processes for both the encoding methods (S4772). That is, decoder 4680 decodes the data encoded in the first encoding method using a decoding process for the first encoding method, and decodes the data encoded in the second encoding method using a decoding process for the second encoding method.

In the following, variations of this embodiment will be described. As types of brands represented by ftyp, the types described below can be indicated by the identification information. Furthermore, a combination of a plurality of the types described below can also be indicated by the identification information.

The identification information may indicate whether the original data object yet to be PCC-encoded is a point cloud whose range is limited or a large point cloud whose range is not limited, such as map information.

The identification information may indicate whether the original data yet to be PCC-encoded is a static object or a dynamic object.

As described above, the identification information may indicate whether the PCC-encoded data is data encoded in the first encoding method or data encoded in the second encoding method.

The identification information may indicate an algorithm used in the PCC encoding. Here, the "algorithm" means an encoding method that can be used in the first encoding method or the second encoding method, for example.

The identification information may indicate a differentiation between methods of storing the PCC-encoded data into an ISOBMFF file. For example, the identification information may indicate whether the storage method used is a storage method for accumulation or a storage method for real-time transmission, such as dynamic streaming.

Although an example in which ISOBMFF is used as a file format has been described in Embodiments 2 and 3, other formats can also be used. For example, the method according to this embodiment can also be used when PCC-encoded data is stored in MPEG-2 TS Systems, MPEG-DASH, MMT, or RMP.

Although an example in which metadata, such as the identification information, is stored in ftyp has been shown above, metadata can also be stored in a location other than ftyp. For example, the metadata may be stored in moov.

Figure 34:
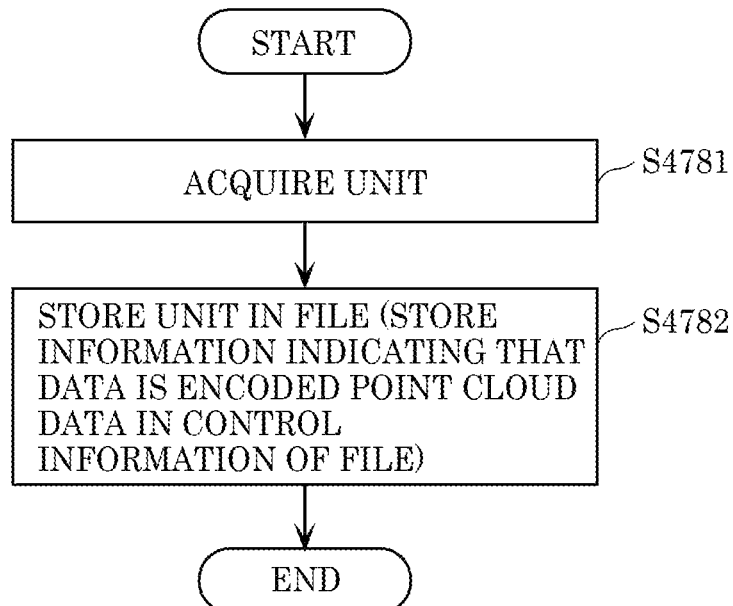
FIG. 34 is a flowchart of processing performed by a three-dimensional data storage device according to Embodiment 3.

As described above, a three-dimensional data storing device (or three-dimensional data multiplexing device or three-dimensional data encoding device) performs the process shown in FIG. 34.

First, the three-dimensional data storing device (which includes first multiplexer 4710, second multiplexer 4730 or third multiplexer 4750, for example) acquires one or more units (NAL units, for example) that store an encoded stream, which is encoded point cloud data (S4781). The three-dimensional data storing device then stores the one or more units in a file (an ISOBMFF file, for example) (S4782). In the storage (S4782), the three-dimensional data storing device also stores information indicating that the data stored in the file is encoded point cloud data (pcc1, pcc2, or pcc3, for example) in the control information (ftyp, for example) (referred to also as signaling information) for the file.

With such a configuration, a device that processes the file generated by the three-dimensional data storing device can quickly determine whether the data stored in the file is encoded point cloud data or not by referring to the control information for the file. Therefore, the processing amount of the device can be reduced, or the processing speed of the device can be increased.

For example, the information indicates the encoding method used for the encoding of the point cloud data among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, a device that processes the file generated by the three-dimensional data storing device can quickly determine the codec used for the data stored in the file by referring to the control information for the file. Therefore, the processing amount of the device can be reduced, or the processing speed of the device can be increased.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data storing device includes a processor and a memory, and the processor performs the processes described above using the memory.

Figure 35:
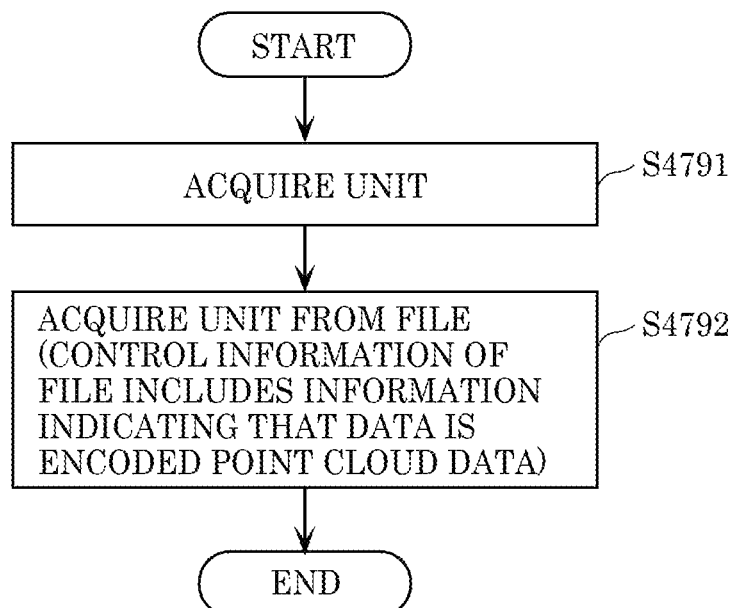
FIG. 35 is a flowchart of processing performed by a three-dimensional data acquisition device according to Embodiment 3.

As described above, a three-dimensional data acquisition device (or three-dimensional data demultiplexing device or three-dimensional data decoding device) performs the process shown in FIG. 35.

The three-dimensional data acquisition device (which includes first demultiplexer 4720, second demultiplexer 4740, or third demultiplexer 4760, for example) acquires a file (an ISOBMFF file, for example) that stores one or more units (NAL units, for example) that store an encoded stream, which is encoded point cloud data (S4791). The three-dimensional data acquisition device acquires the one or more units from the file (S4792). The control information (ftyp, for example) for the file includes information indicating that the data stored in the file is encoded point cloud data (pcc1, pcc2, or pcc3, for example).

For example, the three-dimensional data acquisition device determines whether the data stored in the file is encoded point cloud data or not by referring to the information. When the three-dimensional data acquisition device determines that the data stored in the file is encoded point cloud data, the three-dimensional data acquisition device generates point cloud data by decoding the encoded point cloud data included in the one or more units. Alternatively, when the three-dimensional data acquisition device determines that the data stored in the file is encoded point cloud data, the three-dimensional data acquisition device outputs information indicating that the data included in the one or more units is encoded point cloud data to a processor in a subsequent stage (first decoder 4640, second decoder 4660, or decoder 4680, for example) (or notifies a processor in a subsequent stage that the data included in the one or more units is encoded point cloud data).

With such a configuration, the three-dimensional data acquisition device can quickly determine whether the data stored in the file is encoded point cloud data or not by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, the information represents the encoding method used for the encoding among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, the three-dimensional data acquisition device can quickly determine the codec used for the data stored in the file by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, based on the information, the three-dimensional data acquisition device acquires the data encoded in any one of the first encoding method and the second encoding method from the encoded point cloud data including the data encoded in the first encoding method and the data encoded in the second encoding method.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data acquisition device includes a processor and a memory, and the processor performs the processes described above using the memory.

Embodiment 4

In Embodiment 4, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 36:
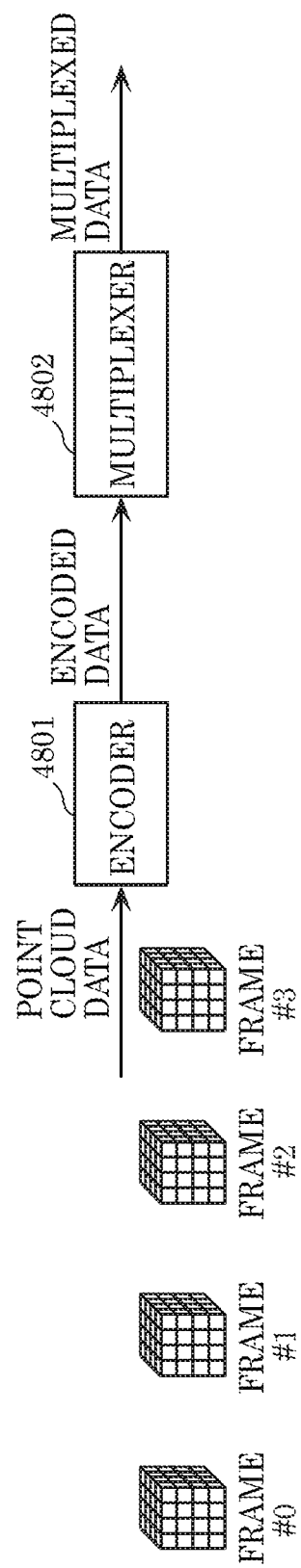
FIG. 36 is a diagram illustrating structures of an encoder and a multiplexer according to Embodiment 4.

FIG. 36 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 37:
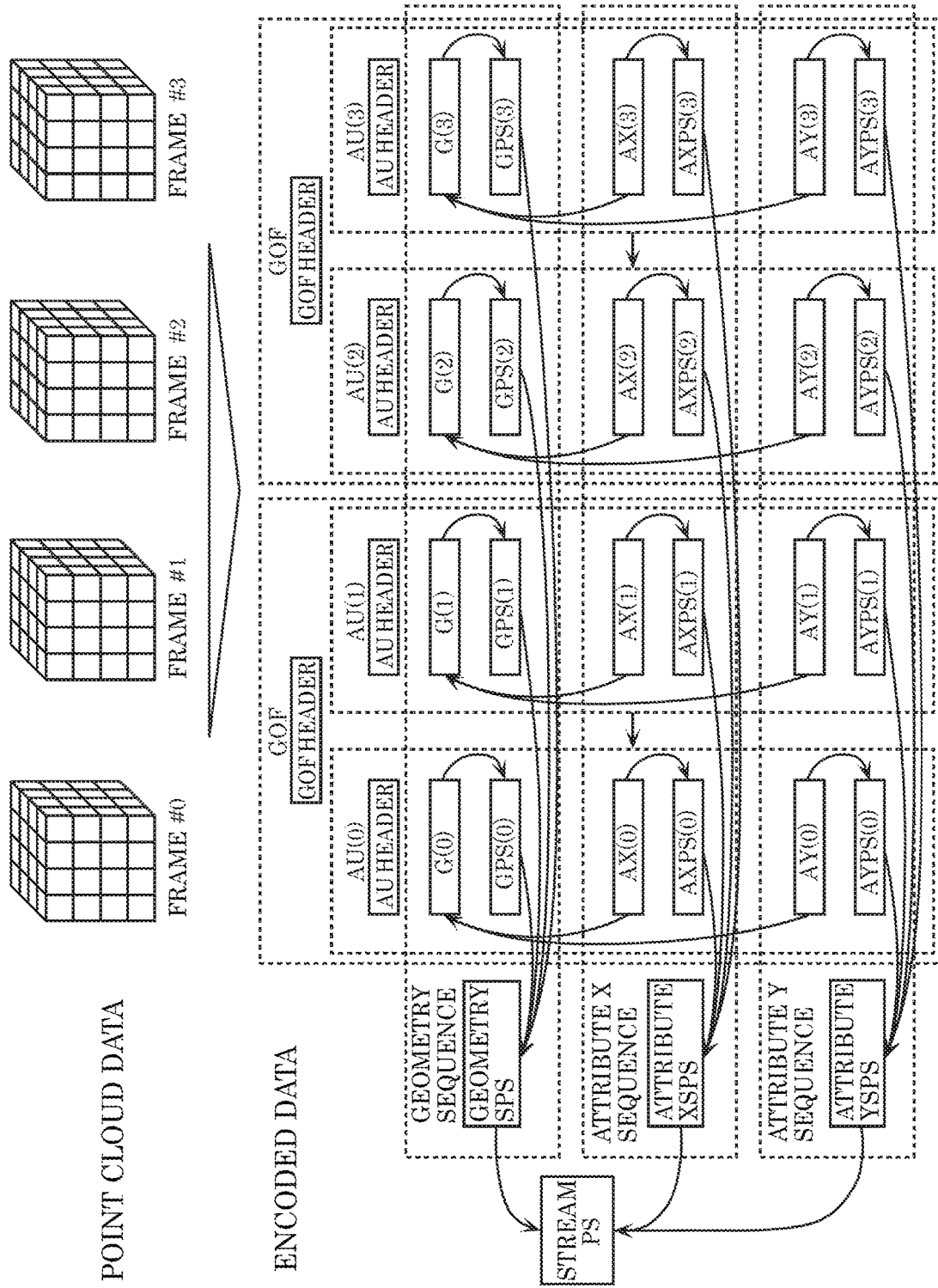
FIG. 37 is a diagram illustrating a structure example of encoded data according to Embodiment 4.

FIG. 37 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 37 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 37 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 37 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 38:
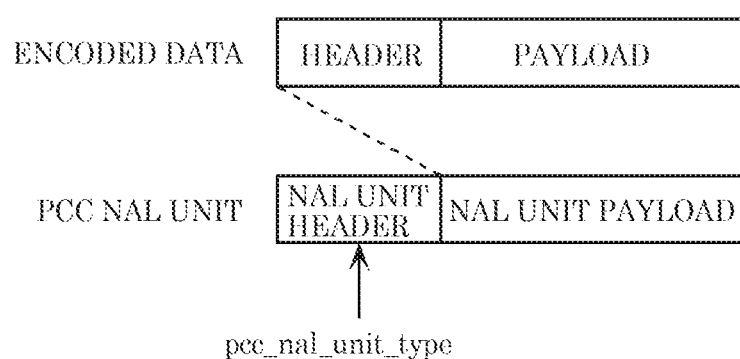
FIG. 38 is a diagram illustrating a structure example of encoded data and a NAL unit according to Embodiment 4.

For example, a data format is defined for each type of encoded data. FIG. 38 is a diagram showing an example of encoded data and a NAL unit.

For example, as shown in FIG. 38, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 39 is a diagram showing a semantics example of pcc_nal_unit_type.

As shown in FIG. 39, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pec_codec_type is codec 2 (Codec2: second encoding method), values of 0 to 2 of pc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 40:
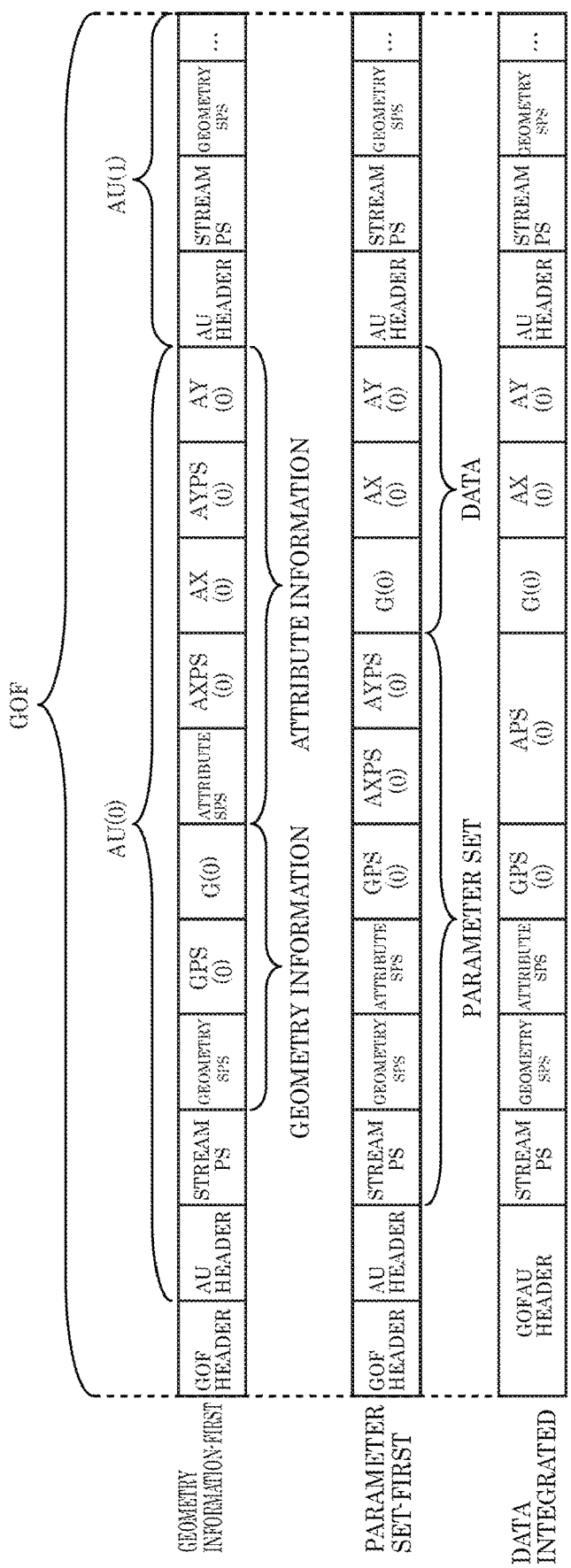
FIG. 40 is a diagram illustrating an example of a transmitting order of NAL units according to Embodiment 4.

FIG. 40 is a diagram showing examples of the order of transmission of NAL units. FIG. 40 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 40 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 40, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Figure 41:
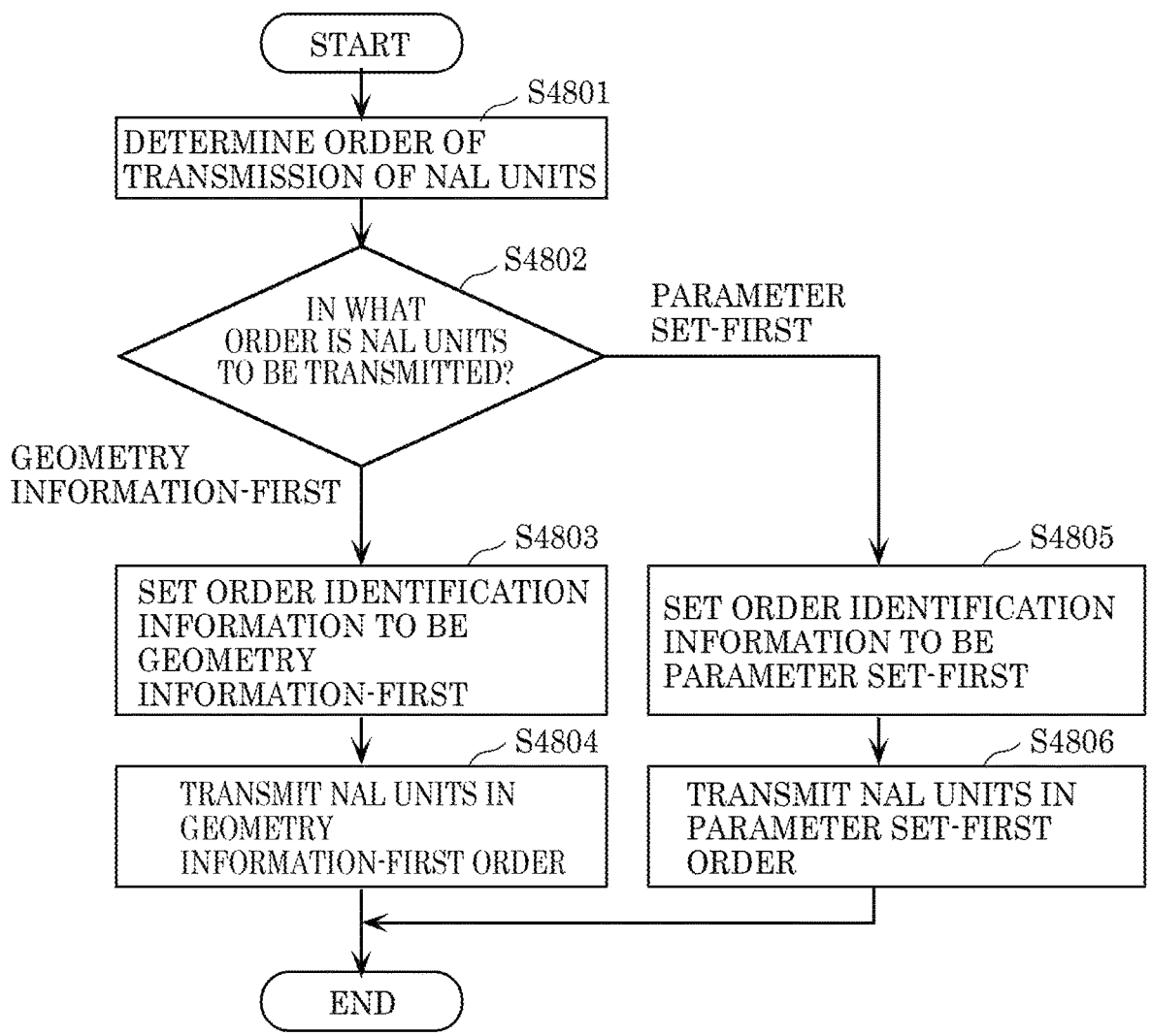
FIG. 41 is a flowchart of processing performed by a three-dimensional data encoding device according to Embodiment 4.

In the following, a process relating to order identification information will be described. FIG. 41 is a flowchart showing a process performed by the three-dimensional data encoding device (encoder 4801 and multiplexer 4802) that involves the order of transmission of NAL units.

First, the three-dimensional data encoding device determines the order of transmission of NAL units (geometry information-first or parameter set-first) (S4801). For example, the three-dimensional data encoding device determines the order of transmission based on a specification from a user or an external device (the three-dimensional data decoding device, for example).

If the determined order of transmission is geometry information-first (if "geometry information-first" in S4802), the three-dimensional data encoding device sets the order identification information included in the stream PS to geometry information-first (S4803). That is, in this case, the order identification information indicates that the NAL units are transmitted in the geometry information-first order. The three-dimensional data encoding device then transmits the NAL units in the geometry information-first order (S4804).

On the other hand, if the determined order of transmission is parameter set-first (if "parameter set-first" in S4802), the three-dimensional data encoding device sets the order identification information included in the stream PS to parameter set-first (4805). That is, in this case, the order identification information indicates that the NAL units are transmitted in the parameter set-first order. The three-dimensional data encoding device then transmits the NAL units in the parameter set-first order (S4806).

Figure 42:
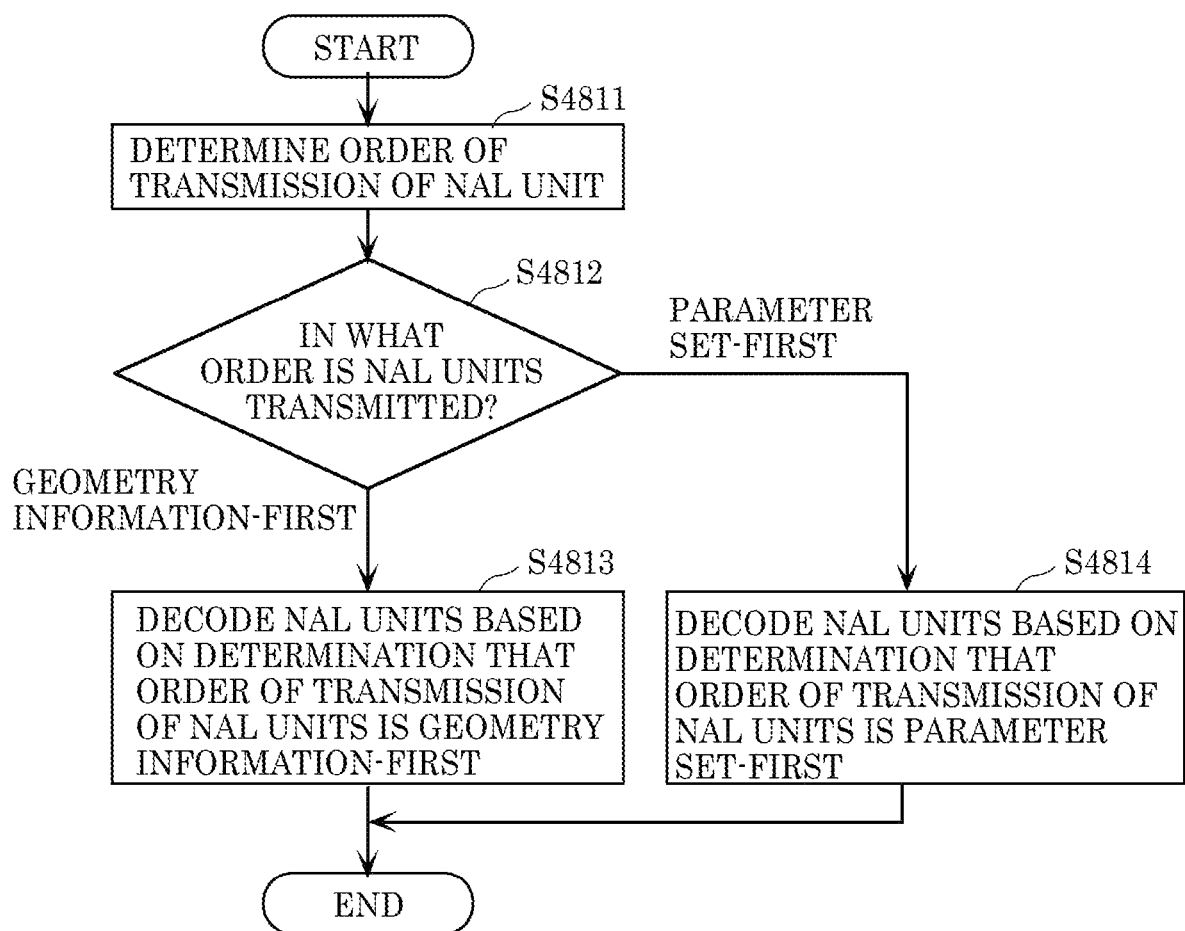
FIG. 42 is a flowchart of processing performed by a three-dimensional data decoding device according to Embodiment 4.

FIG. 42 is a flowchart showing a process performed by the three-dimensional data decoding device that involves the order of transmission of NAL units. First, the three-dimensional data decoding device analyzes the order identification information included in the stream PS (S4811).

If the order of transmission indicated by the order identification information is geometry information-first (if "geometry information-first" in S4812), the three-dimensional data decoding device decodes the NAL units based on the determination that the order of transmission of the NAL units is geometry information-first (S4813).

On the other hand, if the order of transmission indicated by the order identification information is parameter set-first (if "parameter set-first" in S4812), the three-dimensional data decoding device decodes the NAL units based on the determination that the order of transmission of the NAL units is parameter set-first (S4814).

For example, if the three-dimensional data decoding device does not decode attribute information, in step S4813, the three-dimensional data decoding device does not obtain the entire NAL units but can obtain a part of a NAL unit relating to the geometry information and decode the obtained NAL unit to obtain the geometry information.

Figure 43:
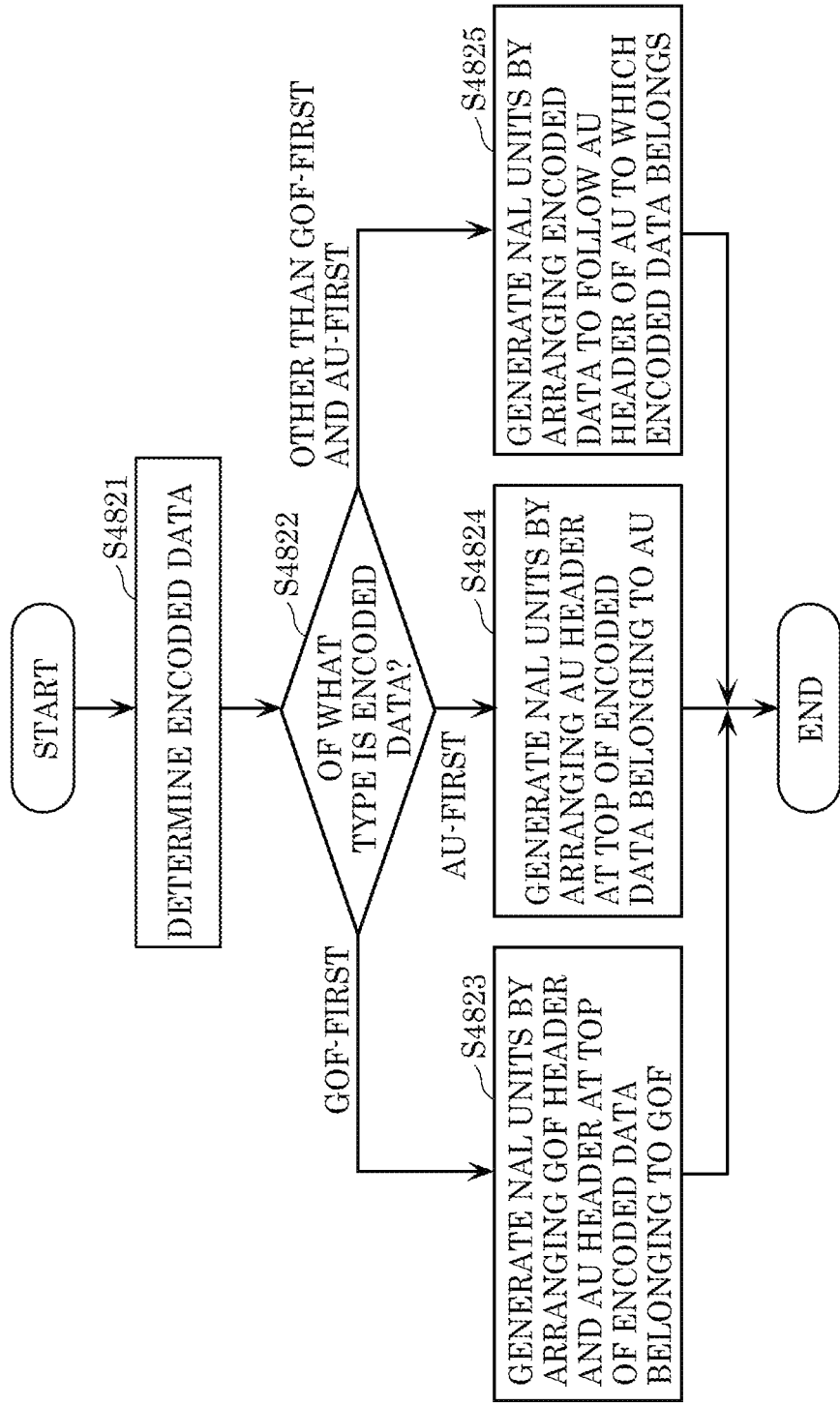
FIG. 43 is a flowchart of multiplexing processing according to Embodiment 4.

Next, a process relating to generation of an AU and a GOF will be described. FIG. 43 is a flowchart showing a process performed by the three-dimensional data encoding device (multiplexer 4802) that relates to generation of an AU and a GOF in multiplexing of NAL units.

First, the three-dimensional data encoding device determines the type of the encoded data (S4821). Specifically, the three-dimensional data encoding device determines whether the encoded data to be processed is AU-first data, GOF-first data, or other data.

If the encoded data is GOF-first data (if "GOF-first" in S4822), the three-dimensional data encoding device generates NAL units by arranging a GOF header and an AU header at the top of the encoded data belonging to the GOF (S4823).

If the encoded data is AU-first data (if "AU-first" in S4822), the three-dimensional data encoding device generates NAL units by arranging an AU header at the top of the encoded data belonging to the AU (S4824).

If the encoded data is neither GOF-first data nor AU-first data (if "other than GOF-first and AU-first" in S4822), the three-dimensional data encoding device generates NAL units by arranging the encoded data to follow the AU header of the AU to which the encoded data belongs (S4825).

Figure 44:
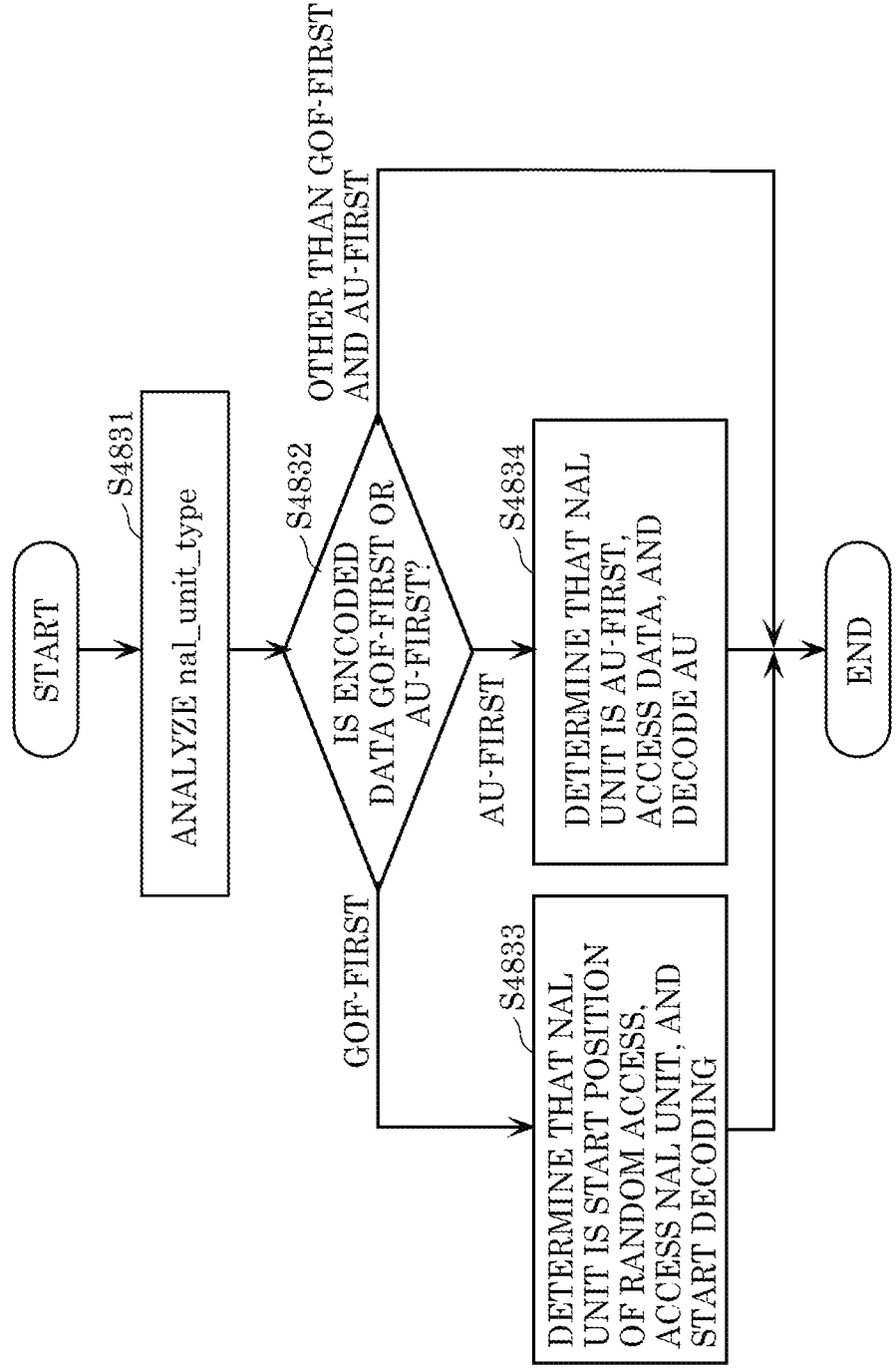
FIG. 44 is a flowchart of demultiplexing processing according to Embodiment 4.

Next, a process relating to access to an AU and a GOF will be described. FIG. 44 is a flowchart showing a process performed by the three-dimensional data decoding device that involves accessing to an AU and a GOF in demultiplexing of a NAL unit.

First, the three-dimensional data decoding device determines the type of the encoded data included in the NAL unit by analyzing nal_unit_type in the NAL unit (S4831). Specifically the three-dimensional data decoding device determines whether the encoded data included in the NAL unit is AU-first data, GOF-first data, or other data.

If the encoded data included in the NAL unit is GOF-first data (if "GOF-first" in S4832), the three-dimensional data decoding device determines that the NAL unit is a start position of random access, accesses the NAL unit, and starts the decoding process (S4833).

If the encoded data included in the NAL unit is AU-first data (if "AU-first" in S4832), the three-dimensional data decoding device determines that the NAL unit is AU-first, accesses the data included in the NAL unit, and decodes the AU (S4834).

If the encoded data included in the NAL unit is neither GOF-first data nor AU-first data (if "other than GOF-first and AU-first" in S4832), the three-dimensional data decoding device does not process the NAL unit.

Figure 45:
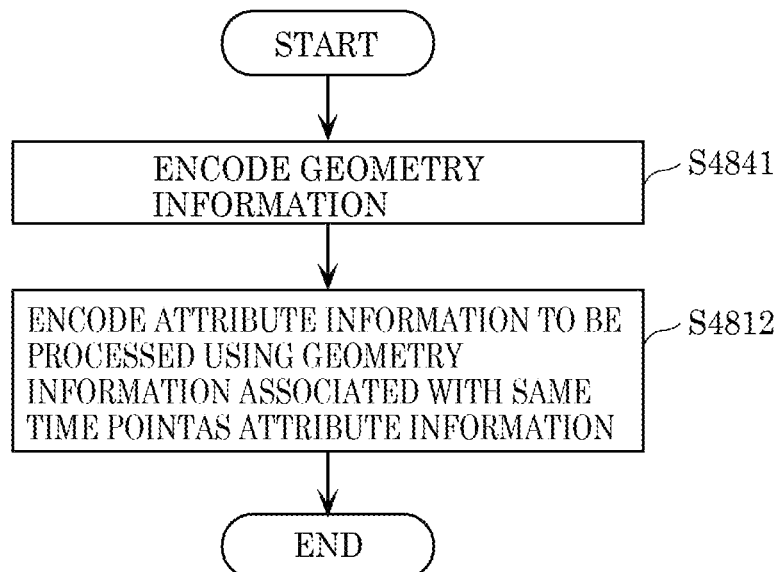
FIG. 45 is a flowchart of processing performed by a three-dimensional data encoding device according to Embodiment 4.

As described above, the three-dimensional data encoding device performs the process shown in FIG. 45. The three-dimensional data encoding device encodes time-series three-dimensional data (point cloud data on a dynamic object, for example). The three-dimensional data includes geometry information and attribute information associated with each time point.

First, the three-dimensional data encoding device encodes the geometry information (S4841). The three-dimensional data encoding device then encodes the attribute information to be processed by referring to the geometry information associated with the same time point as the attribute information to be processed (S4842). Here, as shown in FIG. 37, the geometry information and the attribute information associated with the same time point form an access unit (AU). That is, the three-dimensional data encoding device encodes the attribute information to be processed by referring to the geometry information included in the same access unit as the attribute information to be processed.

In this way, the three-dimensional data encoding device can take advantage of the access unit to facilitate control of reference in encoding. Therefore, the three-dimensional data encoding device can reduce the processing amount of the encoding process.

For example, the three-dimensional data encoding device generates a bitstream including the encoded geometry information (encoded geometry data), the encoded attribute information (encoded attribute data), and information indicating the geometry information of the entity to be referred to when encoding the attribute information to be processed.

For example, the bitstream includes a geometry parameter set (geometry PS) that includes control information for the geometry information associated with each time point and an attribute parameter set (attribute PS) that includes control information for the attribute information associated with each time point.

For example, the bitstream includes a geometry sequence parameter set (geometry SPS) that includes control information that is common to a plurality of pieces of geometry information associated with different time points and attribute sequence parameter set (attribute SPS) that includes control information that is common to a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points.

For example, the bitstream includes an access unit header (AU header) that includes control information that is common in an access unit.

For example, the three-dimensional data encoding device performs encoding in such a manner that groups of frames (GOFs) formed by one or more access units can be independently decoded. That is, the GOF is a random access unit.

For example, the bitstream includes a GOF header that includes control information that is common in a GOF.

For example, the three-dimensional data encoding device includes a processor and a memory, and the processor performs the processes described above using the memory.

Figure 46:
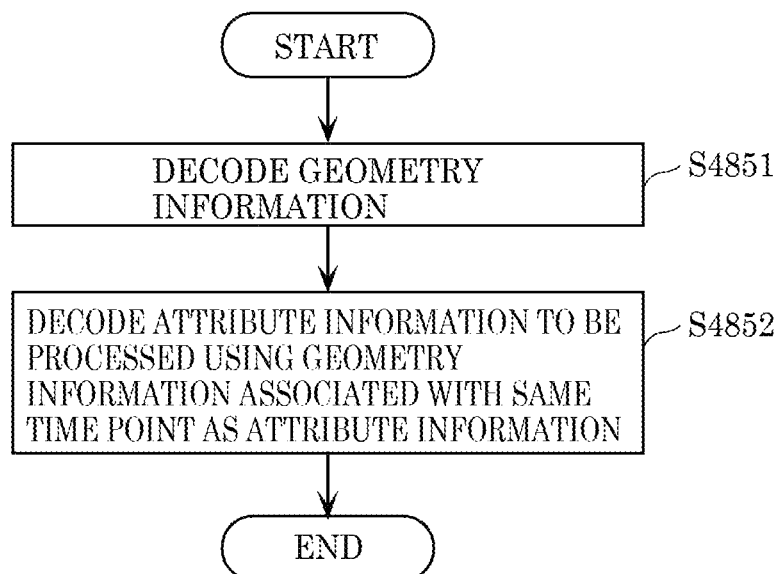
FIG. 46 is a flowchart of processing performed by a three-dimensional data decoding device according to Embodiment 4.

As described above, the three-dimensional data decoding device performs the process shown in FIG. 46. The three-dimensional data decoding device decodes time-series three-dimensional data (point cloud data on a dynamic object, for example). The three-dimensional data includes geometry information and attribute information associated with each time point. The geometry information and the attribute information associated with the same time point forms an access unit (AU).

First, the three-dimensional data decoding device decodes the bitstream to obtain the geometry information (S4851). That is, the three-dimensional data decoding device generates the geometry information by decoding the encoded geometry information (encoded geometry data) included in the bitstream.

The three-dimensional data decoding device then decodes the bitstream to obtain the attribute information to be processed by referring to the geometry information associated with the same time point as the attribute information to be processed (S4852). That is, the three-dimensional data decoding device generates the attribute information by decoding the encoded attribute information (encoded attribute data) included in the bitstream. In this process, the three-dimensional data decoding device refers to the decoded geometry information included in the access unit as the attribute information.

In this way, the three-dimensional data decoding device can take advantage of the access unit to facilitate control of reference in decoding. Therefore, the three-dimensional data decoding device can reduce the processing amount of the decoding process.

For example, the three-dimensional data decoding device obtains, from the bitstream, information indicating the geometry information of the entity to be referred to when decoding the attribute information to be processed, and decodes the attribute information to be processed by referring to the geometry information of the entity to be referred to indicated by the obtained information.

For example, the bitstream includes a geometry parameter set (geometry PS) that includes control information for the geometry information associated with each time point and an attribute parameter set (attribute PS) that includes control information for the attribute information associated with each time point. That is, the three-dimensional data decoding device uses the control information included in the geometry parameter set associated with the time point to be intended for processing to decode the geometry information associated with the time point intended for processing, and uses the control information included in the attribute parameter set associated with the time point intended for processing to decode the attribute information associated with the time point intended for processing.

For example, the bitstream includes a geometry sequence parameter set (geometry SPS) that includes control information that is common to a plurality of pieces of geometry information associated with different time points and an attribute sequence parameter set (attribute SPS) that includes control information that is common to a plurality of pieces of attribute information associated with different time points. That is, the three-dimensional data decoding device uses the control information included in the geometry sequence parameter set to decode a plurality of pieces of geometry information associated with different time points, and uses the control information included in the attribute sequence parameter set to decode a plurality of pieces of attribute information associated with different time points.

For example, the bitstream includes a stream parameter set (stream PS) that includes control information that is common to a plurality of pieces of geometry information associated with different time points and a plurality of pieces of attribute information associated with different time points. That is, the three-dimensional data decoding device uses the control information included in the stream parameter set to decode a plurality of pieces of geometry information associated with different time points and a plurality of pieces of attribute information associated with different time points.

For example, the bitstream includes an access unit header (AU header) that includes control information that is common in an access unit. That is, the three-dimensional data decoding device uses the control information included in the access unit header to decode the geometry information and the attribute information included in the access unit.

For example, the three-dimensional data decoding device independently decodes groups of frames (GOFs) formed by one or more access units. That is, the GOF is a random access unit.

For example, the bitstream includes a GOF header that includes control information that is common in a GOF. That is, the three-dimensional data decoding device decodes the geometry information and the attribute information included in the GOF using the control information included in the GOF header.

For example, the three-dimensional data decoding device includes a processor and a memory, and the processor performs the processes described above using the memory.

Embodiment 5

Although there are tools for data dividing, such as the slice or the tile, in HEVC encoding in order to make parallel processing in a decoding device possible, there are no such tools yet in PCC (Point Cloud Compression) encoding.

In PCC, various data dividing methods can be considered according to parallel processing, compression efficiency, and compression algorithms. Here, the definitions of slice and tile, the data structure, and the transmission/reception methods will be described.

Figure 47:
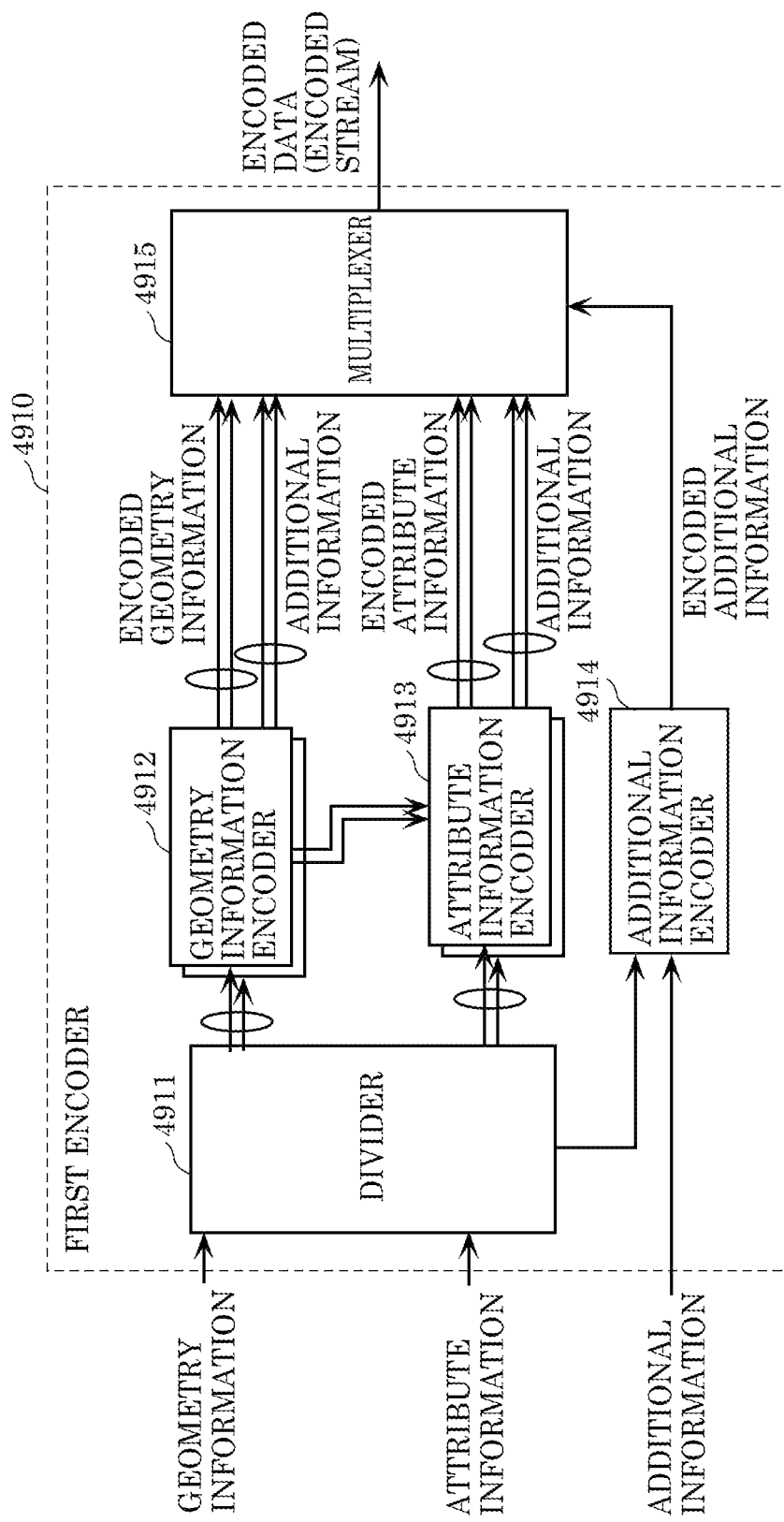
FIG. 47 is a block diagram of a first encoder according to Embodiment 5.

FIG. 47 is a block diagram illustrating the configuration of first encoder 4910 included in a three-dimensional data encoding device according to the present embodiment. First encoder 4910 generates encoded data (an encoded stream) by encoding point cloud data with a first encoding method (GPCC (Geometry based PCC)). First encoder 4910 includes divider 4911, a plurality of geometry information encoders 4912, a plurality of attribute information encoders 4913, additional information encoder 4914, and multiplexer 4915.

Divider 4911 generates a plurality of divided data by dividing point cloud data. Specifically, divider 4911 generates a plurality of divided data by dividing the space of point cloud data into a plurality of subspaces. Here, the subspaces are one of tiles and slices, or a combination of tiles and slices. More specifically, point cloud data includes geometry information, attribute information, and additional information. Divider 4911 divides geometry information into a plurality of divided geometry information, and divides attribute information into a plurality of divided attribute information. Also, divider 4911 generates additional information about division.

A plurality of geometry information encoders 4912 generate a plurality of encoded geometry information by encoding the plurality of divided geometry information. For example, the plurality of geometry information encoders 4912 process the plurality of divided geometry information in parallel.

The plurality of attribute information encoders 4913 generate a plurality of encoded attribute information by encoding the plurality of divided attribute information. For example, the plurality of attribute information encoders 4913 process the plurality of divided attribute information in parallel.

Additional information encoder 4914 generates encoded additional information by encoding the additional information included in point cloud data, and the additional information about data dividing generated by divider 4911 at the time of division.

Multiplexer 4915 generates encoded data (an encoded stream) by multiplexing the plurality of encoded geometry information, the plurality of encoded attribute information, and the encoded additional information, and transmits the generated encoded data. Furthermore, the encoded additional information is used at the time of decoding.

Note that, although FIG. 47 illustrates the example in which the respective numbers of geometry information encoders 4912 and attribute information encoders 4913 are two, the respective numbers of geometry information encoders 4912 and attribute information encoders 4913 may be one, or may be three or more. Furthermore, the plurality of divided data may be processed in parallel in the same chip, such as a plurality of cores in a CPU, may be processed in parallel by the respective cores of a plurality of chips, or may be processed in parallel by the plurality of cores of a plurality of chips.

Figure 48:
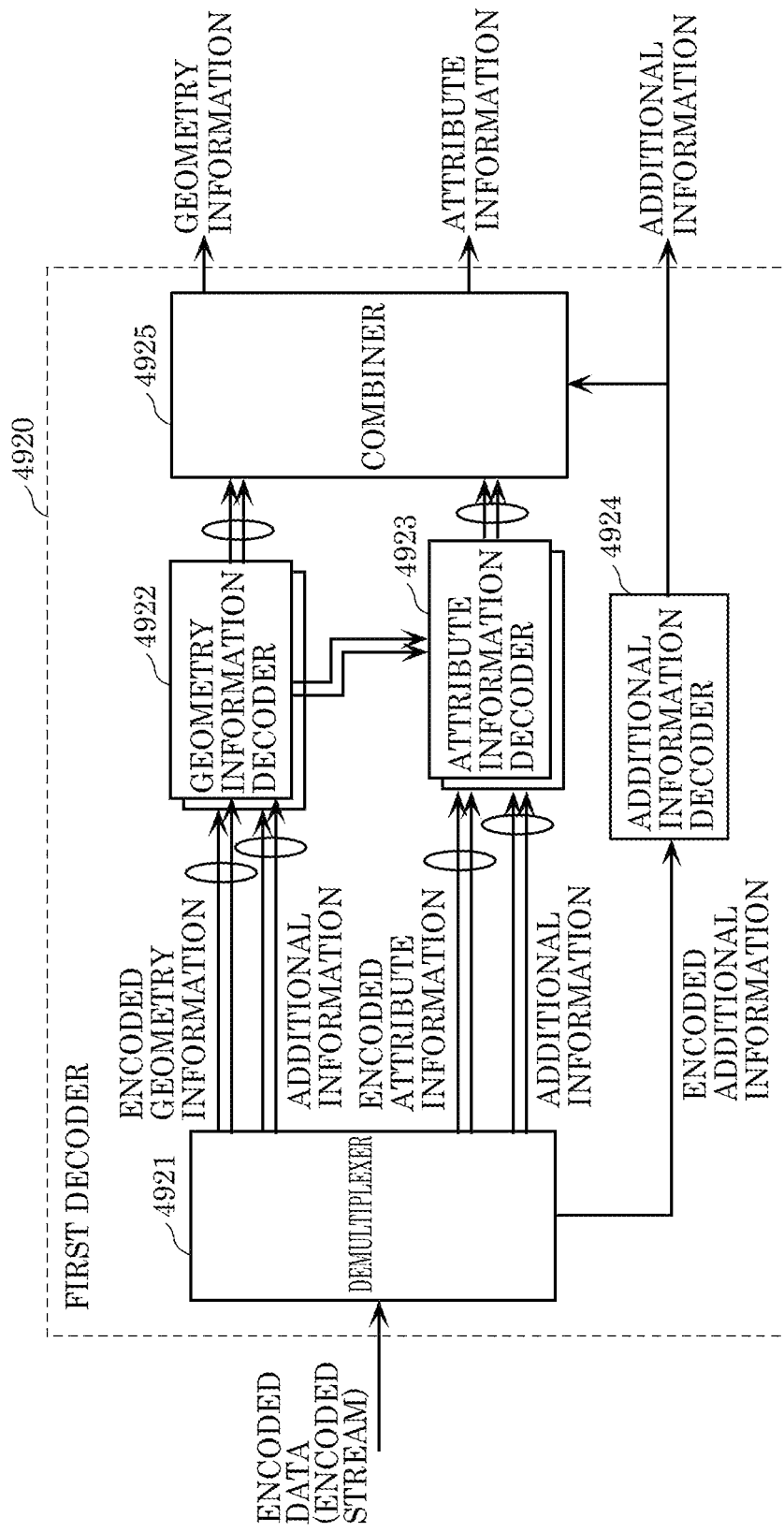
FIG. 48 is a block diagram of a first decoder according to Embodiment 5.

FIG. 48 is a block diagram illustrating the configuration of first decoder 4920. First decoder 4920 restores point cloud data by decoding the encoded data (encoded stream) generated by encoding the point cloud data with the first encoding method (GPCC). First decoder 4920 includes demultiplexer 4921, a plurality of geometry information decoders 4922, a plurality of attribute information decoders 4923, additional information decoder 4924, and combiner 4925.

Demultiplexer 4921 generates a plurality of encoded geometry information, a plurality of encoded attribute information, and encoded additional information by demultiplexing the encoded data (encoded stream).

The plurality of geometry information decoders 4922 generate a plurality of divided geometry information by decoding the plurality of encoded geometry information. For example, the plurality of geometry information decoders 4922 process the plurality of encoded geometry information in parallel.

The plurality of attribute information decoders 4923 generate a plurality of divided attribute information by decoding the plurality of encoded attribute information. For example, the plurality of attribute information decoders 4923 process the plurality of encoded attribute information in parallel.

Additional information decoder 4924 generates additional information by decoding the encoded additional information.

Combiner 4925 generates geometry information by combining the plurality of divided geometry information by using the additional information. Combiner 4925 generates attribute information by combining the plurality of divided attribute information by using the additional information.

Note that, although FIG. 48 illustrates the example in which the respective numbers of geometry information decoders 4922 and attribute information decoders 4923 are two, the respective numbers of geometry information decoders 4922 and attribute information decoders 4923 may be one, or may be three or more. Furthermore, the plurality of divided data may be processed in parallel in the same chip, such as a plurality of cores in a CPU, may be processed in parallel by the respective cores of a plurality of chips, or may be processed in parallel by the plurality of cores of a plurality of chips.

Figure 49:
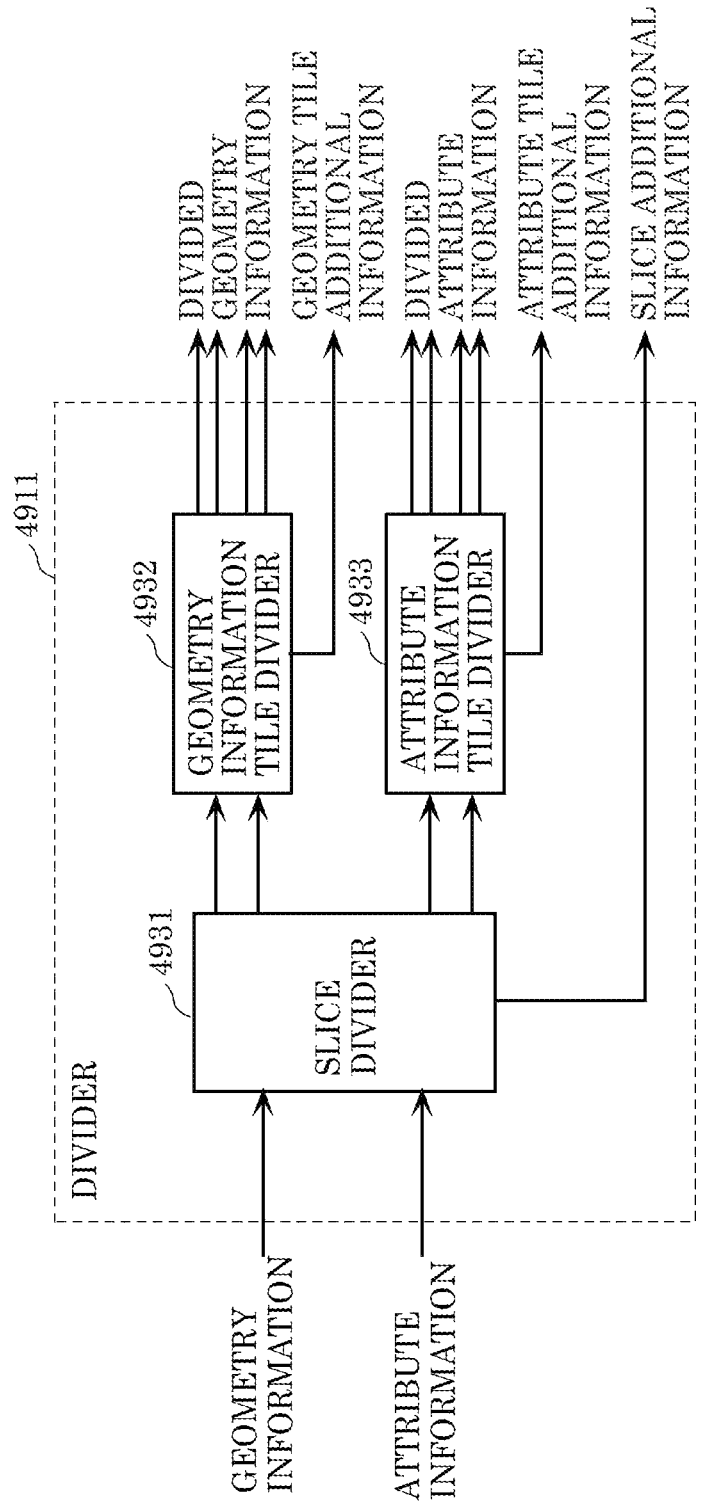
FIG. 49 is a block diagram of a divider according to Embodiment 5.

Next, the configuration of divider 4911 will be described. FIG. 49 is a block diagram of divider 4911. Divider 4911 includes slice divider 4931, geometry information tile divider (geometry tile divider) 4932, and attribute information tile divider (attribute tile divider) 4933.

Slice divider 4931 generates a plurality of slice geometry information by dividing geometry information (position or geometry) into slices. Also, slice divider 4931 generates a plurality of slice attribute information by dividing attribute information (attribute) into slices. Furthermore, slice divider 4931 outputs slice additional information (SliceMetaData) including the information related to slice dividing and the information generated in the slice dividing.

Geometry information tile divider 4932 generates a plurality of divided geometry information (a plurality of tile geometry information) by dividing the plurality of slice geometry information into tiles. Also, geometry information tile divider 4932 outputs geometry tile additional information (geometry tile metadata) including the information related to tile dividing of geometry information, and the information generated in the tile dividing of the geometry information.

Attribute information tile divider 4933 generates a plurality of divided attribute information (a plurality of tile attribute information) by dividing the plurality of slice attribute information into tiles. Also, attribute information tile divider 4933 outputs attribute tile additional information (attribute tile metadata) including the information related to tile dividing of attribute information, and the information generated in the tile dividing of the attribute information.

Note that the number of slices or tiles to be divided is one or more. That is, slice or tile dividing may not be performed.

Note that, although the example in which tile dividing is performed after slice dividing has been illustrated here, slice dividing may be performed after tile dividing. Furthermore, a new division type may be defined in addition to the slice and the tile, and dividing may be performed with three or more division types.

Figure 50:
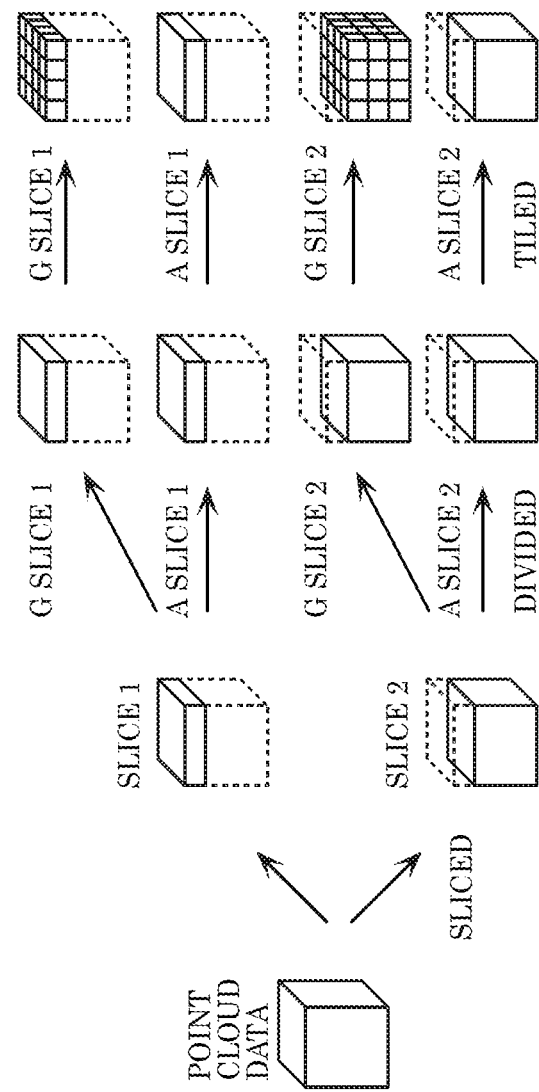
FIG. 50 is a diagram illustrating an example of dividing slices and tiles according to Embodiment 5.

Hereinafter, the dividing method for point cloud data will be described. FIG. 50 is a diagram illustrating an example of slice and tile dividing.

First, the method for slice dividing will be described. Divider 4911 divides three-dimensional point cloud data into arbitrary point clouds on a slice-by-slice basis. In slice dividing, divider 4911 does not divide the geometry information and the attribute information constituting points, but collectively divides the geometry information and the attribute information. That is, divider 4911 performs slice dividing so that the geometry information and the attribute information of an arbitrary point belong to the same slice. Note that, as long as these are followed, the number of divisions and the dividing method may be any number and any method. Furthermore, the minimum unit of division is a point. For example, the numbers of divisions of geometry information and attribute information are the same. For example, a three-dimensional point corresponding to geometry information after slice dividing, and a three-dimensional point corresponding to attribute information are included in the same slice.

Also, divider 4911 generates slice additional information, which is additional information related to the number of divisions and the dividing method at the time of slice dividing. The slice additional information is the same for geometry information and attribute information. For example, the slice additional information includes the information indicating the reference coordinate position, size, or side length of a bounding box after division. Also, the slice additional information includes the information indicating the number of divisions, the division type, etc.

Next, the method for tile dividing will be described. Divider 4911 divides the data divided into slices into slice geometry information (G slice) and slice attribute information (A slice), and divides each of the slice geometry information and the slice attribute information on a tile-by-tile basis.

Note that, although FIG. 50 illustrates the example in which division is performed with an octree structure, the number of divisions and the dividing method may be any number and any method.

Also, divider 4911 may divide geometry information and attribute information with different dividing methods, or may divide geometry information and attribute information with the same dividing method. Additionally, divider 4911 may divide a plurality of slices into tiles with different dividing methods, or may divide a plurality of slices into tiles with the same dividing method.

Furthermore, divider 4911 generates tile additional information related to the number of divisions and the dividing method at the time of tile dividing. The tile additional information (geometry tile additional information and attribute tile additional information) is separate for geometry information and attribute information. For example, the tile additional information includes the information indicating the reference coordinate position, size, or side length of a bounding box after division. Additionally, the tile additional information includes the information indicating the number of divisions, the division type, etc.

Next, an example of the method of dividing point cloud data into slices or tiles will be described. As the method for slice or tile dividing, divider 4911 may use a predetermined method, or may adaptively switch methods to be used according to point cloud data.

At the time of slice dividing, divider 4911 divides a three-dimensional space by collectively handling geometry information and attribute information. For example, divider 4911 determines the shape of an object, and divides a three-dimensional space into slices according to the shape of the object. For example, divider 4911 extracts objects such as trees or buildings, and performs division on an object-by-object basis. For example, divider 4911 performs slice dividing so that the entirety of one or a plurality of objects are included in one slice. Alternatively, divider 4911 divides one object into a plurality of slices.

In this case, the encoding device may change the encoding method for each slice, for example. For example, the encoding device may use a high-quality compression method for a specific object or a specific part of the object. In this case, the encoding device may store the information indicating the encoding method for each slice in additional information (metadata).

Also, divider 4911 may perform slice dividing so that each slice corresponds to a predetermined coordinate space based on map information or geometry information.

At the time of tile dividing, divider 4911 separately divides geometry information and attribute information. For example, divider 4911 divides slices into tiles according to the data amount or the processing amount. For example, divider 4911 determines whether the data amount of a slice (for example, the number of three-dimensional points included in a slice) is greater than a predetermined threshold value. When the data amount of the slice is greater than the threshold value, divider 4911 divides slices into tiles. When the data amount of the slice is less than the threshold value, divider 4911 does not divide slices into tiles.

For example, divider 4911 divides slices into tiles so that the processing amount or processing time in the decoding device is within a certain range (equal to or less than a predetermined value). Accordingly the processing amount per tile in the decoding device becomes constant, and distributed processing in the decoding device becomes easy.

Additionally when the processing amount is different between geometry information and attribute information, for example, when the processing amount of geometry information is greater than the processing amount of attribute information, divider 4911 makes the number of divisions of geometry information larger than the number of divisions of attribute information.

Furthermore, for example, when geometry information may be decoded and displayed earlier, and attribute information may be slowly decoded and displayed later in the decoding device according to contents, divider 4911 may make the number of divisions of geometry information larger than the number of divisions of attribute information. Accordingly, since the decoding device can increase the parallel number of geometry information, it is possible to make the processing of geometry information faster than the processing of attribute information.

Note that the decoding device does not necessarily have to process sliced or tiled data in parallel, and may determine whether or not to process them in parallel according to the number or capability of decoding processors.

By performing division with the method as described above, it is possible to achieve adaptive encoding according to contents or objects. Also, parallel processing in decoding processing can be achieved. Accordingly, the flexibility of a point cloud encoding system or a point cloud decoding system is improved.

Figure 51:
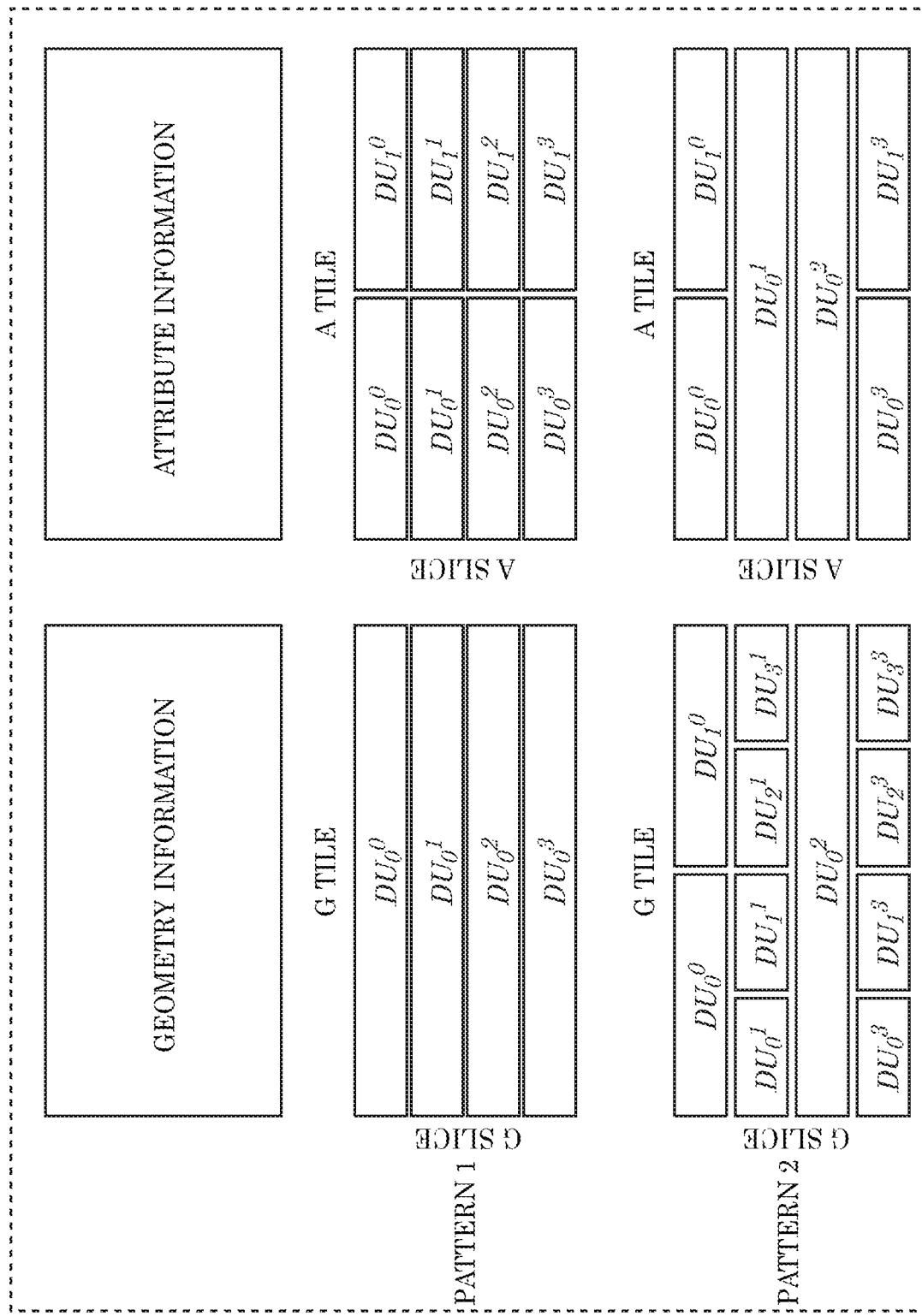
FIG. 51 is a diagram illustrating dividing pattern examples of slices and tiles according to Embodiment 5.

FIG. 51 is a diagram illustrating dividing pattern examples of slices and tiles. DU in the diagram is a data unit (DataUnit), and indicates the data of a tile or a slice. Additionally, each DU includes a slice index (SliceIndex) and a tile index (TileIndex). The top right numerical value of a DU in the diagram indicates the slice index, and the bottom left numerical value of the DU indicates the tile index.

In Pattern 1, in slice dividing, the number of divisions and the dividing method are the same for G slice and A slice. In tile dividing, the number of divisions and the dividing method for G slice are different from the number of divisions and the dividing method for A slice. Additionally, the same number of divisions and dividing method are used among a plurality of G slices. The same number of divisions and dividing method are used among a plurality of A slices.

In Pattern 2, in slice dividing, the number of divisions and the dividing method are the same for G slice and A slice. In tile dividing, the number of divisions and the dividing method for G slice are different from the number of divisions and the dividing method for A slice. Additionally the number of divisions and the dividing method are different among a plurality of G slices. The number of divisions and the dividing method are different among a plurality of A slices.

Next, the encoding method for divided data will be described. The three-dimensional data encoding device (first encoder 4910) encodes each of divided data. When encoding attribute information, the three-dimensional data encoding device generates, as additional information, dependency information indicating based on which configuration information (geometry information, additional information, or other attribute information) encoding has been performed. That is, the dependency information indicates, for example, the configuration information of a reference destination (dependence destination). In this case, the three-dimensional data encoding device generates the dependency information based on the configuration information corresponding to the divided shape of attribute information. Note that the three-dimensional data encoding device may generate the dependency information based on the configuration information corresponding to a plurality of divided shapes.

Dependency information may be generated by the three-dimensional data encoding device, and the generated dependency information may be transmitted to the three-dimensional decoding device. Alternatively, the three-dimensional decoding device may generate dependency information, and the three-dimensional data encoding device may not transmit the dependency information. Furthermore, the dependency used by the three-dimensional data encoding device may be defined in advance, and the three-dimensional data encoding device may not transmit the dependency information.

Figure 52:
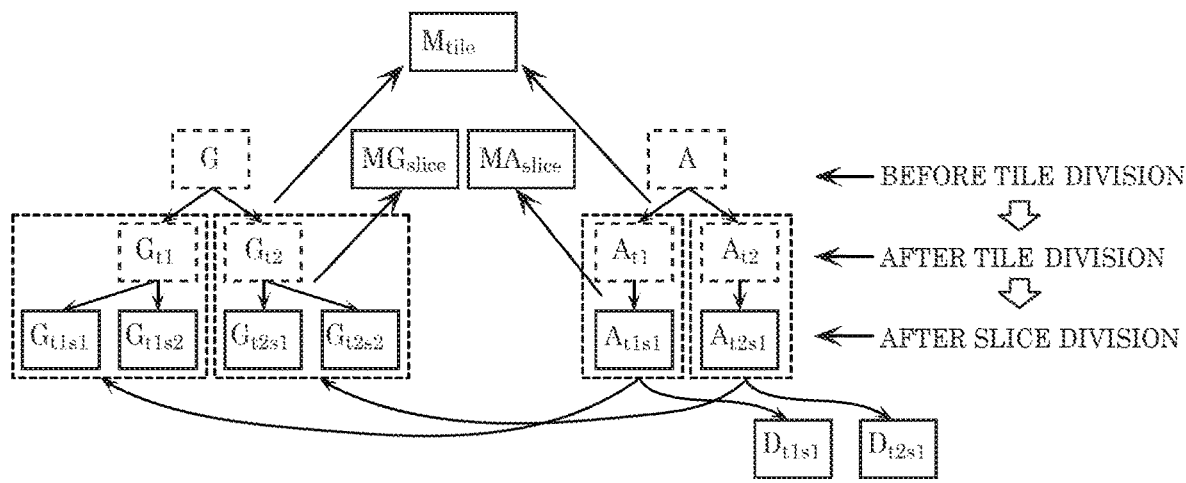
FIG. 52 is a diagram illustrating an example of dependency according to Embodiment 5.

FIG. 52 is a diagram illustrating an example of dependency of each data. The heads of arrows in the diagram indicate dependence destinations, and the origins of the arrows indicate dependence sources. The three-dimensional data decoding device decodes data in the order of a dependence destination to a dependence source. Additionally, the data indicated by solid lines in the diagram is data that is actually transmitted, and the data indicated by dotted lines is data that is not transmitted.

Furthermore, in the diagram, G indicates geometry information, and A indicates attribute information. $G_{s1}$ indicates the geometry information of slice number 1, and $G_{s2}$ indicates the geometry information of slice number 2. $G_{s1t1}$ indicates the geometry information of slice number 1 and tile number 1, $G_{s1t2}$ indicates the geometry information of slice number 1 and tile number 2, $G_{s2t1}$ indicates the geometry information of slice number 2 and tile number 1, and $G_{s2t2}$ indicates the geometry information of slice number 2 and tile number 2. Similarly A indicates the attribute information of slice number 1, and $A_{s2}$ indicates the attribute information of slice number 2. $A_{s1t1}$ indicates the attribute information of slice number 1 and tile number 1, $A_{s1t2}$ indicates the attribute information of slice number 1 and tile number 2, $A_{s2t1}$ indicates the attribute information of slice number 2 and tile number 1, and $A_{s2t2}$ indicates the attribute information of slice number 2 and tile number 2.

Mslice indicates slice additional information, MGtile indicates geometry tile additional information, and MAtile indicates attribute tile additional information. $D_{s1t1}$ indicates the dependency information of attribute information $A_{s1t1}$, and $D_{s2t1}$ indicates the dependency information of attribute information $A_{s2t1}$.

Additionally, the three-dimensional data encoding device may rearrange data in a decoding order, so that it is unnecessary to rearrange data in the three-dimensional data decoding device. Note that data may be rearranged in the three-dimensional data decoding device, or data may be rearranged in both the three-dimensional data encoding device and the three-dimensional data decoding device.

Figure 53:
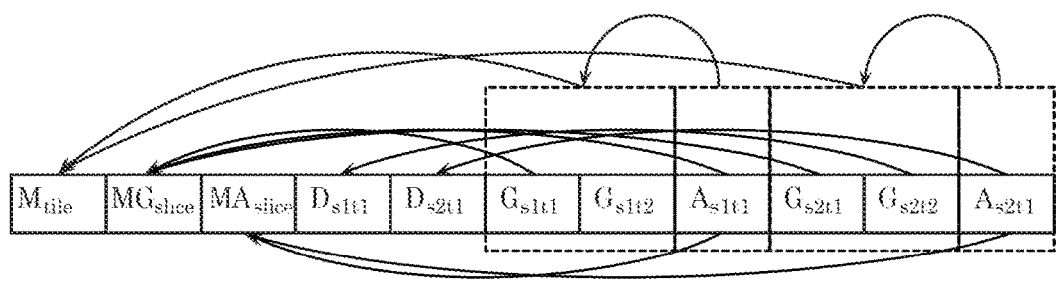
FIG. 53 is a diagram illustrating a data decoding order according to Embodiment 5.

FIG. 53 is a diagram illustrating an example of the data decoding order. In the example of FIG. 53, decoding is sequentially performed from the data on the left. For those data in dependency, the three-dimensional data decoding device decodes the data of a dependence destination first. For example, the three-dimensional data encoding device rearranges data in advance to be in this order, and transmits the data. Note that, as long as it is the order in which the data of dependence destinations become first, it may be any kind of order. Additionally, the three-dimensional data encoding device may transmit additional information and dependency information before data.

Figure 54:
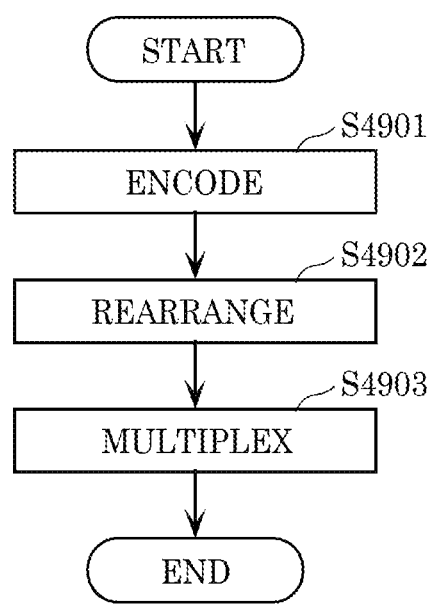
FIG. 54 is a flowchart of encoding processing according to Embodiment 5.

FIG. 54 is a flowchart illustrating the flow of processing by the three-dimensional data encoding device. First, the three-dimensional data encoding device encodes the data of a plurality of slices or tiles as described above (S4901). Next, as illustrated in FIG. 53, the three-dimensional data encoding device rearranges the data so that the data of dependence destinations become first (S4902). Next, the three-dimensional data encoding device multiplexes the rearranged data (forms the rearranged data into a NAL unit) (S4903).

Figure 55:
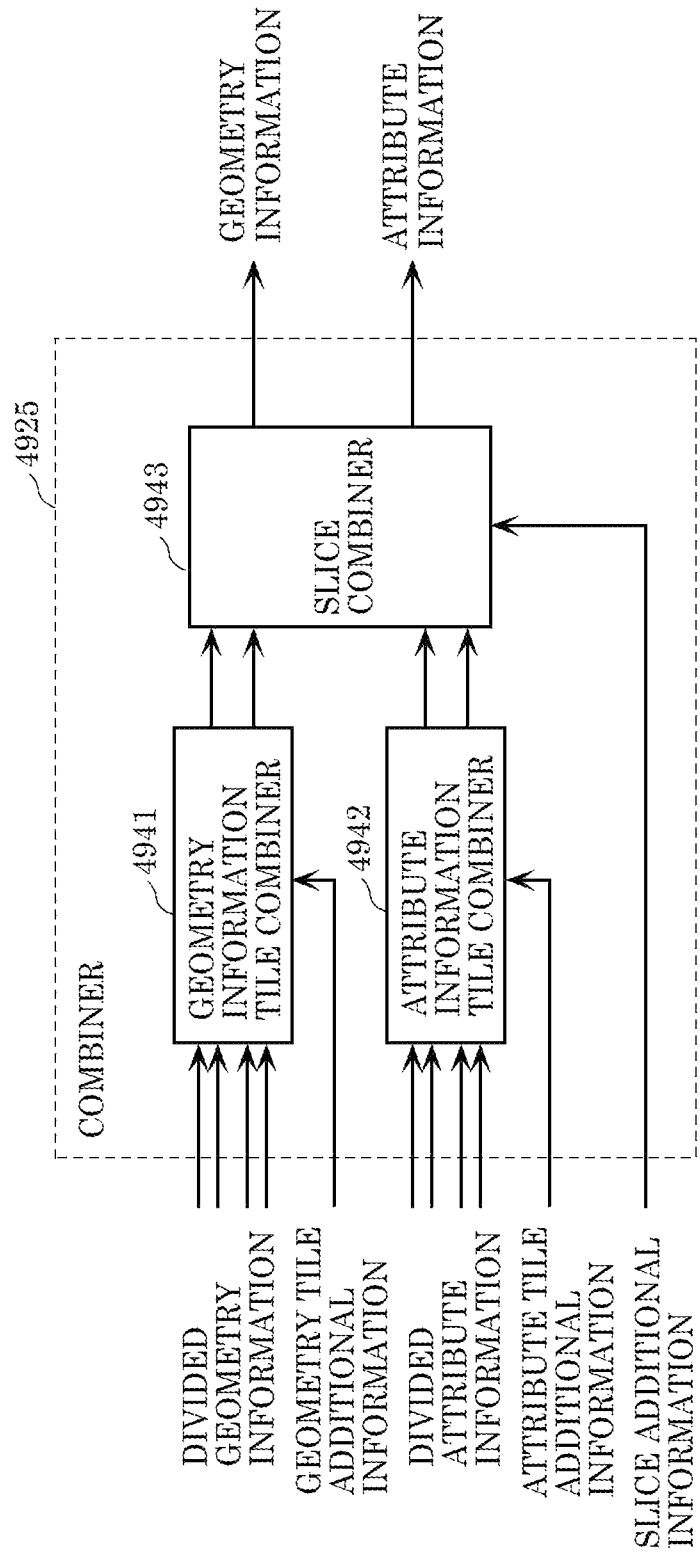
FIG. 55 is a block diagram of a combiner according to Embodiment 5.

Next, the configuration of combiner 4925 included in first decoder 4920 will be described. FIG. 55 is a block diagram illustrating the configuration of combiner 4925. Combiner 4925 includes geometry information tile combiner (geometry tile combiner) 4941, attribute information tile combiner (attribute tile combiner) 4942, and a slice combiner.

Geometry information tile combiner 4941 generates a plurality of slice geometry information by combining a plurality of divided geometry information by using geometry tile additional information. Attribute information tile combiner 4942 generates a plurality of slice attribute information by combining a plurality of divided attribute information by using attribute tile additional information.

Slice combiner 4943 generates geometry information by combining the plurality of slice geometry information by using slice additional information. Additionally, slice combiner 4943 generates attribute information by combining the plurality of slice attribute information by using slice additional information.

Note that the number of slices or tiles to be divided is one or more. That is, slice or tile dividing may not be performed.

Furthermore, although the example in which tile dividing is performed after slice dividing has been illustrated here, slice dividing may be performed after tile dividing. Furthermore, a new division type may be defined in addition to the slice and the tile, and dividing may be performed with three or more division types.

Figure 56:
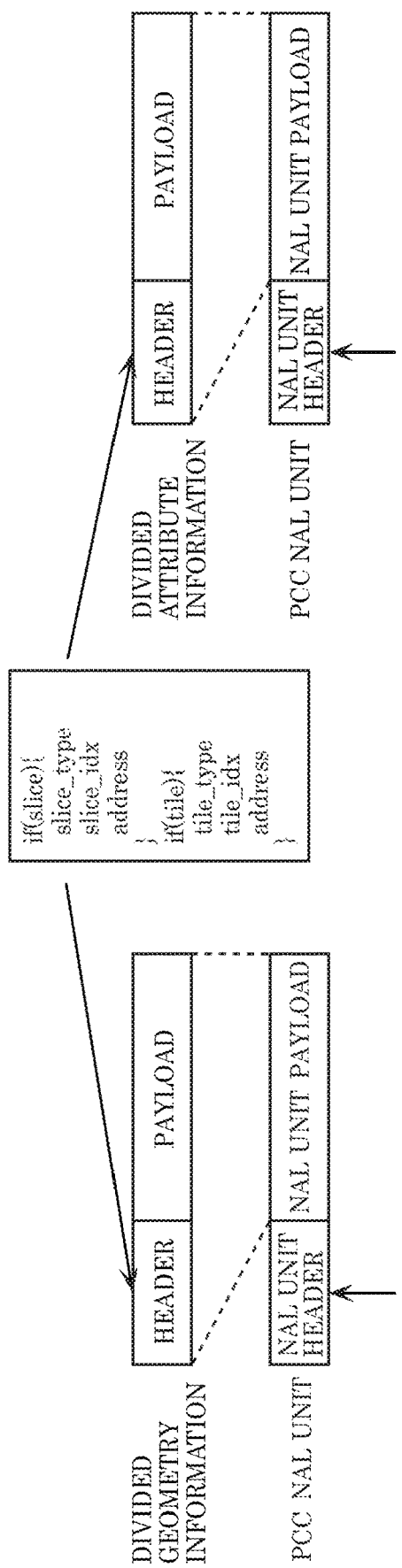
FIG. 56 is a diagram illustrating a structure example of encoded data and a NAL unit according to Embodiment 5.

Next, the configuration of encoded data divided into slices or divided into tiles, and the storing method (multiplexing method) of the encoded data into a NAL unit will be described. FIG. 56 is a diagram illustrating the configuration of encoded data, and the storing method of the encoded data into a NAL unit.

Encoded data (divided geometry information and divided attribute information) is stored in the payload of a NAL unit.

Encoded data includes a header and a payload. The header includes identification information for specifying the data included in the payload. This identification information includes, for example, the type of slice dividing or tile dividing (slice_type, tile_type), the index information for specifying slices or tiles (slice_idx, tile_idx), the geometry information of data (slices or tiles), or the address of data, etc. The index information for specifying slices is also written as the slice index (SliceIndex). The index information for specifying tiles is also written as the tile index (TileIndex). Additionally the type of division is, for example, the technique based on an object shape as described above, the technique based on map information or geometry information, or the technique based on the data amount or processing amount, etc.

Note that all or a part of the above-described information may be stored in one of the header of divided geometry information and the header of divided attribute information, and may not be stored in the other. For example, when the same dividing method is used for geometry information and attribute information, the type of division (slice_type, tile_type) and the index information (slice_idx, tile_idx) for the geometry information and the attribute information are the same. Therefore, these information may be included in the header of one of the geometry information and the attribute information. For example, when attribute information depends on geometry information, the geometry information is processed first. Therefore, these information may be included in the header of the geometry information, and these information may not be included in the header of the attribute information. In this case, the three-dimensional data decoding device determines that, for example, the attribute information of a dependence source belongs to the same slice or tile as a slice or tile of the geometry information of a dependence destination.

Furthermore, additional information (slice additional information, geometry tile additional information, or attribute tile additional information) related to slice dividing or tile dividing, and dependency information indicating dependency, etc. may be stored and transmitted in an existing parameter set (GPS, APS, geometry SPS, or attribute SPS). When the dividing method is changed for each frame, the information indicating the dividing method may be stored in the parameter set (GPS or APS) for each frame. When the dividing method is not changed within a sequence, the information indicating the dividing method may be stored in the parameter set (geometry SPS or attribute SPS) for each sequence. Furthermore, when the same dividing method is used for geometry information and attribute information, the information indicating the dividing method may be stored in the parameter set of a PCC stream (stream PS).

Also, the above-described information may be stored in any of the above-described parameter sets, or may be stored in a plurality of the parameter sets. Additionally, a parameter set for tile dividing or slice dividing may be defined, and the above-described information may be stored in the parameter set. Furthermore, these information may be stored in the header of encoded data.

Also, the header of encoded data includes the identification information indicating dependency. That is, when there is dependency between data, the header includes the identification information for referring to a dependence destination from a dependence source. For example, the header of data of a dependence destination includes the identification information for specifying the data. The identification information indicating the dependence destination is included in the header of the data of a dependence source. Note that, when the identification information for specifying data, the additional information related to slice dividing or tile dividing, and the identification information indicating dependency can be identified or derived from other information, these information may be omitted.

Figure 57:
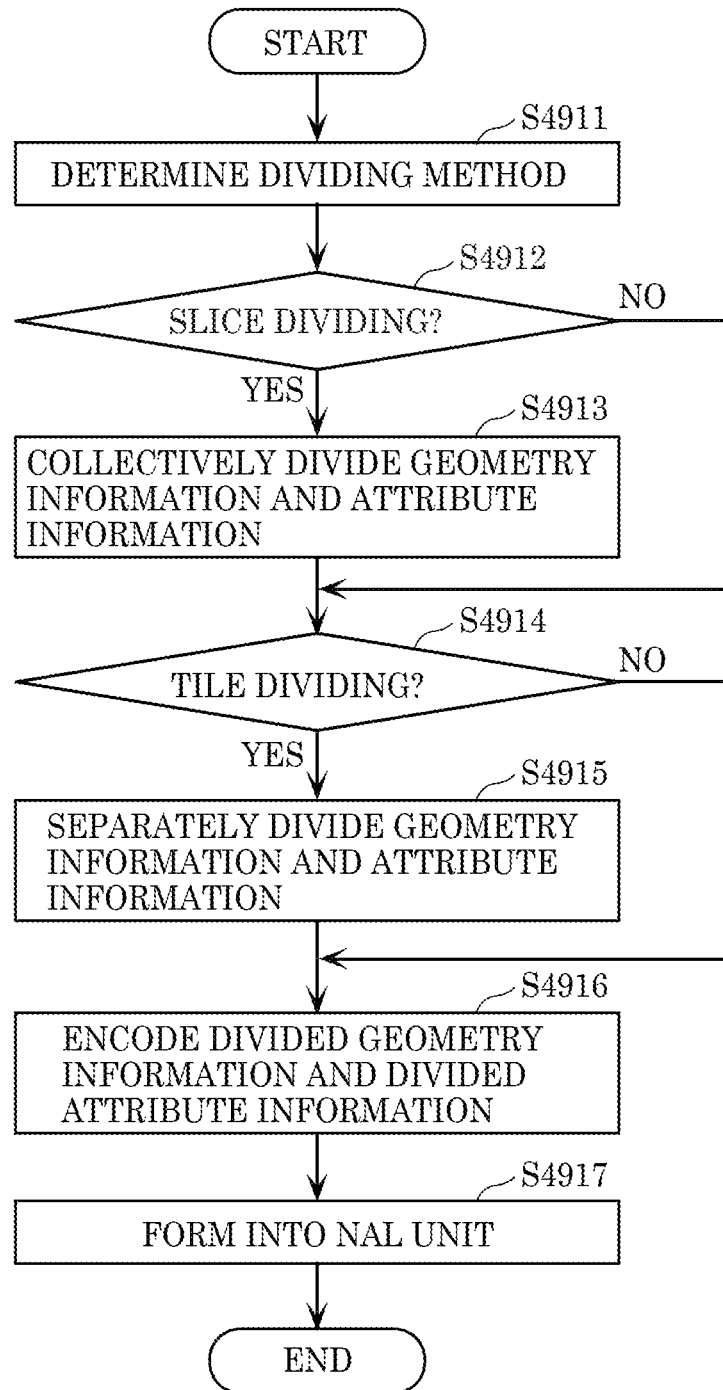
FIG. 57 is a flowchart of encoding processing according to Embodiment 5.

Next, the flows of encoding processing and decoding processing of point cloud data according to the present embodiment will be described. FIG. 57 is a flowchart of the encoding processing of point cloud data according to the present embodiment.

First, the three-dimensional data encoding device determines the dividing method to be used (S4911). This dividing method includes whether or not to perform slice dividing, and whether or not to perform tile dividing. Also, the dividing method may include the number of divisions and the type of division, etc. in the case of performing slice dividing or tile dividing. The type of division is the technique based on an object shape as described above, the technique based on map information or geometry information, or the technique based on the data amount or processing amount, etc. Note that the dividing method may be defined in advance.

When slice dividing is performed (Yes in S4912), the three-dimensional data encoding device generates a plurality of slice geometry information and a plurality of slice attribute information by collectively dividing geometry information and attribute information (S4913). Also, the three-dimensional data encoding device generates slice additional information related to slice dividing. Note that the three-dimensional data encoding device may separately divide geometry information and attribute information.

When tile dividing is performed (Yes in S4914), the three-dimensional data encoding device generates a plurality of divided geometry information and a plurality of divided attribute information by separately dividing the plurality of slice geometry information and the plurality of slice attribute information (or geometry information and attribute information) (S4915). Additionally, the three-dimensional data encoding device generates geometry tile additional information and attribute tile additional information related to tile dividing. Note that the three-dimensional data encoding device may collectively divide slice geometry information and slice attribute information.

Next, the three-dimensional data encoding device generates a plurality of encoded geometry information and a plurality of encoded attribute information by encoding each of the plurality of divided geometry information and the plurality of divided attribute information (S4916). Also, the three-dimensional data encoding device generates dependency information.

Next, the three-dimensional data encoding device generates encoded data (an encoded stream) by forming (multiplexing) the plurality of encoded geometry information, the plurality of encoded attribute information, and additional information into a NAL unit (S4917). Also, the three-dimensional data encoding device transmits the generated encoded data.

Figure 58:
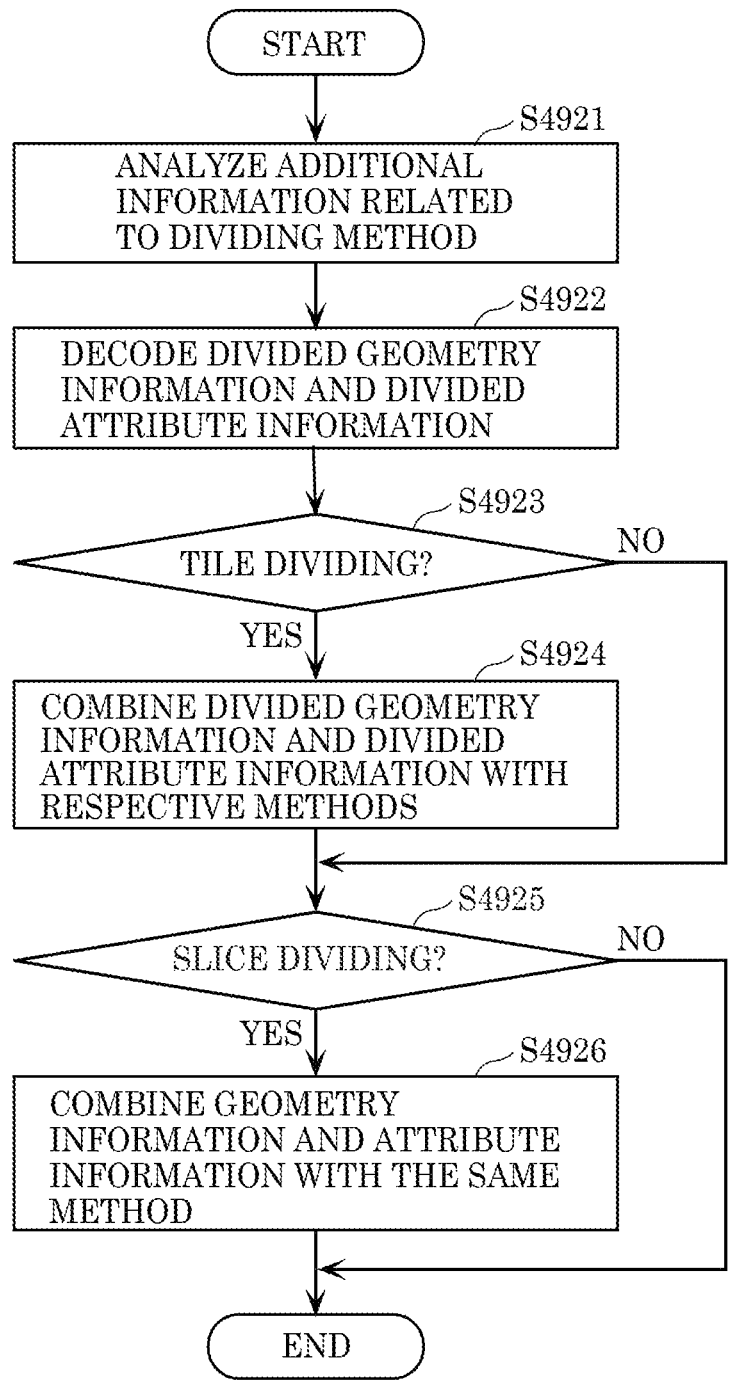
FIG. 58 is a flowchart of decoding processing according to Embodiment 5.

FIG. 58 is a flowchart of the decoding processing of point cloud data according to the present embodiment. First, the three-dimensional data decoding device determines the dividing method by analyzing additional information (slice additional information, geometry tile additional information, and attribute tile additional information) related to the dividing method included in the encoded data (encoded stream) (S4921). This dividing method includes whether or not to perform slice dividing, and whether or not to perform tile dividing. Additionally, the dividing method may include the number of divisions and the type of division, etc. in the case of performing slice dividing or tile dividing.

Next, the three-dimensional data decoding device generates divided geometry information and divided attribute information by decoding a plurality of encoded geometry information and a plurality of encoded attribute information included in the encoded data by using dependency information included in the encoded data (S4922).

When it is indicated by the additional information that tile dividing has been performed (Yes in S4923), the three-dimensional data decoding device generates a plurality of slice geometry information and a plurality of slice attribute information by combining a plurality of divided geometry information and a plurality of divided attribute information with respective methods based on geometry tile additional information and attribute tile additional information (S4924). Note that the three-dimensional data decoding device may combine the plurality of divided geometry information and the plurality of divided attribute information with the same method.

When it is indicated by the additional information that slice dividing has been performed (Yes in S4925), the three-dimensional data decoding device generates geometry information and attribute information by combining the plurality of slice geometry information and the plurality of slice attribute information (the plurality of divided geometry information and the plurality of divided attribute information) with the same method based on slice additional information (S4926). Note that the three-dimensional data decoding device may combine the plurality of slice geometry information and the plurality of slice attribute information with respective different methods.

Figure 59:
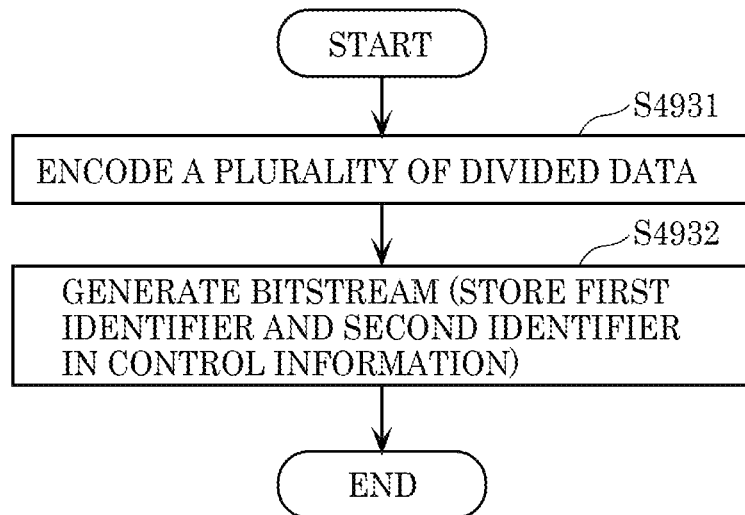
FIG. 59 is a flowchart of encoding processing according to Embodiment 5.

As described above, the three-dimensional data encoding device according to the present embodiment performs the processing illustrated in FIG. 59. First, the three-dimensional data encoding device performs dividing into a plurality of divided data (for example, tiles) included in a plurality of subspaces (for example, slices) divided from a current space in which a plurality of three-dimensional points are included, each of the plurality of divided data including one or more three-dimensional points. Here, the divided data is one or more data aggregates that are included in a subspace, and includes one or more three-dimensional points. Additionally, the divided data is also spaces, and may include a space that does not include a three-dimensional point. Furthermore, a plurality of divided data may be included in one subspace, or one divided data may be included in one subspace. Note that a plurality of subspaces may be set to a current space, or one subspace may be set to the current space.

Next, the three-dimensional data encoding device generates a plurality of encoded data corresponding to a plurality of divided data, respectively, by encoding each of the plurality of divided data (S4931). The three-dimensional data encoding device generates a bit stream including the plurality of encoded data and a plurality of control information (for example, the headers illustrated in FIG. 56) (referred to also as signaling information) for the plurality of respective encoded data (S4932). In each of the plurality of control information, a first identifier (for example, slice_idx) indicating the subspace corresponding to the encoding data corresponding to the control information, and a second identifier (for example, tile_idx) indicating the divided data corresponding to the encoding data corresponding to the control information are stored.

According to this, the three-dimensional data decoding device that decodes a bit stream generated by the three-dimensional data encoding device can easily restore a current space by combining the data of a plurality of divided data by using the first identifier and the second identifier. Therefore, the processing amount in the three-dimensional data decoding device can be reduced.

For example, in the encoding, the three-dimensional data encoding device encodes the geometry information and attribute information of a three-dimensional point(s) included in each of the plurality of divided data. Each of a plurality of encoded data includes the encoded data of geometry information, and the encoded data of attribute information. Each of a plurality of control information includes the control information of the encoded data of geometry information, and the control information of the encoded data of attribute information. The first identifier and the second identifier are stored in the control information of the encoded data of geometry information.

For example, in a bit stream, each of a plurality of control information is located ahead of the encoded data corresponding to the control information.

Additionally, a current space in which a plurality of three-dimensional points are included is set as one or more subspaces, one or more divided data including one or more three-dimensional points are included in the subspaces, the three-dimensional data encoding device generates a plurality of encoded data corresponding to the plurality of respective divided data by encoding each of the divided data, and generates a bit stream including the plurality of encoded data and a plurality of control information for the plurality of respective encoded data, and the first identifier indicating the subspace corresponding to the encoded data corresponding to the control information, and the second identifier indicating the divided data corresponding to the encoded data corresponding to the control information may be stored in each of the plurality of control information.

For example, the three-dimensional data encoding device includes a processor and a memory, and the processor performs the above-described processing by using the memory.

Figure 60:
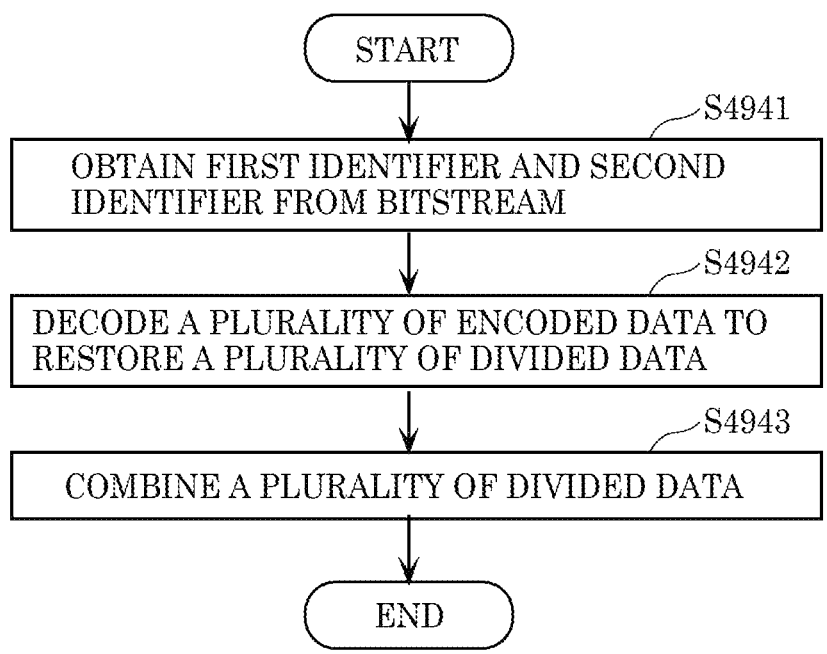
FIG. 60 is a flowchart of decoding processing according to Embodiment 5.

Additionally, the three-dimensional data decoding device according to the present embodiment performs the processing illustrated in FIG. 60. First, the three-dimensional data decoding device obtains the first identifier (for example, slice_idx) and the second identifier (for example, tile_idx) from a bitstream, the bitstream including a plurality of encoded data and a plurality of control information (for example, the headers illustrated in FIG. 56) corresponding to the plurality of respective encoded data, the first identifier and the second identifier being included in the plurality of control information, the plurality of encoded data being generated by encoding each of a plurality of divided data (for example, tiles), the plurality of divided data being included in a plurality of subspaces (for example, slices) obtained by dividing a current space including a plurality of three-dimensional points, the plurality of divided data each including one or more three-dimensional points, the first identifier indicating a subspace corresponding to the encoded data corresponding to the control information, the second identifier indicating the divided data corresponding to the encoded data corresponding to the control information (S4941). Next, the three-dimensional data decoding device restores a plurality of divided data by decoding the plurality of encoded data (S4942). Next, the three-dimensional data decoding device restores the current space by combining the plurality of divided data by using the first identifier and the second identifier (S4943). For example, the three-dimensional data decoding device restores the plurality of subspaces by combining the plurality of divided data by using the second identifier, and restores the current space (the plurality of three-dimensional points) by combining the plurality of subspaces by using the first identifier. Note that the three-dimensional data decoding device may obtain the encoded data of a desired subspace or divided data from a bit stream by using at least one of the first identifier and the second identifier, and may selectively decode or preferentially decode the obtained encoded data.

According to this, the three-dimensional data decoding device can easily restore the current space by combining the data of the plurality of divided data by using the first identifier and the second identifier. Therefore, the processing amount in the three-dimensional data decoding device can be reduced.

For example, each of the plurality of encoded data is generated by encoding the geometry information and attribute information of the three-dimensional point(s) included in the corresponding divided data, and includes the encoded data of the geometry information, and the encoded data of the attribute information. Each of the plurality of control information includes the control information of the encoded data of the geometry information, and the control information of the encoded data of the attribute information. The first identifier and the second identifier are stored in the control information of the encoded data of the geometry information.

For example, in a bit stream, the control information is located ahead of the corresponding encoded data.

For example, the three-dimensional data decoding device includes a processor and a memory, and the processor performs the processes described above using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

INDUSTRIAL APPLICABILITY

The present disclosure is applicable to a three-dimensional data encoding device and a three-dimensional data decoding device.

What is claimed is:

1. A three-dimensional data encoding method, comprising:
encoding a plurality of divided data items to generate a plurality of encoded data items each corresponding to a respective one of the plurality of divided data items, the plurality of divided data items being included in a plurality of subspaces obtained by dividing a current space, the plurality of divided data items each including a three-dimensional point from among a plurality of three-dimensional points included in the current space, wherein
the encoding includes, for each of the plurality of divided data items, (i) encoding geometry information corresponding the three-dimensional point included in the divided data item to generate encoded geometry information for an encoded data item corresponding to the divided data item, and (ii) encoding attribute information corresponding to the geometry information to generate encoded attribute information for the encoded data item corresponding to the divided data item, and the three-dimensional data encoding method further comprising generating a bitstream, the bitstream including, for each of the encoded data items, both
(i) a combination of the encoded geometry information for the encoded data item and control information for encoded data item, the control information including (a) a first identifier indicating a subspace corresponding to the encoded data item from among the plurality of subspaces, and (b) a second identifier indicating a divided data item corresponding to the encoded data item from among the plurality of divided data items, and
(ii) a combination of the encoded attribute information for the encoded data item and the control information for encoded data item.

2. The three-dimensional data encoding method according to claim 1, wherein
in the bitstream, for each of the plurality of encoded data items, (i) the combination of the encoded geometry information for the encoded data item and the control information for encoded data item and (ii) the combination of the encoded attribute information for the encoded data item and the control information for encoded data item are located ahead of the encoded data item.

3. A three-dimensional data decoding method, comprising:
obtaining a plurality of encoded data items from a bitstream, the bitstream including a plurality of encoded data items generated by encoding a plurality of divided data items, each of the plurality of encoding data items corresponding to a respective one of the plurality of divided data items, the plurality of divided data items being included in a plurality of subspaces obtained by dividing a current space, the plurality of divided data items each including a three-dimensional point from among a plurality of three-dimensional points included in the current space, wherein the encoding includes, for each of the plurality of divided data items, (i) encoding geometry information corresponding the three-dimensional point included in the divided data item to generate encoded geometry information for an encoded data item corresponding to the divided data item, and (ii) encoding attribute information corresponding to the geometry information to generate encoded attribute information for the encoded data item corresponding to the divided data item, the bitstream includes, for each of the encoded data items, both
(i) a combination of the encoded geometry information for the encoded data item and control information for encoded data item, the control information including (a) a first identifier indicating a subspace corresponding to the encoded data item from among the plurality of subspaces, and (b) a second identifier indicating a divided data item corresponding to the encoded data item from among the plurality of divided data items, and
(ii) a combination of the encoded attribute information for the encoded data item and the control information for encoded data item, and the three-dimensional data decoding method further comprises:
decoding the plurality of encoded data items to obtain the plurality of divided data items;

obtaining the first identifiers and the second identifiers from the bitstream, and
combining the plurality of divided data items together with reference to the second identifiers to reconstruct the current space.

4. The three-dimensional data decoding method according to claim 3, wherein
in the bitstream, for each of the plurality of encoded data items, (i) the combination of the encoded geometry information for the encoded data item and the control information for encoded data item and (ii) the combination of the encoded attribute information for the encoded data item and the control information for encoded data item are located ahead of the encoded data item.

5. A three-dimensional data encoding device, comprising:
a processor; and
memory,
wherein, using the memory, the processor:
encodes a plurality of divided data items to generate a plurality of encoded data items each corresponding to a respective one of the plurality of divided data items, the plurality of divided data items being included in a plurality of subspaces obtained by dividing a current space, the plurality of divided data items each including a three-dimensional point from among a plurality of three-dimensional points included in the current space, for each of the plurality of divided data items, the processor (i) encodes geometry information corresponding the three-dimensional point included in the divided data item to generate encoded geometry information for an encoded data item corresponding to the divided data item, and (ii) encodes attribute information corresponding to the geometry information to generate encoded attribute information for the encoded data item corresponding to the divided data item, and the processor generates a bitstream, the bitstream including, for each of the encoded data items, both
(i) a combination of the encoded geometry information for the encoded data item and control information for encoded data item, the control information including (a) a first identifier indicating a subspace corresponding to the encoded data item from among the plurality of subspaces, and (b) a second identifier indicating a divided data item corresponding to the encoded data item from among the plurality of divided data items, and
(ii) a combination of the encoded attribute information for the encoded data item and the control information for encoded data item.

6. A three-dimensional data decoding device, comprising:
a processor; and
memory,
wherein, using the memory, the processor:
obtains a plurality of encoded data items from a bitstream, the bitstream including a plurality of encoded data items generated by encoding a plurality of divided data items, each of the plurality of encoding data items corresponding to a respective one of the plurality of divided data items, the plurality of divided data items being included in a plurality of subspaces obtained by dividing a current space, the plurality of divided data items each including a three-dimensional point from among a plurality of three-dimensional points included in the current space, the encoding includes, for each of the plurality of divided data items, (i) encoding geometry information corresponding the three-dimensional point included in the divided data item to generate encoded geometry information for an encoded data item corresponding to the divided data item, and (ii) encoding attribute information corresponding to the geometry information to generate encoded attribute information for the encoded data item corresponding to the divided data item, the bitstream includes, for each of the encoded data items, both
- (i) a combination of the encoded geometry information for the encoded data item and control information for encoded data item, the control information including (a) a first identifier indicating a subspace corresponding to the encoded data item from among the plurality of subspaces, and (b) a second identifier indicating a divided data item corresponding to the encoded data item from among the plurality of divided data items, and
- (ii) a combination of the encoded attribute information for the encoded data item and the control information for encoded data item, and the processor further:
- decodes the plurality of encoded data items to obtain the plurality of divided data items;
- obtains the first identifiers and the second identifiers from the bitstream, and
- combines the plurality of divided data items together with reference to the second identifiers to reconstruct the current space.

\* \* \* \* \*